United States Patent

Stapleton

[15] 3,701,849

[45] Oct. 31, 1972

[54] CONCENTRATOR ARRANGEMENT FOR WIDEBAND SWITCHING

[72] Inventor: Richard Joseph Stapleton, Westerville, Ohio

[73] Assignee: Bell Telephone Laboratories, Incorporated, Murray Hill, N.J.

[22] Filed: Feb. 9, 1970

[21] Appl. No.: 9,915

[52] U.S. Cl. ....................179/2 TV, 179/18 FC
[51] Int. Cl. ....................H04m 11/06, H04q 3/60
[58] Field of Search ....................179/18 FC, 2 TV, 3, 4

[56] References Cited

UNITED STATES PATENTS

| | | | |
|---|---|---|---|
| 3,573,377 | 4/1971 | Anderson | 179/2 TV |
| 3,612,767 | 10/1971 | Anderson | 179/2 TV |
| 3,073,906 | 1/1963 | Lee | 179/2 TV |
| 3,226,484 | 12/1965 | James | 179/2 TV |
| 3,335,226 | 8/1967 | Michael | 179/18 C |

OTHER PUBLICATIONS

Bell Laboratories Record, May/June 1969, pp. 155–159 Korn, Ritchie, " Choosing the Route".

*Primary Examiner*—Kathleen H. Claffy
*Assistant Examiner*—Thomas D'Amico
*Attorney*—R. J. Guenther and James Warren Falk

[57] ABSTRACT

A combined voiceband and wideband communication system is disclosed. Customer stations are coupled directly to a switching office for voiceband service and wideband service is furnished to the stations via a concentrator which is controlled by the switching office. Signals transmitted from the stations directly to the office control the selection of voiceband or wideband paths to the stations. Provisions are also made for intraconcentrator wideband calls.

6 Claims, 54 Drawing Figures

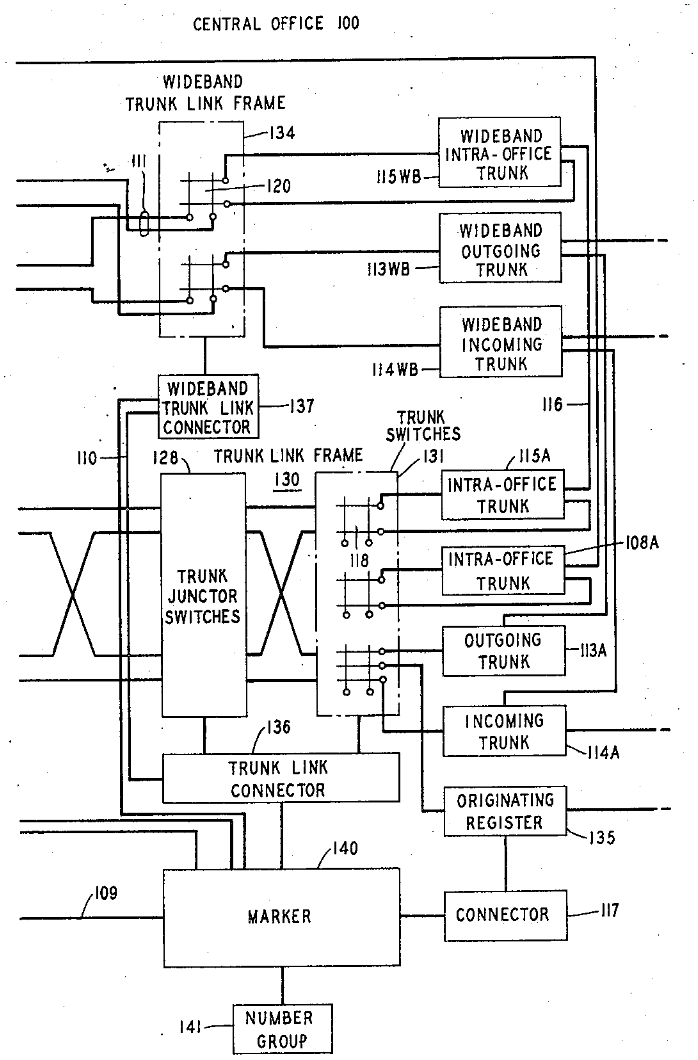
CENTRAL OFFICE 100
WIDEBAND TRUNK LINK FRAME
134
111
120
WIDEBAND INTRA-OFFICE TRUNK
115WB
WIDEBAND OUTGOING TRUNK
113WB
WIDEBAND INCOMING TRUNK
114WB
WIDEBAND TRUNK LINK CONNECTOR
137
116
TRUNK SWITCHES
110
128
TRUNK LINK FRAME
130
131
115A
INTRA-OFFICE TRUNK
INTRA-OFFICE TRUNK
108A
TRUNK JUNCTOR SWITCHES
118
OUTGOING TRUNK
113A
INCOMING TRUNK
114A
136
TRUNK LINK CONNECTOR
ORIGINATING REGISTER
135
140
109
MARKER
CONNECTOR
117
141
NUMBER GROUP

PATENTED OCT 31 1972 3,701,849

SHEET 01 OF 49

INVENTOR
R. J. STAPLETON
BY Charles H Davis
ATTORNEY

AUDIO INTRAOFFICE TRUNK 115A

PATENTED OCT 31 1972 3,701,849

FIG. 48A

| | | | |
|---|---|---|---|
| FIG. 2 | FIG. 3 | FIG. 4 | FIG. 5 |
| FIG. 6 | FIG. 7 | FIG. 8 | |

FIG. 48B

| | | | |
|---|---|---|---|
| FIG. 9 | FIG. 10 | FIG. 11 | FIG. 12 |
| FIG. 13 | FIG. 14 | FIG. 15 | |
| FIG. 16 | FIG. 17 | FIG. 18 | |

FIG. 48C

| | | | | |
|---|---|---|---|---|
| FIG. 19 | FIG. 20 | FIG. 21 | FIG. 22 | FIG. 23 |
| FIG. 24 | FIG. 25 | FIG. 26 | FIG. 27 | FIG. 28 |
| FIG. 29 | FIG. 30 | FIG. 31 | FIG. 32 | FIG. 33 |
| | | | | FIG. 34 |

FIG. 48D

| |
|---|
| FIG. 35 |
| FIG. 36 |

FIG. 48E

| | | |
|---|---|---|
| FIG. 37 | FIG. 38 | FIG. 39 |
| FIG. 40 | | |

FIG. 48F

| | |
|---|---|
| FIG. 41 | FIG. 42 |
| FIG. 43 | FIG. 44 |
| FIG. 45 | FIG. 46 |
| FIG. 47 | |

CONCENTRATOR ARRANGEMENT FOR WIDEBAND SWITCHING

BACKGROUND OF THE INVENTION

This invention relates generally to communication systems for transmitting information both within and outside the voice frequency spectrum. A more particular aspect of this invention relates to improved arrangements for providing customer stations with wideband facilities for the transmission of video signals and the like. In a still more particular aspect, this invention is concerned with providing concentrated groups of customer stations with wideband and voiceband facilities under the selective control of the stations.

At present, telephone switching networks are used primarily for voice communications over long distances. When high speed data is transmitted over telephone lines, it is usually transformed into a signal within the relatively narrow range of frequencies in the voice frequency spectrum. Limiting a switching network to voice frequency transmission has certain disadvantages and the need for wideband switching facilities becomes readily apparent when new services such as visual telephone service and the like are provided.

At the outset, it would be uneconomical to duplicate an existing voice frequency switching network by providing a new switching network for wideband calls particularly when many of the control functions performed in the wideband network could be performed by equipment which already exists in the telephone network. Moreover, it is expected that initially not every telephone station in the telephone network will require wideband service.

Arrangements have been proposed heretofore for augmenting existing telephone networks with wideband switching facilities, but these arrangements are deficient in some respects and lack the novel features set forth herein.

For example, many of the prior art arrangements provide both wideband and voiceband switching networks at the local central office. The voice network provides switching facilities for telephone service and the voice portion of a visual telephone call, while the other network is used only for wideband transmission such as the video portion of a visual telephone call. With this arrangement, voice frequency and wideband transmission facilities must be extended from a central office to every customer requiring wideband service. Furthermore, every local office, even those with a minimum number of wideband customers, must be furnished with wideband switching facilities.

Other arrangements have been proposed whereby a separate switching office would serve the wideband stations, but the voiceband station would still be served by the telephone switching office. While these arrangements are suitable for their intended purpose, they have certain disadvantages insofar as visual telephone service is concerned. For instance, during the processing of a visual telephone call, steps must be taken to ensure that the separate voice and video portions of one call do not get interchanged with either the voice or video portion of another call resulting in a situation where a customer is talking to one person while viewing another.

SUMMARY OF THE INVENTION

In accordance with the one illustrative embodiment of the invention, a plurality of stations are furnished wideband services through the use of a wideband concentrator arrangement. The concentrator arrangement is located in close proximity to the station equipment and is connected by control facilities, such as a data link, to the switching network at the central office. Common control equipment at the central office controls the concentrator. The concentrator is used to switch the wideband portion of visual telephone calls while the voice portion of a visual telephone call and audio-only calls are switched by the audio network at the central office. Thus, under selective control of the customers, the concentrator is used only when wideband facilities are required. The wideband portion of stations served by the same concentrator may be interconnected directly at the concentrator without using the switching network at the central office.

BRIEF DESCRIPTION OF THE DRAWING

A better understanding of the arrangement contemplated will be had by the following description of the illustrative embodiment of the invention made with respect to the drawing in which.

GENERAL DESCRIPTION

Before describing the arrangement in detail, a brief description will be given with respect to the block diagram shown in FIGS. 1A and 1B.

Figure 1A:
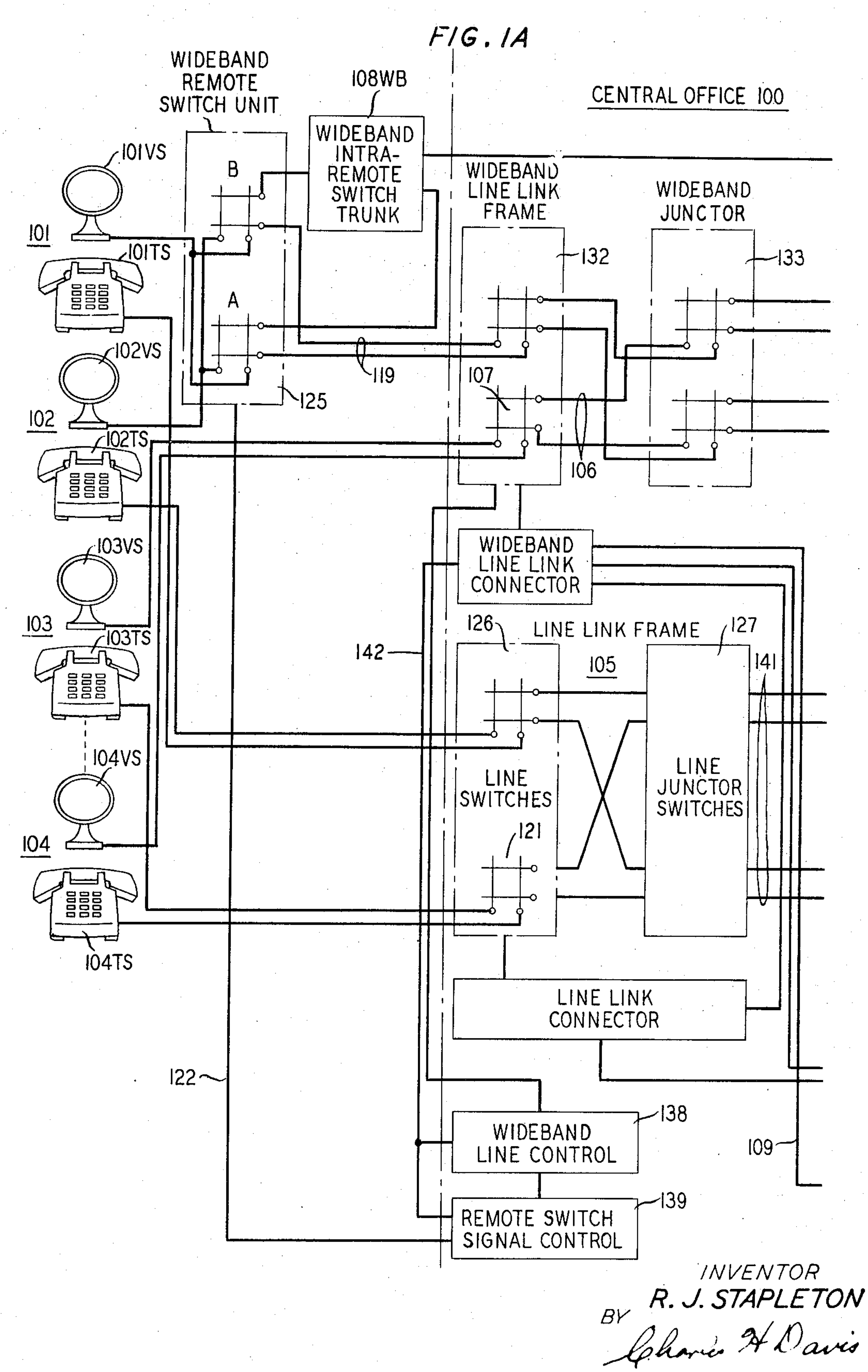
FIGS. 1A and 1B show, in block diagram form, a typical communication system employing the invention.
Figure 1B:
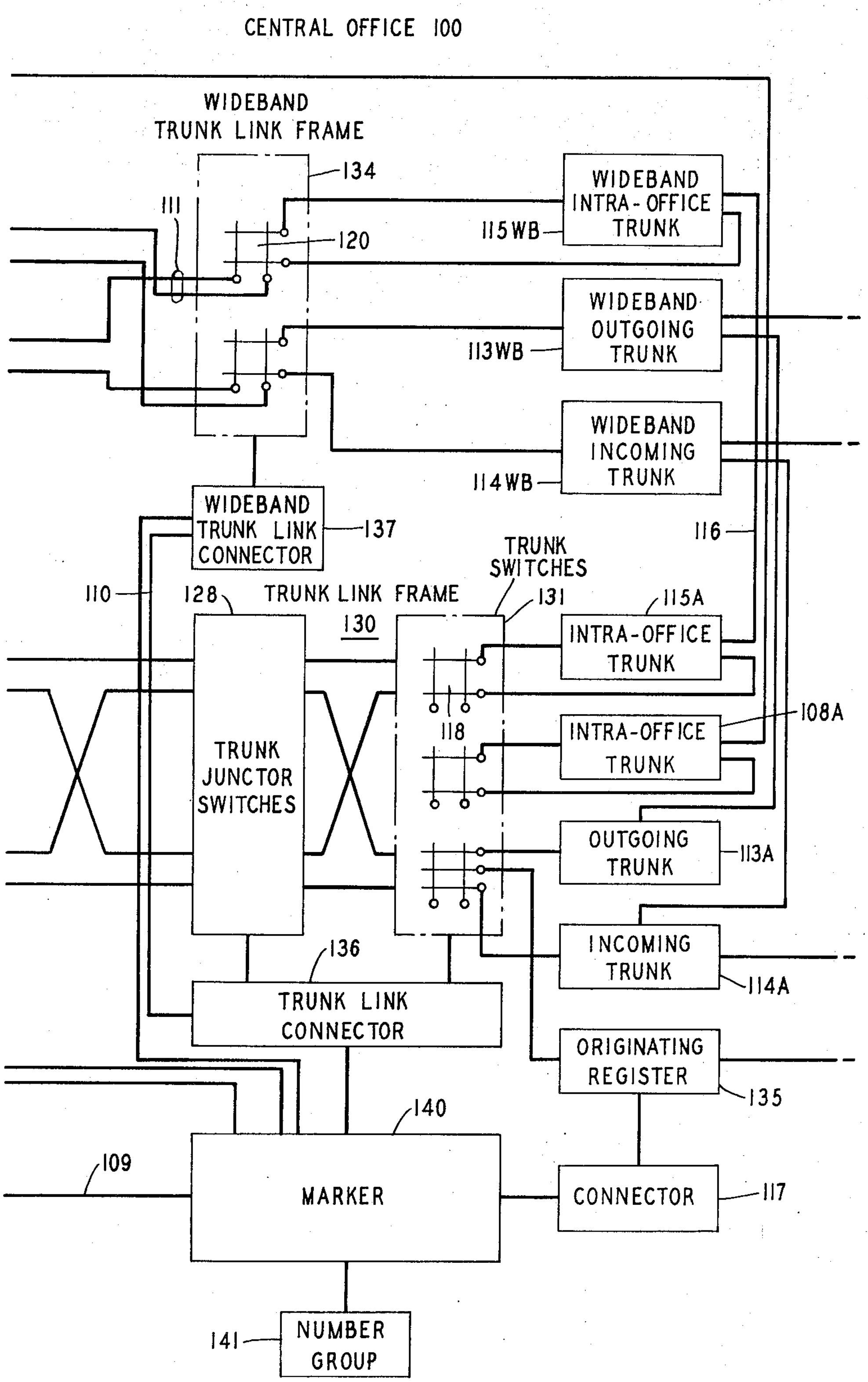

FIGS. 1A and 1B, when arranged with FIG. 1B to the right of FIG. 1A, show a switching system arranged for both wideband and voiceband transmission. The term "voiceband" when used herein, describes a narrowband of frequencies in the audio range such as those transmitted from a conventional telephone station. On the other hand, when the term "wideband" is used herein, it is understood to include a wider range of frequencies usually above the audio range. Typically, this high frequency spectrum is used to transmit high-speed data, facsimile, video signals, etc.

The communications system shown in FIGS. 1A and 1B includes a local central office 100, wideband remote switch unit 125, and customer stations 101–104. Each customer station comprises a telephone set TS and a video set VS. The telephone sets can be any one of the well-known sets, including a 12 button key arrangement for multifrequency signaling instead of a rotary dial. Each of the video sets at a station comprises a transceiver, i.e., a camera and a receiving unit for transmitting and receiving visual images.

In the arrangement being described herein, some of the customer stations are provided with wideband services from a remote switch unit while other customers have their wideband equipment connected directly to central office 100. Central office 100, therefore, comprises an audio switching network and a wideband switching network. In this illustrative embodiment of our invention, the audio network is a four stage crossbar network, including line link frames such as 105 and trunk link frames such as 130. The audio portions of customer stations, such as telephone sets 101TS–104TS, are terminated on line switches 126 of the line link frame. Trunk switches 131 of the trunk link frame provide the termination for originating registers and audio trunks. The line junctor switches 127 and the trunk junctor switches 128 provide the necessary linkages for interconnecting any line switch with any trunk switch.

The wideband network at central office 100 comprises a three stage crossbar network, including wideband line link frames such as 132, wideband junctor switch groups such as 133, and wideband trunk link frames such as 134. The video portion of certain customer stations, which are located in close proximity to the central office, are connected to the wideband line switches while wideband trunk circuits are connected to the wideband trunk switches. Wideband junctor switches provide linkages for interconnecting any of the wideband line switches with wideband trunk switches.

While many different audio and wideband network configurations can be employed in the central office, the illustrative embodiment disclosed herein uses a four stage audio and a three stage wideband network, having blocking characteristics designed for acceptable customer service. Of course, better customer service might be provided with two nonblocking networks, but these networks are inherently more complex and expensive. On the other hand, if both the audio and wideband networks were identical insofar as blocking characteristics are concerned, then the probability of a wideband call blocking (i.e., when the two networks are used concurrently) would be greater than when the audio network is used alone.

The wideband network at the central office, therefore, has been designed with a lower probability of blocking than the audio network, so that the grade of customer service is substantially the same whether the customer places an audio-only call using the audio network or a visual telephone call using both networks.

In accordance with a feature of my invention, a plurality of customer stations geographically remote from central office 100 can be served by a concentrator arrangement designated wideband remote switch unit 125. Wideband remote switch unit 125 comprises a switching network and control circuitry for actuating the network. The establishment of calls through the central office network and the wideband remote switch unit is under control of a plurality of markers such as marker 140.

To illustrate how the system operates, a call will be described wherein the customer at station 103 originates a call to the customer at station 104. If the customer at station 103 wishes to place an audio-only call, he lifts his receiver to actuate central office line equipment associated with telephone set 103TS. Marker 140 responds and, recognizing a request for dial tone, connects the calling telephone set 103TS via the line and trunk link frames 105 and 130 to an idle originating register such as 135. Register 135 returns dial tone to a calling customer indicating to the customer that he can begin transmitting the address code of the called station. The customer dials the telephone number of the called station and this number is stored in originating register 135. When sufficient digits have been received, register 135 seizes marker 140 via connector 117 and forwards the called number and calling line location to the marker. Marker 140 translates the called number into the line link frame equipment location of the called telephone station through the use of number group 141.

Having both the calling and called line location, marker 140 seizes an idle audio intraoffice trunk and begins testing for idle channels to interconnect the calling and called lines with the trunk. When idle channels are selected, several tests are made on the channels to determine if the channels are suitable for service. The lines are then connected to the intraoffice trunk via the channels and a ringing signal is transmitted to the called telephone station.

If the customer at station 103 desires to establish a visual telephone connection to the customer at station 104, he would originate a call using his telephone set 103TS and transmit a special prefix followed by the telephone number assigned to station 104.

It will be noted that each telephone station has a 12 button key-set for dialing. Ten of these buttons are assigned to the digits 0–9 similar to the digits on a conventional rotary dial. The other two buttons transmit signals for special services such as the visual telephone service being described herein. Register 135 then seizes marker 140 via marker connector 117. Marker 140 recognizes the video prefix and determines if the calling customer is entitled to originate video calls. If a customer not equipped for video service dials a video prefix, the marker will route the call to an overflow tone trunk. Recognizing that this is an intraoffice audio-video call from a customer with visual telephone service, the marker now begins testing and selecting the telephone facilities for interconnecting the telephone sets and video transceivers of the customers at stations 103 and 104.

Each trunk coupled to the audio network that can be used on an audio-video call has an associated wideband trunk, which is connected to the wideband network or to the remote switch unit. For example, audio intraoffice trunk 115A is associated with wideband intraoffice trunk 115WB; outgoing audio trunk 113A is associated with outgoing wideband trunk 113WB, etc. Marker 140 can test the availability of both audio and wideband trunks by examining the audio trunk equipment.

For the call being described, both stations are served by the central office wideband network, and an audio trunk having its wideband counterpart terminated in the central office wideband network will be selected. Assuming that intraoffice audio trunk 115A is idle, marker 140 seizes control of trunk link frame 130 via trunk link connector 136. When trunk link connector 136 is seized, signals are sent over conductors 110 to actuate wideband trunk link connector 137 to allow the marker access to the wideband trunk link frame 134. Signals are also sent between the wideband and audio trunks over conductors 116 to prepare the wideband trunk for operation.

While marker 140 is selecting idle trunks and gaining access to the audio and wideband trunk links, the marker uses number group 141 to translate the called number into a line link frame equipment location associated with telephone set 104TS. Receiving the line link frame equipment location from number group 141, marker 140 forwards part of this information over conductors 109 and 142 to wideband line control circuit 138. The wideband line control circuit is used by marker 140 to determine the equipment location of video transceiver set 104VS, including whether the video set is served by wideband remote switch unit 125 or directly by wideband line link frame 132. Wideband line control circuit 138 also indicates the type service to which a line is entitled. Since station 104 is served by the central office wideband network, wideband line control circuit 138 indicates to marker 140 that station 104 is a local line.

Having selected an idle audio and wideband trunk and determined the equipment location of the telephone and video sets associated with station 104, marker 140 begins testing linkages in the audio and wideband networks. Marker 140 tests the line links interconnecting line switch 121 with the line junctor switches 127 on line link frame 105, junctors 141 interconnecting line link frame 105 with trunk link frame 130 and the trunk links on trunk link frame 130 interconnecting the trunk junctor switches 128 with trunk switch 118. Marker 140 also tests wideband line links 106 which interconnect wideband line switch 107 with the wideband junctor switch group 133 and wideband trunk links 111 which interconnect the wideband junctor switch group 133 with the wideband trunk switch 120 on which the selected wideband intraoffice trunk 115WB is terminated.

Having selected an idle channel in both networks, the marker makes continuity and false cross and ground tests on the channels before the channels are used. If the channels are satisfactory for service, marker 140 proceeds to interconnect the called station video and telephone sets with the intraoffice trunks. Marker 140 now proceeds to establish a similar channel connection between the calling station and the intraoffice trunks.

Once both channels have been established, a video supervisory signal is transmitted over the wideband channel to turn on both video sets 103VS and 104VS. Also, ringing is transmitted from the audio intraoffice trunk 115A to alert the called customer. Supervisory signals to control charging and the release of the connection are transmitted over the audio channel.

For the call described above wherein the wideband stations were served by the central office wideband network, the marker selected an audio intraoffice trunk whose wideband counterpart was also terminated on the wideband central office network. When the customer's wideband service is furnished by remote switch unit 125, the marker must select additional linkages to the remote switch unit if the call is to be switched locally, i.e., via the central office wideband network or the marker must select an intraremote switch trunk if the call is to be switched exclusively via the remote switch unit.

For example, let it be assumed that the customer at station 103 places a call to the customer at station 102. From the calling line class of service, the marker determines that the call will be switched locally and selects an audio intraoffice trunk such as 115A which has its wideband counterpart terminated in the central office wideband network.

After the marker translates the called telephone number into the audio line equipment location associated with telephone station 102TS, the marker utilizes wideband line control circuit 138 and a remote switch signal control circuit 139 to determine the wideband line link location of called video set 102VS. Wideband line control circuit 138 indicates to the marker that the called video set is a remote line and when the marker selects an idle channel between wideband intraoffice trunk 115WB and called video set 102VS, it must also select an idle remote link from the group of links 119. When a remote link is selected, its identity is transmitted to remote switch signal control circuit 139. This identity is encoded and transmitted to remote switch unit 125 where it is decoded and used to actuate the select magnet associated with the selected remote link.

The called wideband line location is also determined by wideband line control circuit 138, encoded by remote switch signal control circuit 139 and transmitted over conductors 122 to remote switch unit 125. This information is used at the remote switch unit to operate the hold magnet associated with the called station video set. The marker now proceeds to select an idle channel to the calling station as described above and releases after the channel has been tested.

Two stations, such as 101 and 102, whose wideband service is furnished from the same remote switch unit can be coupled directly using a wideband intraremote switch trunk such as 108WB. Telephone calls and the audio portion of wideband calls will, nevertheless, still be coupled via the audio central office network.

From the calling line class of service and from the wideband line control circuit, the marker determines that both calling and called lines are served by the same remote switch unit. The marker then selects an audio intraoffice trunk such as 108A which has its wideband counterpart 108WB terminated in remote switch unit 125. When the audio intraoffice trunk is seized, the remote switch signal control circuit is actuated to transmit to the remote switch unit signals representing the select magnet associated with the called end of wideband intraremote switch trunk 108WB. The called audio line location is then determined from the wideband line control circuit which causes the remote switch signal control circuit to transmit this information to the remote switch unit so that the hold magnet associated with called video set 102VS can be operated.

Once audio and wideband channels have been established between the called station audio and video sets and the corresponding trunk circuits, the marker begins selecting and establishing similar channels from the calling station to the trunks. After performing certain tests on the channels, the marker releases.

While the disclosed concentrator arrangement is shown serving customer stations, it will be obvious to those skilled in the art that other circuits such as trunks could also be furnished with wideband service via the concentrator.

DETAILED DESCRIPTION

As described above, the central office comprises a wideband switching network, a voiceband switching network and control equipment for actuating the networks. In this illustrative embodiment of the invention the wideband network shown in FIGS. 2–8 is a three stage crossbar network comprising wideband line link frames, wideband junctor frames and wideband trunk link frame.

A wideband line link frame is made up of a plurality of crossbar switches each having 10 horizontals and 20 verticals. The horizontals of the wideband line switches are multipled to similar switches on the same wideband line link frame, and the customer station data terminals are connected to the wideband line switch verticals. In the example being described it has been assumed that the customer stations are equipped for visual telephone service and each station has its video set connected to a switch vertical in the wideband network. For example, video set 104VS is connected to vertical 0 of wideband line switch 2LAO and video set 103VS is connected to vertical 19 of wideband line switch 2LDO.

Figure 2:
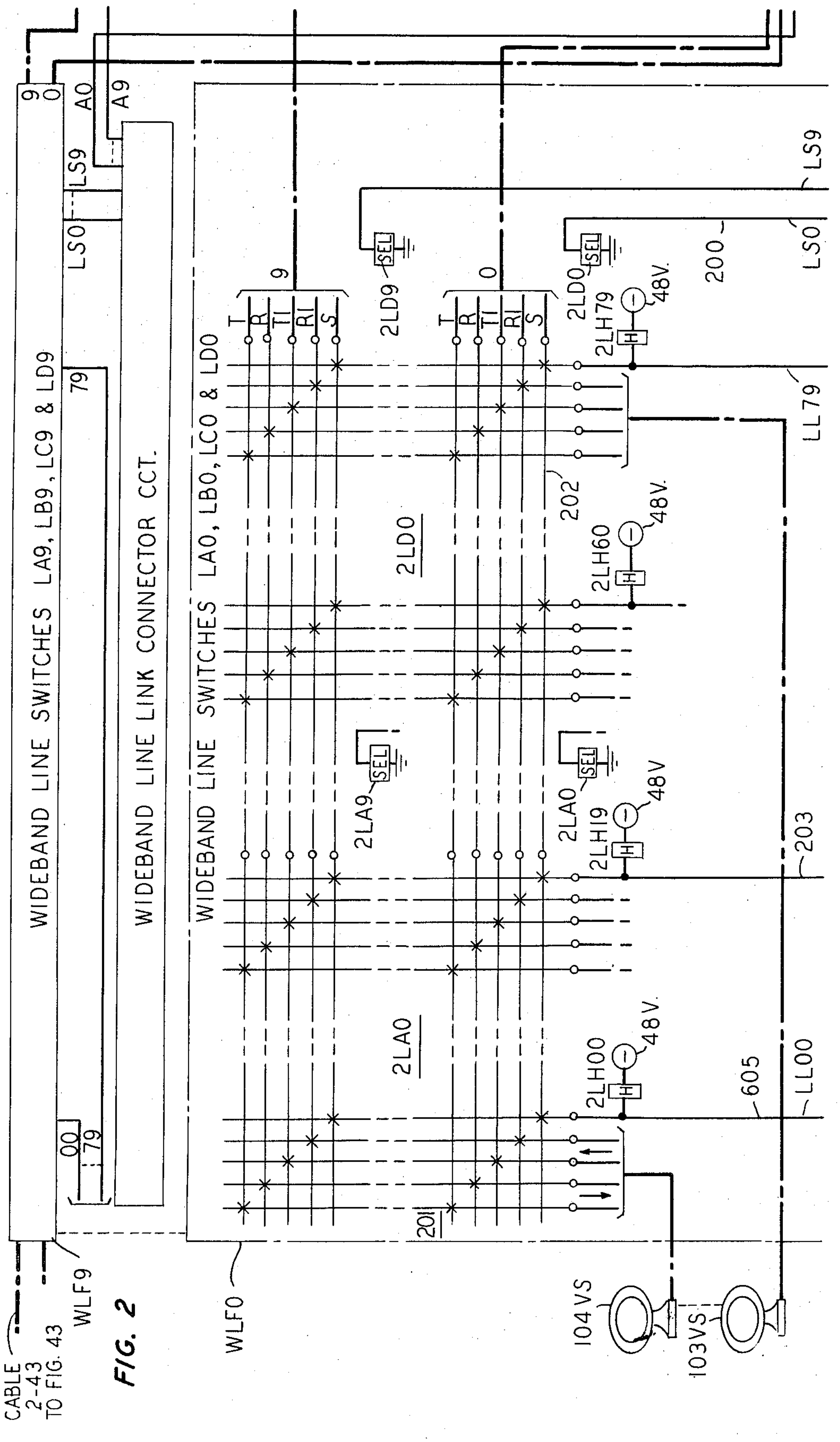
FIGS. 2–8, when arranged according to FIG. 48A, show a portion of a wideband switching network, including a wideband intraoffice trunk located at a central office.
Figure 9:
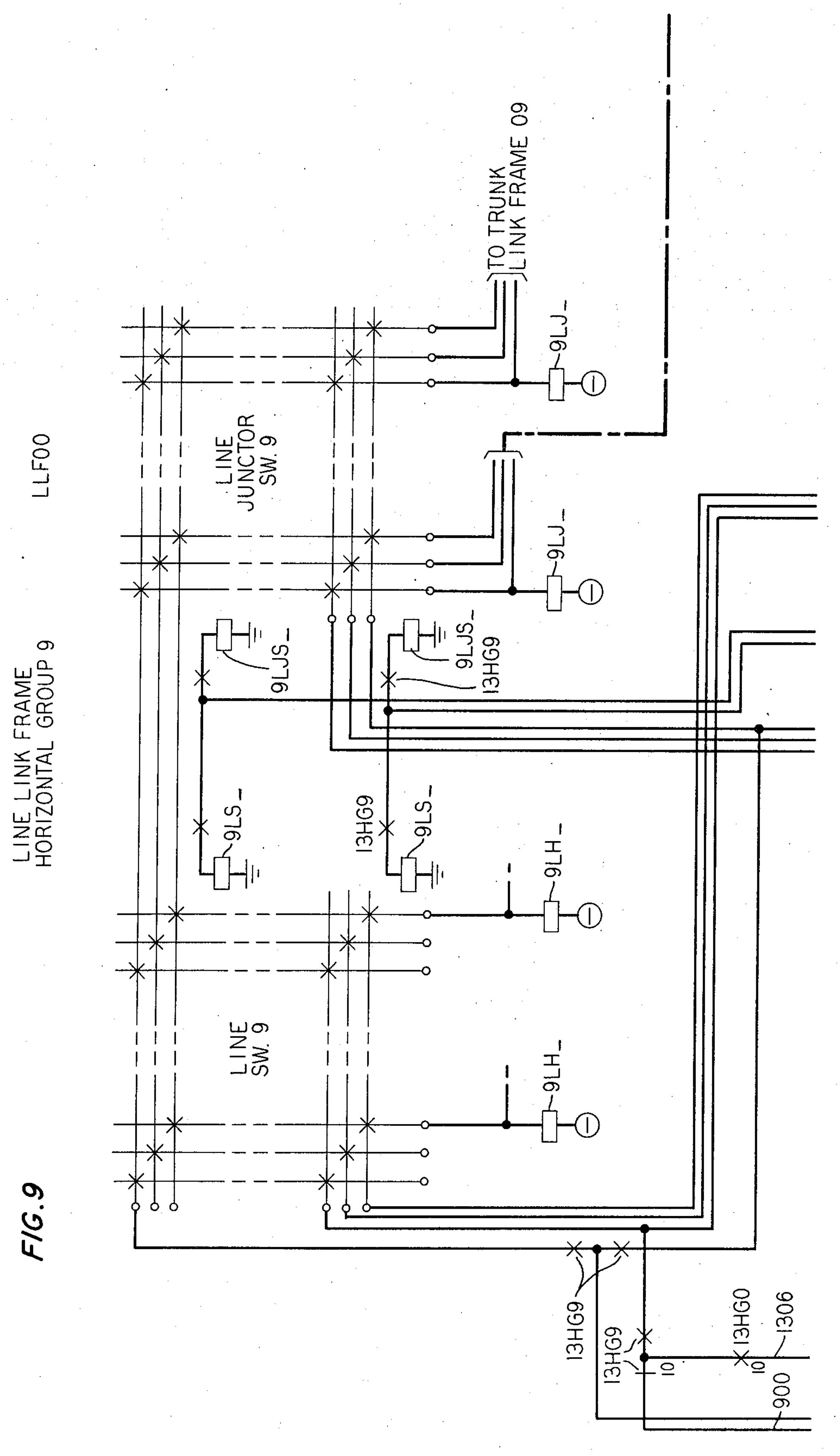
FIGS. 9–18, when arranged according to FIG. 48B, show a portion of an audio central office switching network, including part of an audio intraoffice trunk circuit.
Figure 10:
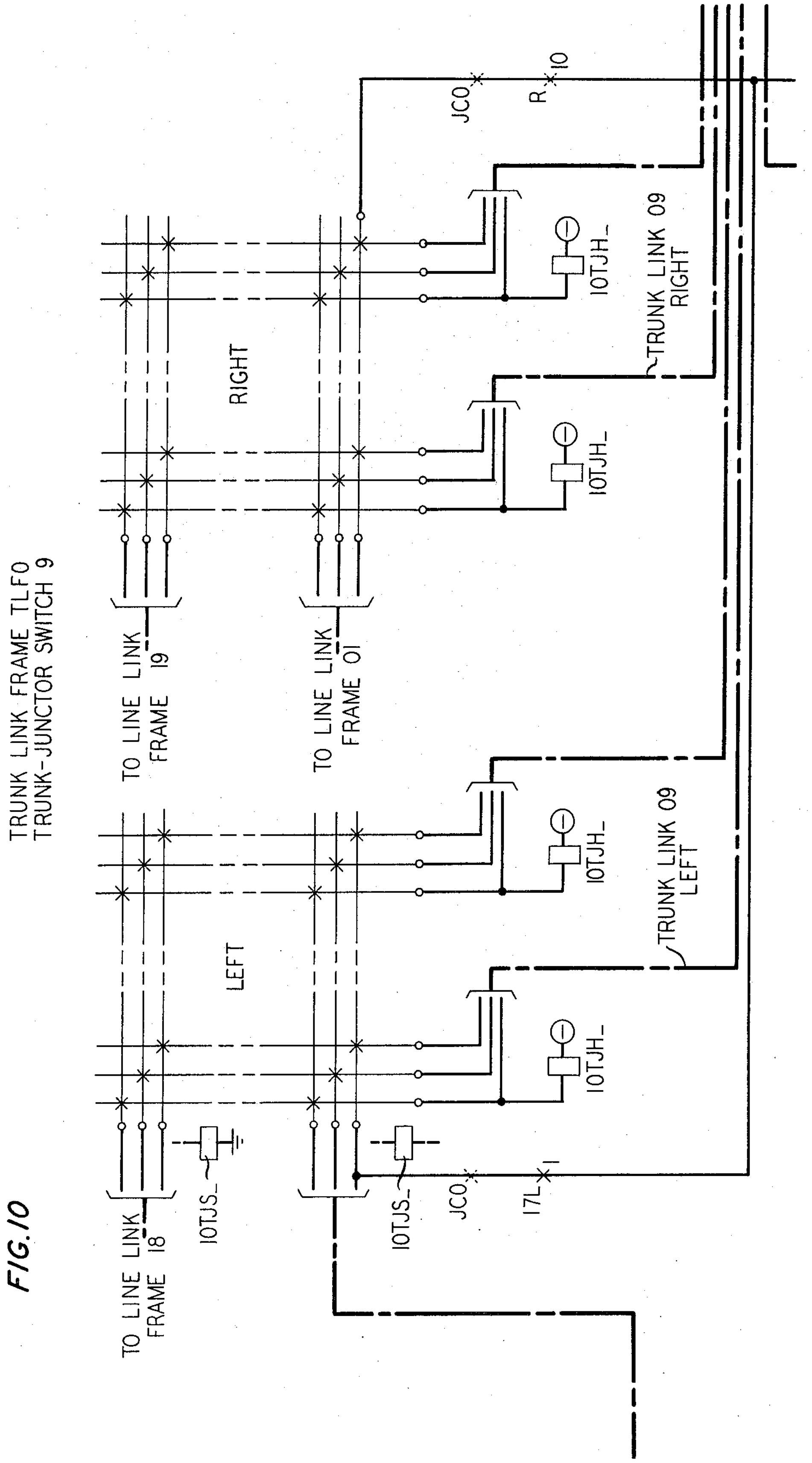
Figure 11:
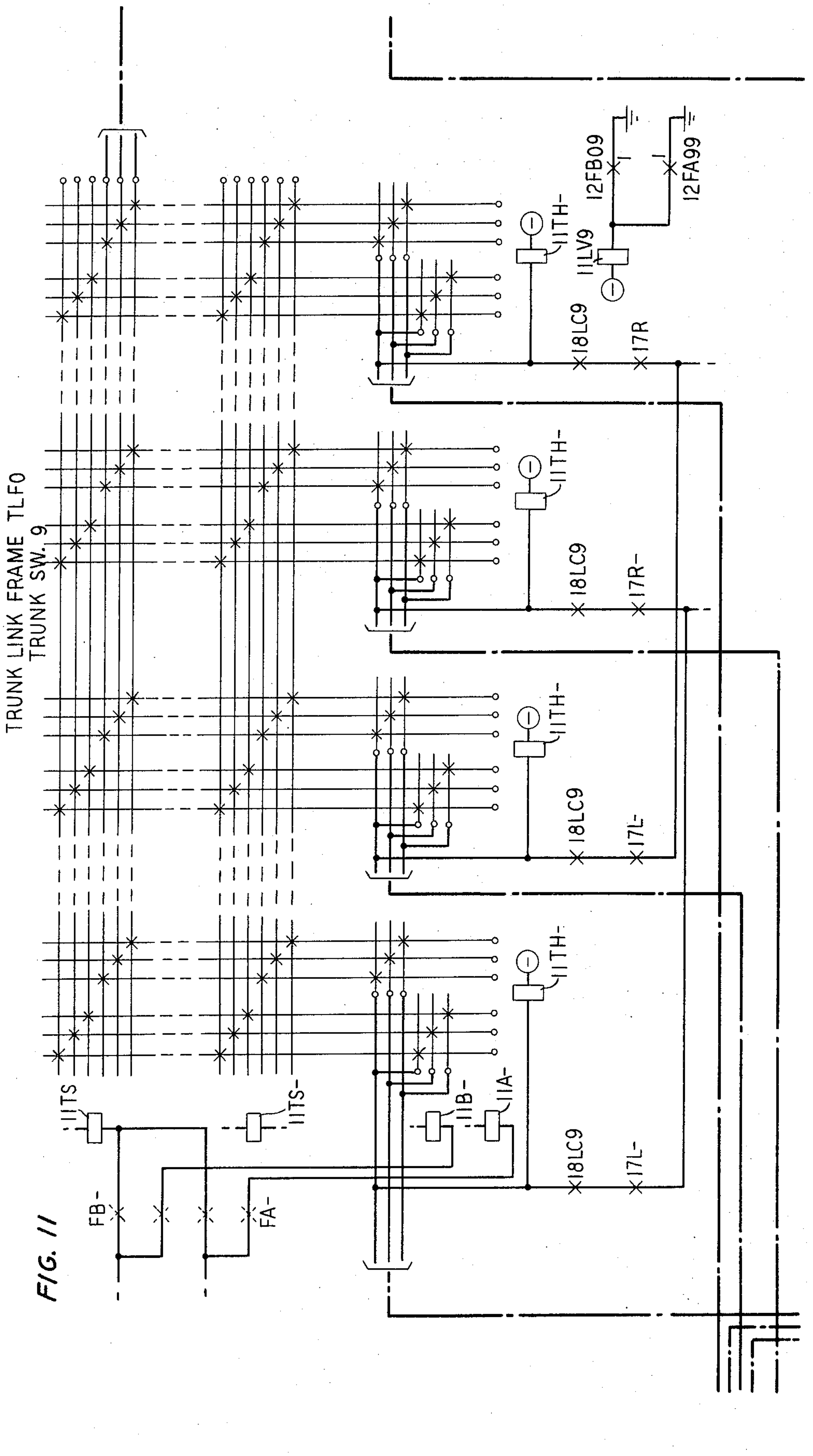

Each wideband line link frame is associated with an audio line link frame. FIG. 2 shows wideband line link frame WLFO and wideband line link frame WLF9 which form part of wideband line link group 0. Wideband line link frame WLFO is associated with audio line link frame LLFO in FIGS. 9 and 13.

Figure 4:
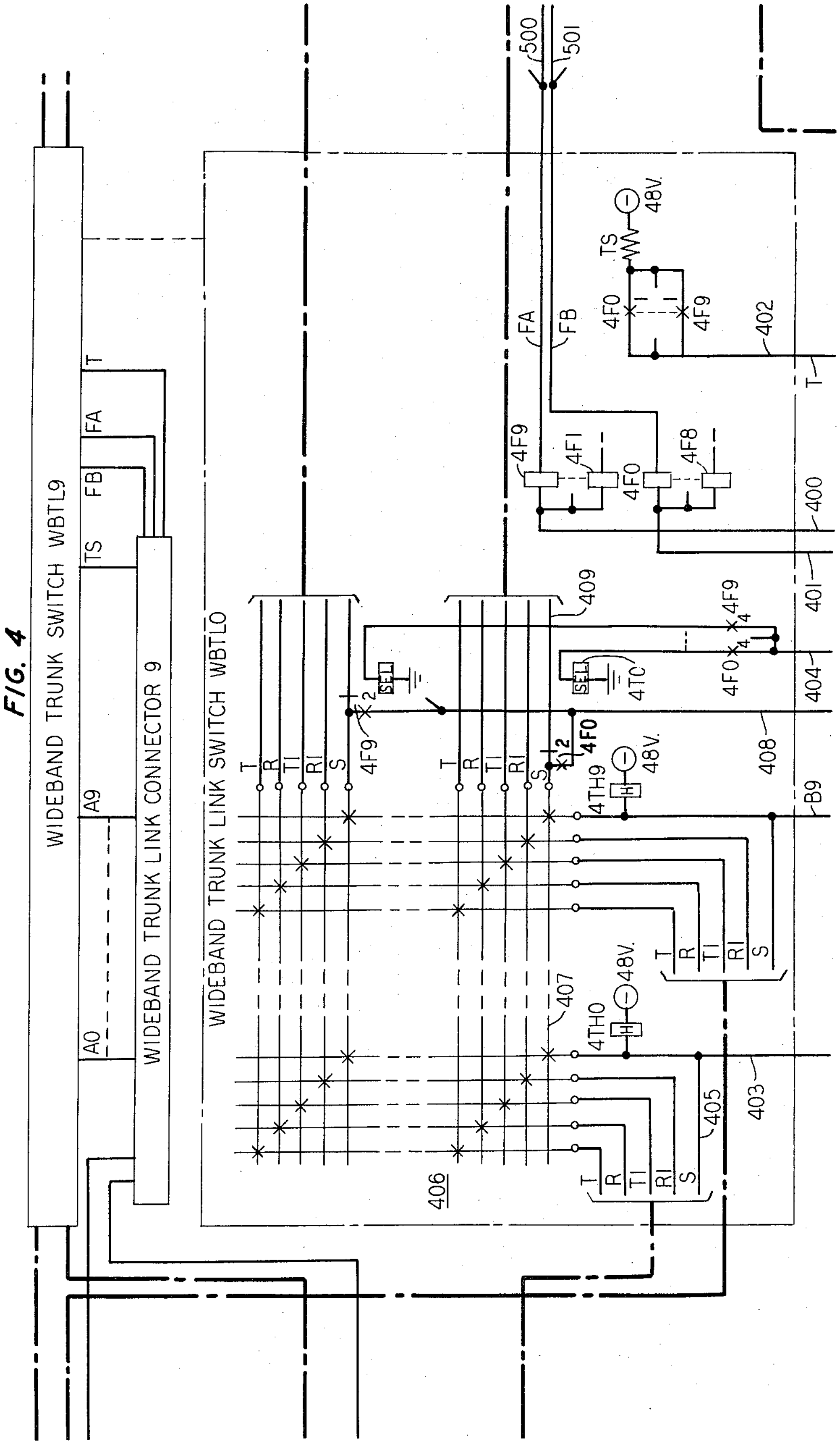

A typical wideband trunk link group is shown in FIG. 4. Each wideband trunk link group comprises a plurality of 10 by 10 crossbar switches with wideband trunks appearing on the horizontals and links from the wideband junctor switches appearing on the verticals. Each wideband trunk switch is associated with a corresponding audio trunk link frame and more than one wideband trunk switch can be associated with the same audio counterpart. FIG. 4 shows wideband trunk link group O comprising wideband trunk switches WBTLO-WBTL9.

Figure 3:
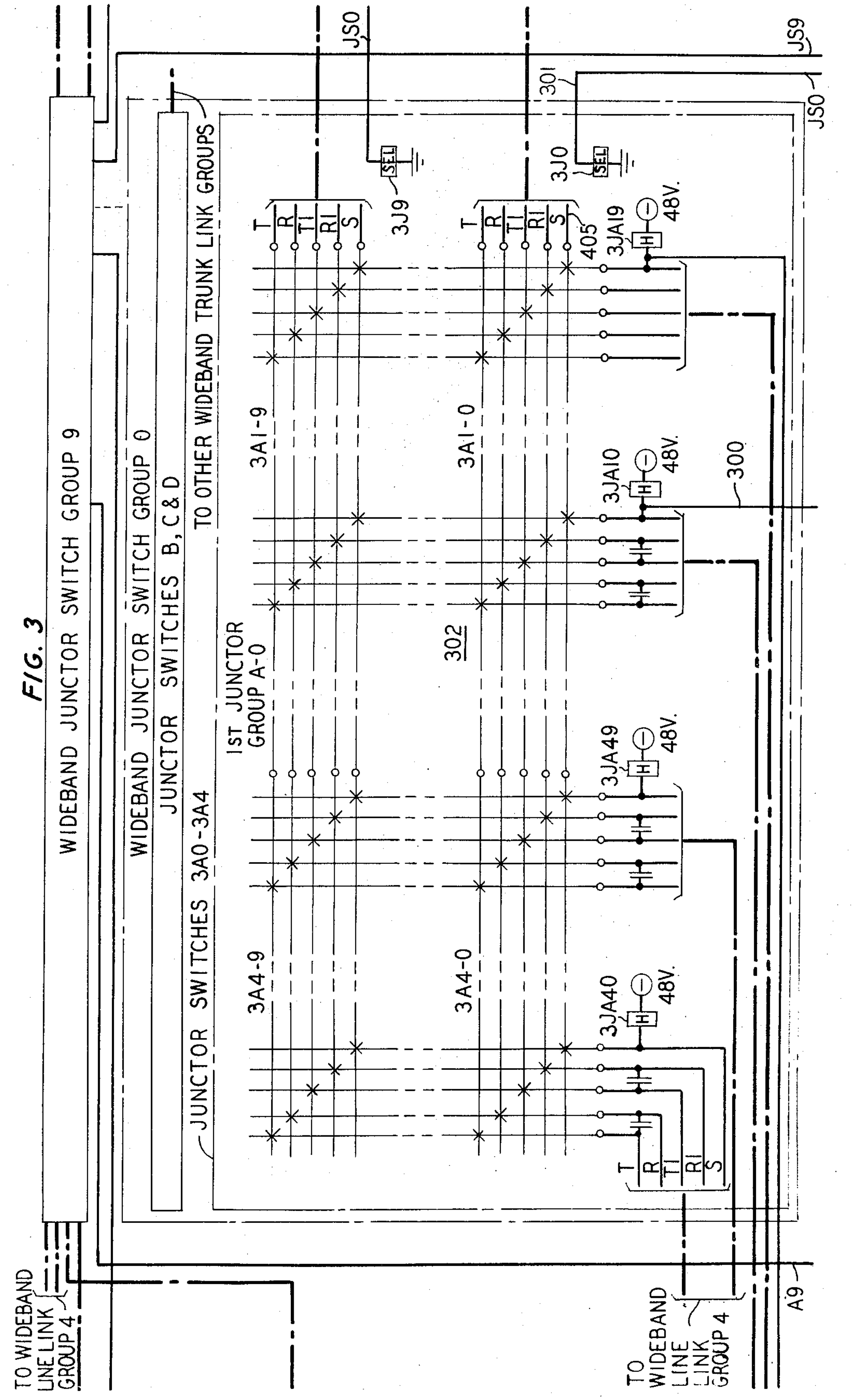

Interposed between the wideband line switches and the wideband trunk switches are the wideband junctor switches shown in FIG. 3. The wideband junctor switches are divided into ten wideband junctor switch groups to provide network access between any line appearance and any trunk appearance in the wideband network. Each wideband junctor switch group can be equipped with 100 point crossbar switches arranged in a 4 by 4 matrix. The horizontals of the switches 3A1–3A4 serve wideband trunk link group 0 and the verticals on each of the switches 3A1–3A4 serve a different wideband line link group.

Figure 6:
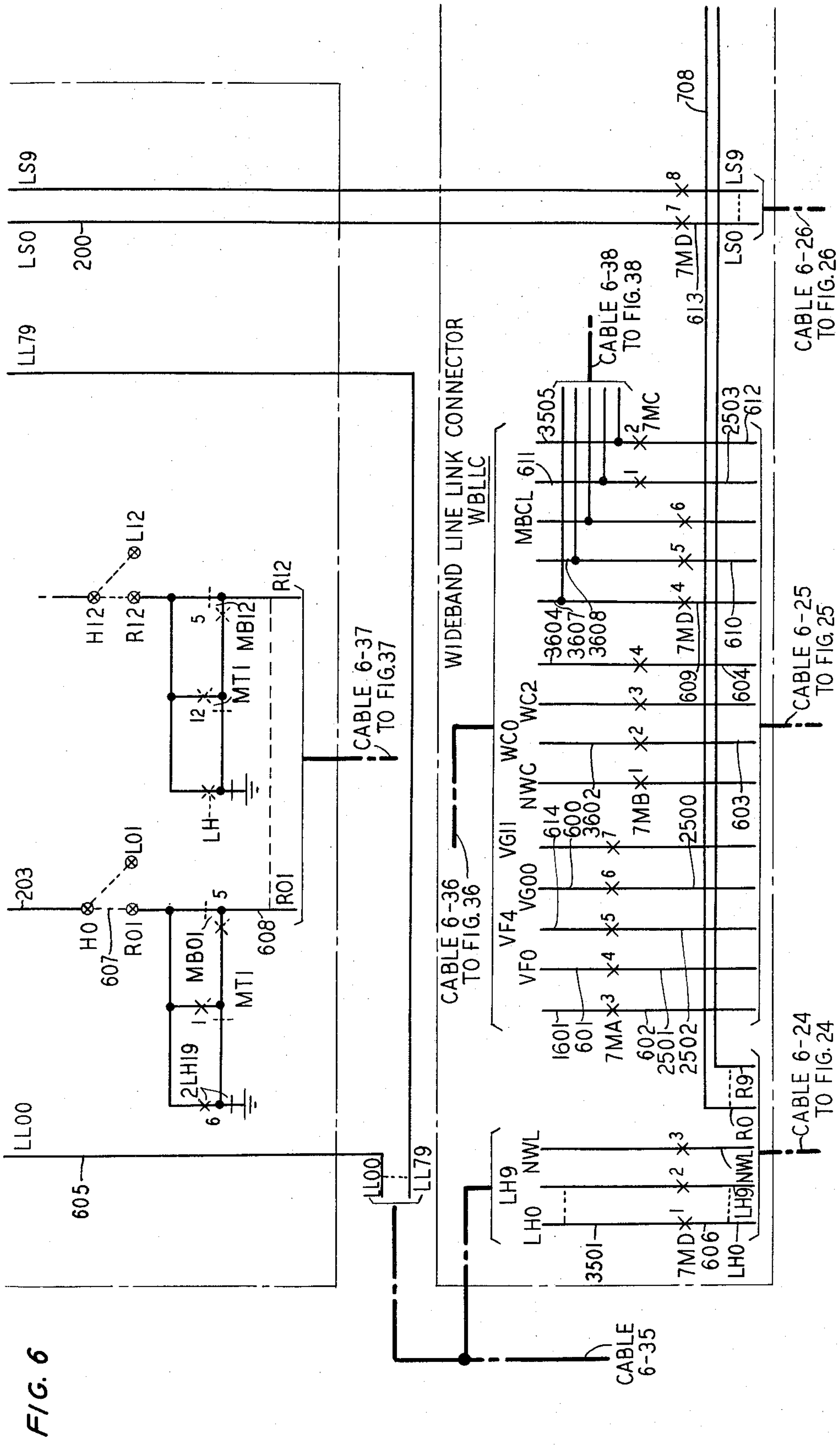
Figure 7:
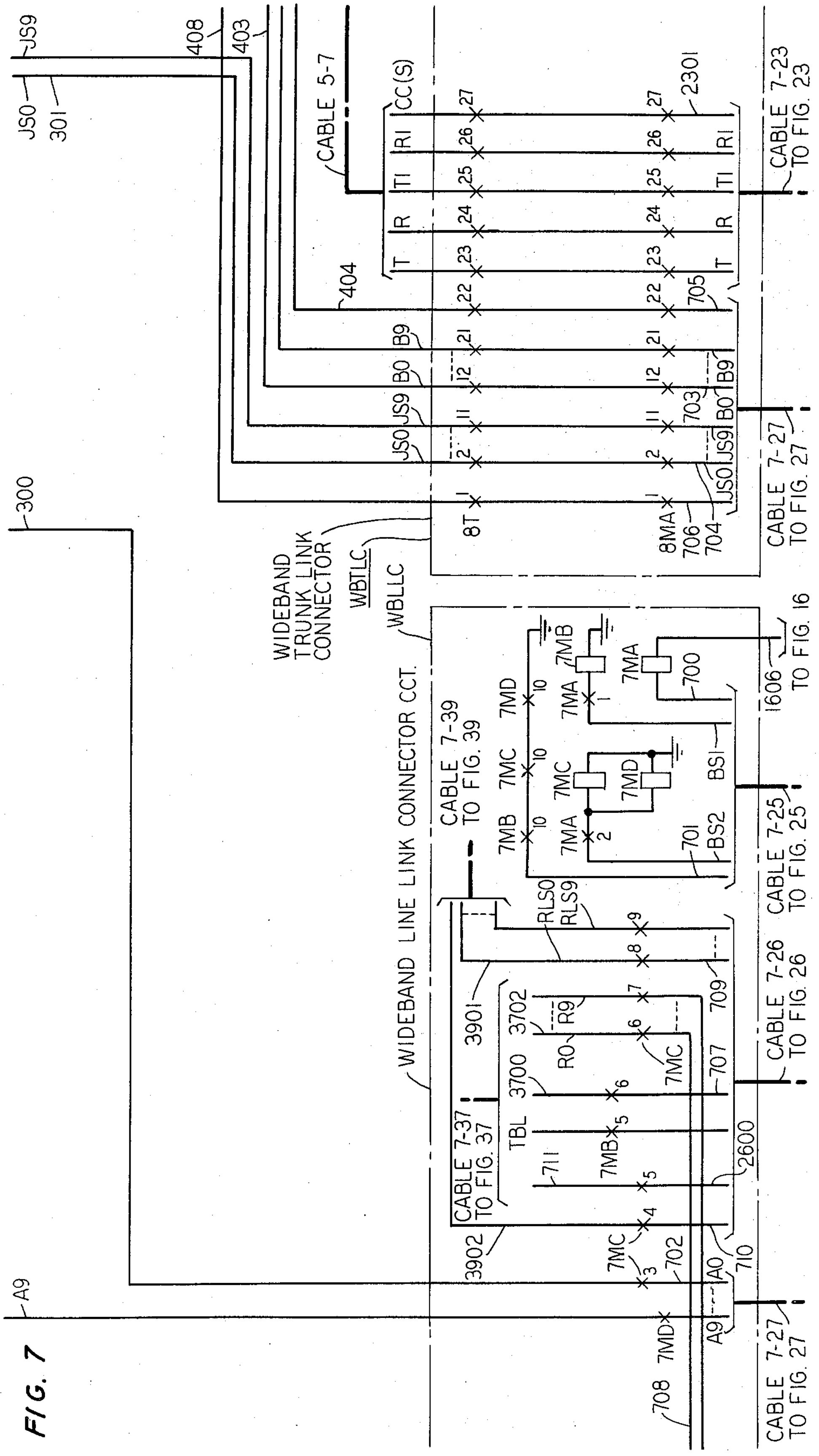
Figure 8:
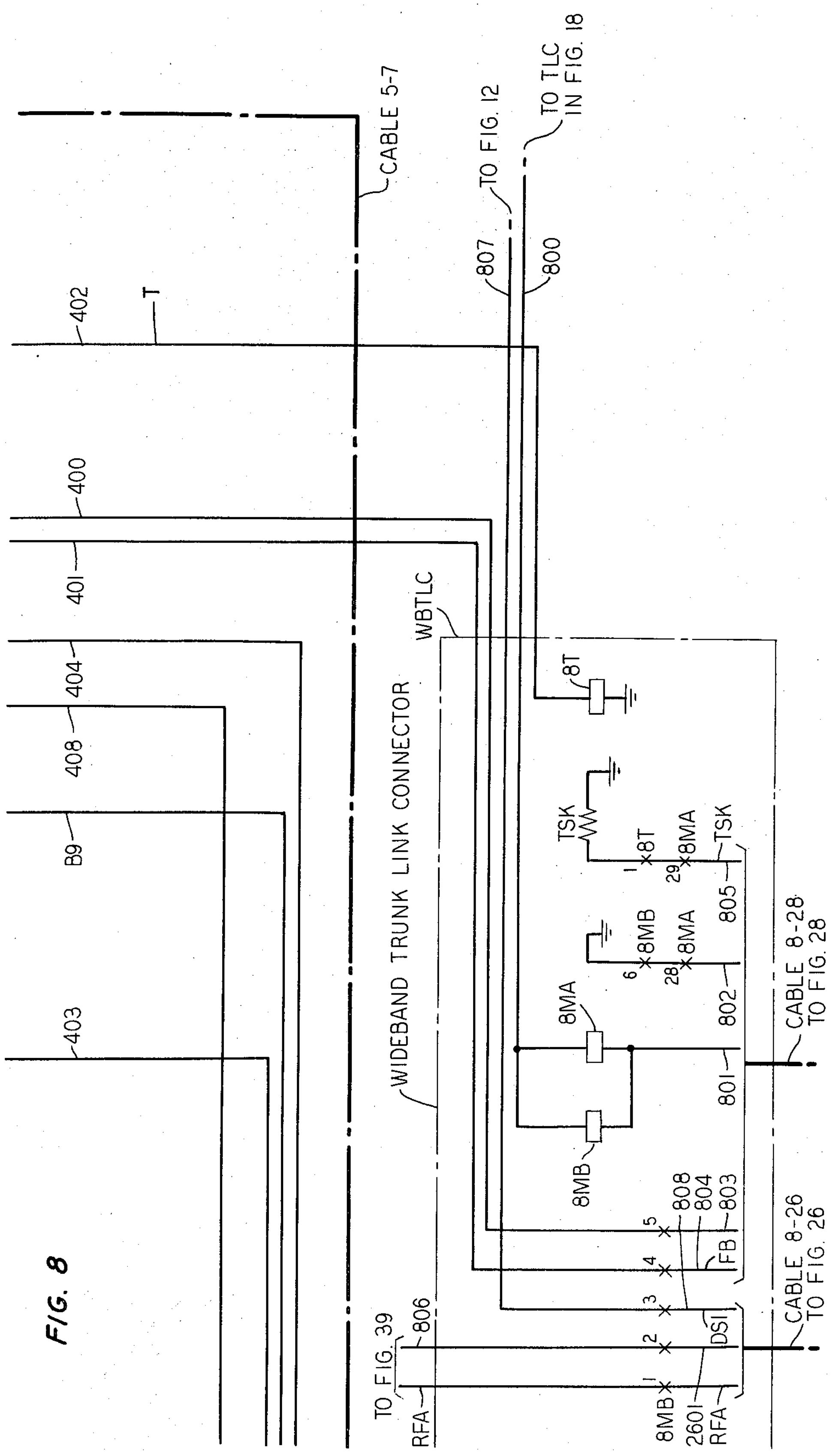

Marker access to the wideband line link frame, wideband junctor switches and wideband trunk switches is through the wideband line link connector WBLLC shown in FIGS. 6 and 7 and the wideband trunk link connector WBTLC shown in FIGS. 7 and 8.

The voiceband network shown in FIGS. 9–18 comprises a plurality of line link frames made up of line and line junctor switches and a plurality of trunk link frames made up of trunk junctor and trunk switches. Telephone sets are connected over telephone lines to terminals on the verticals of the line switches and trunks and originating registers are connected to terminals on the horizontals of the trunk switches. Line links interconnect the line switches with the line junctor switches, junctors interconnect the line junctor switches with the trunk junctor switches and trunk links interconnect the trunk junctor switches with the trunk switches in a well-known manner. Marker access to the line link frame LLFOO and trunk link frame TLFO is via the line link connector LLC and trunk link connector TLC, respectively.

It will be noted that the wideband network and voiceband network are dissimilar with respect to the number of stages in the networks and the manner in which the stages are interconnected. It is expected that initially not every telephone line will require wideband service, therefore the wideband network need not initially be provided with the same number of wideband terminations as the voiceband terminals in the audio network.

Networks in general have certain traffic characteristics dependent on the number of stages, linkage spread, etc. Unless the network is a nonblocking network the unavailability of linkages in the network will cause a certain percentage of calls to fail or block. A network is therefore classified as having a certain probability of blocking with a designated amount of traffic offered. When more than one network is used to complete a call the probability of the call blocking is usually greater than the probability of blocking in any one single network used on the call.

In accordance with another feature of the present invention the networks have been designed so there is no apparent increase in the probability of a call blocking when a wideband call is placed using two networks as compared to the audio-only call which uses only the one network.

Customer stations having wideband service can be connected directly to the wideband network at the central office or a group of stations can be served by a wideband remote switch unit such as that shown in FIGS. 41–47.

The wideband remote switch unit functions like a line concentrator to serve the wideband portion of a large number of stations over a smaller number of transmission paths to the central office. The wideband remote switch unit comprises a plurality of crossbar switches with customer wideband lines terminated on the verticals and remote links appearing on the horizontals. The other end of each remote link is terminated on a vertical of the wideband line switches at the central office. Some of the remote switching unit horizontals are equipped with intraremote switch trunks which are similar to the intraoffice trunks and serve the wideband portion of a call between stations served by the same wideband remote switch unit.

The wideband remote switch unit is controlled by the central office marker circuit and information is transmitted to the remote switch unit by the marker in a coded format. This information is then decoded by the remote switch unit and used to actuate select magnets and hold magnets on the remote switch unit. The facilities for transmitting control information between the central office and the remote switch unit are duplicated for service reliability.

The remote switch signal control circuit shown in FIGS. 37–40 is the instrumentality used by the marker for controlling the remote switch unit. The remote switch signal control circuit collects information and transmits this information to the wideband remote switch unit in the proper format. The signals are received from the marker, certain intraoffice audio trunks and from the wideband line control circuit.

Figure 35:
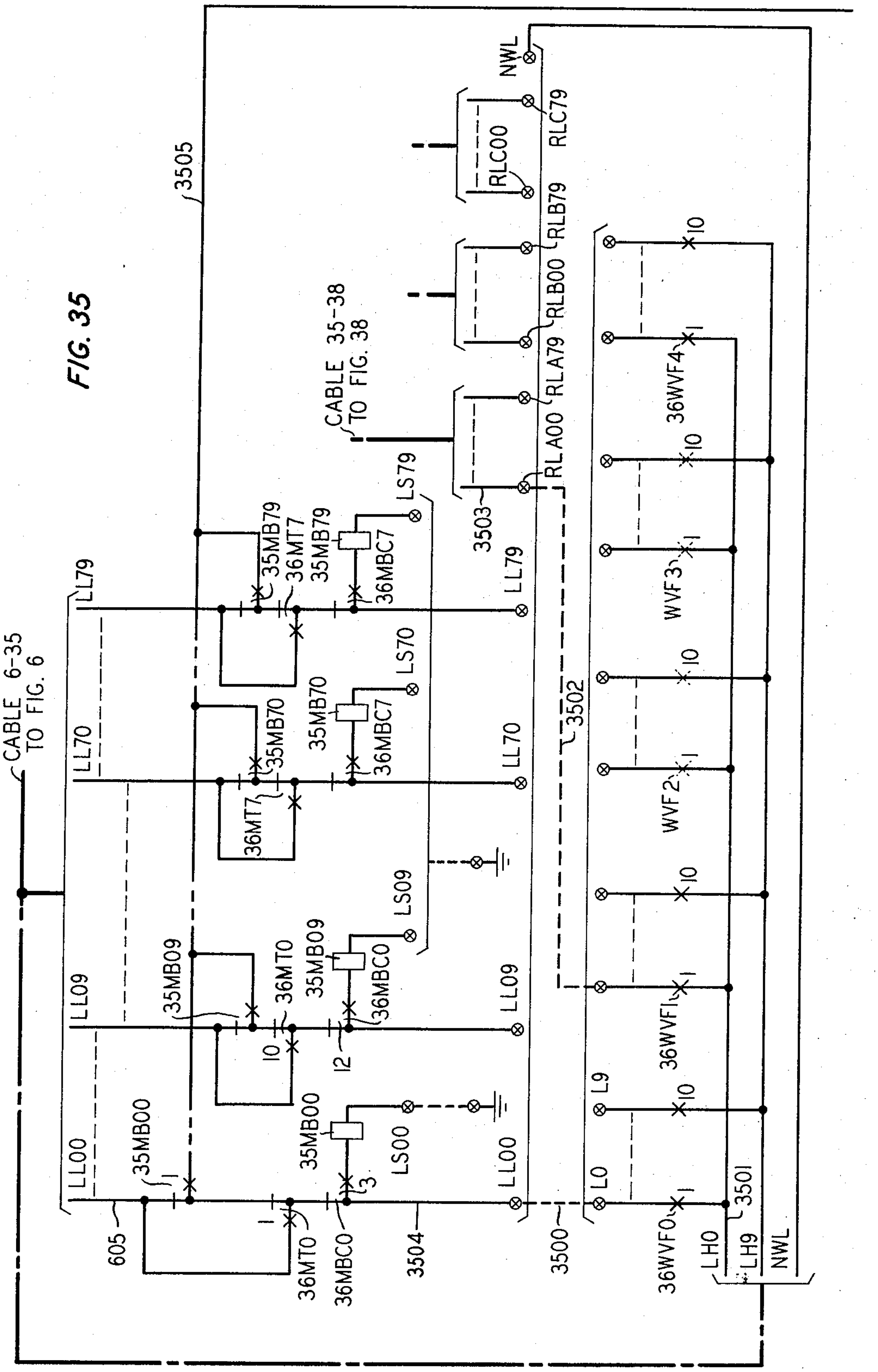
FIGS. 35 and 36, when arranged according to FIG. 48D, show a wideband line control circuit.
Figure 36:
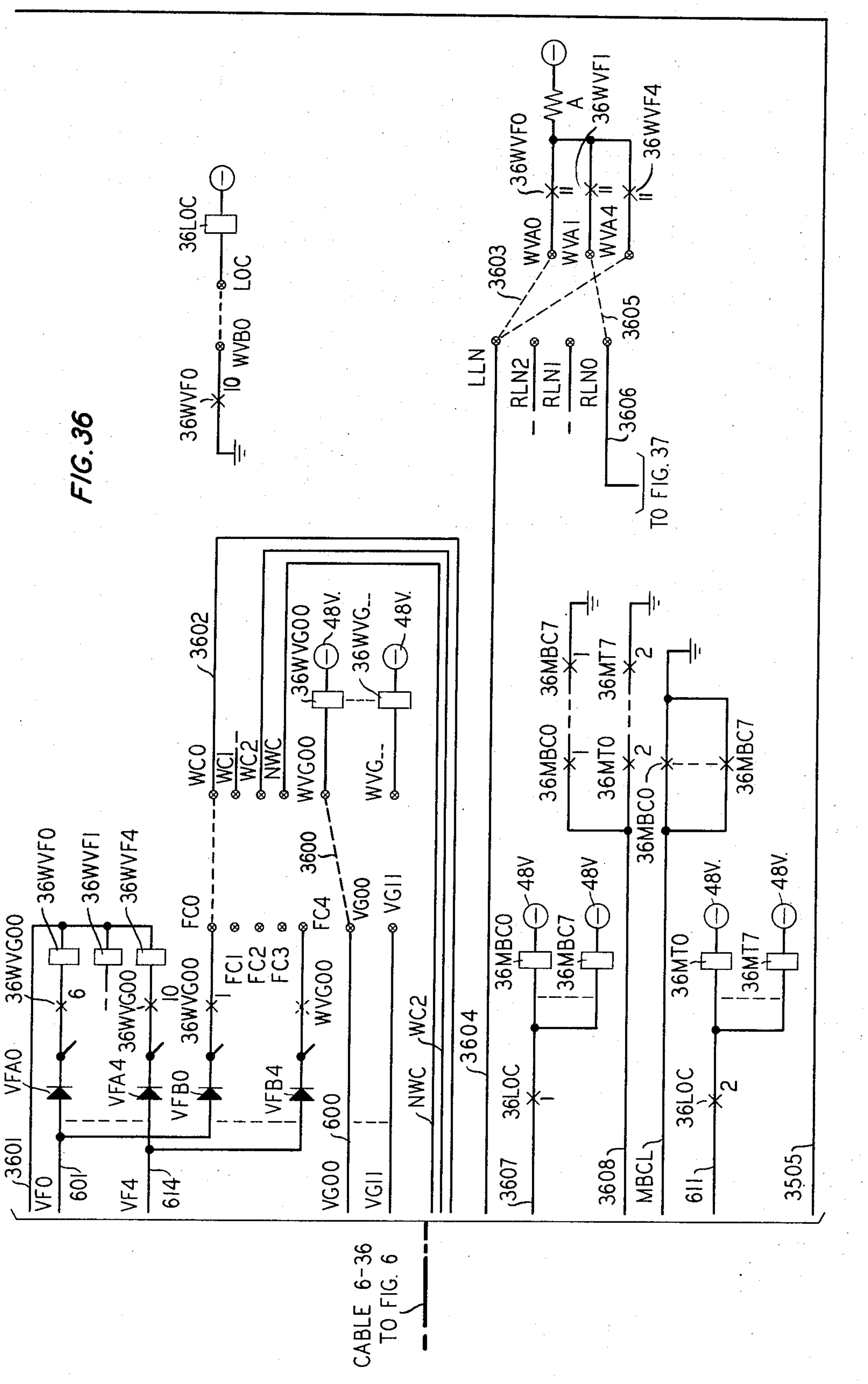

The wideband line control circuit shown in FIGS. 35 and 36 is used by the marker to ascertain whether or not a line has wideband service, to ascertain the location of the wideband line, and to determine the busy condition of the wideband line. The wideband line control WBLC functions for wideband lines connected directly to the wideband line link or connected to the wideband remote switch unit.

As mentioned above, connections are established through the system under control of a plurality of markers and other common control equipment. Only a portion of one marker and some of this equipment has been shown in FIGS. 19–34 to simplify the drawing.

While the details necessary for a full understanding of our invention have been disclosed herein, the reader will appreciate that a switching system may perform many other functions during call processing which are not pertinent to the present invention. The circuitry for performing these functions has been omitted from the drawing to simplify the disclosure. For a more complete disclosure of a telephone system which uses control circuitry similar to ours, the reader is directed to U.S. Pat. No. 2,585,904 to A. J. Busch of Feb., 1952. Of course, it will be obvious from the ensuing description, that our invention is not limited to the system set forth in the Busch disclosure.

Before describing the overall operation of the system, a few brief remarks will be given with respect to the reference designations. In general, the apparatus has been given a lettered reference designation representing the functional characteristics of the apparatus and the lettered designation is preceded by the figure number in which the apparatus appears. For example, relay 24WLBT is a "wideband line busy test" relay in the marker circuit and its winding appears in FIG. 24. Contacts of relays are designated numerically and, in this specification, the contact number will be preceded by the reference designation of the relay. See for example, contacts 24WLBT-8 of the aforementioned busy-test relay in FIG. 25. Where many conductors are extended between the figures of the drawing, the conductors are grouped in a cable. This cable is then designated by the numbers of the two figures between which the cable extends. For instance, cable 6-25 is a cable comprising a plurality of conductors extending between FIGS. 6 and 25.

Figure 13:
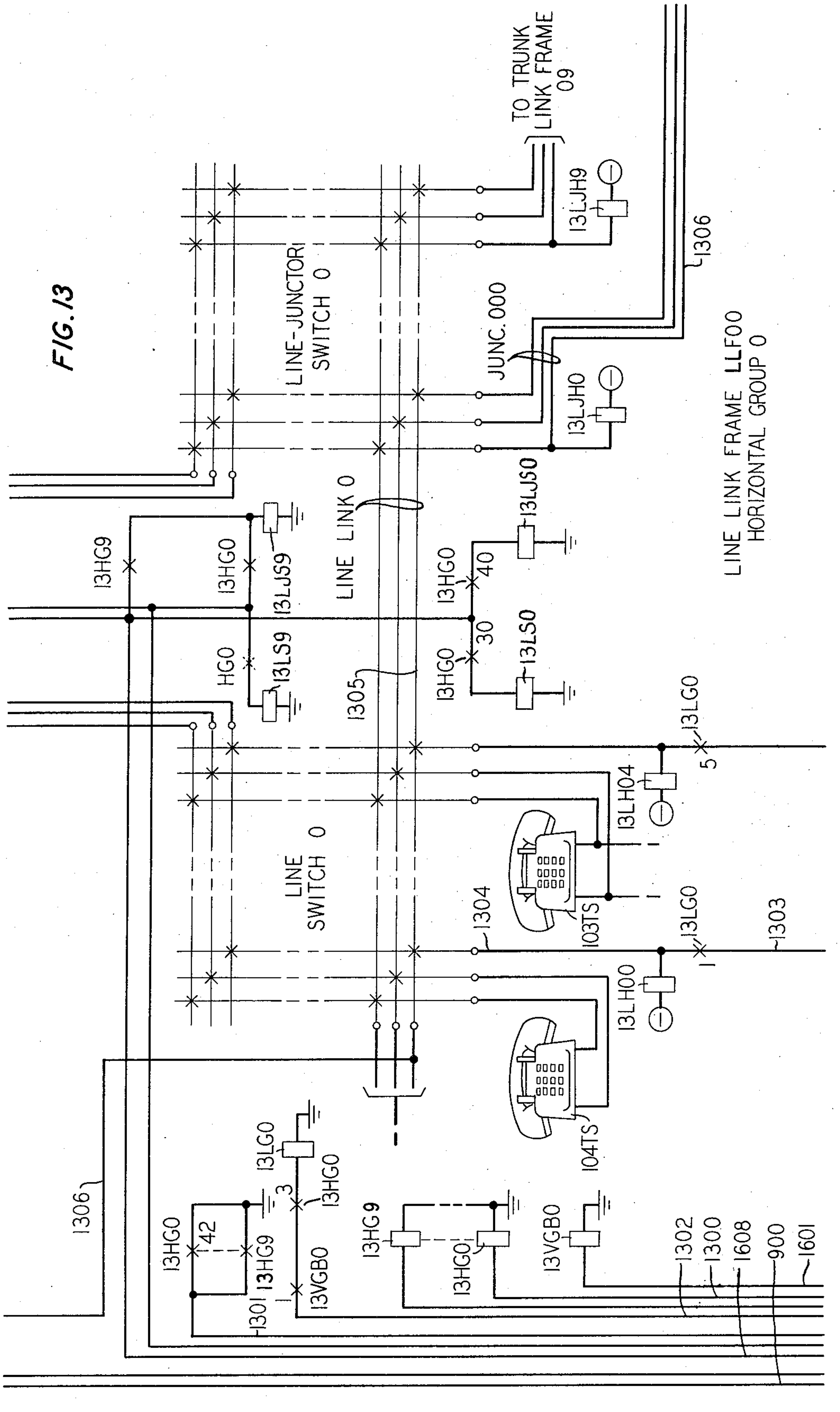
Figure 14:
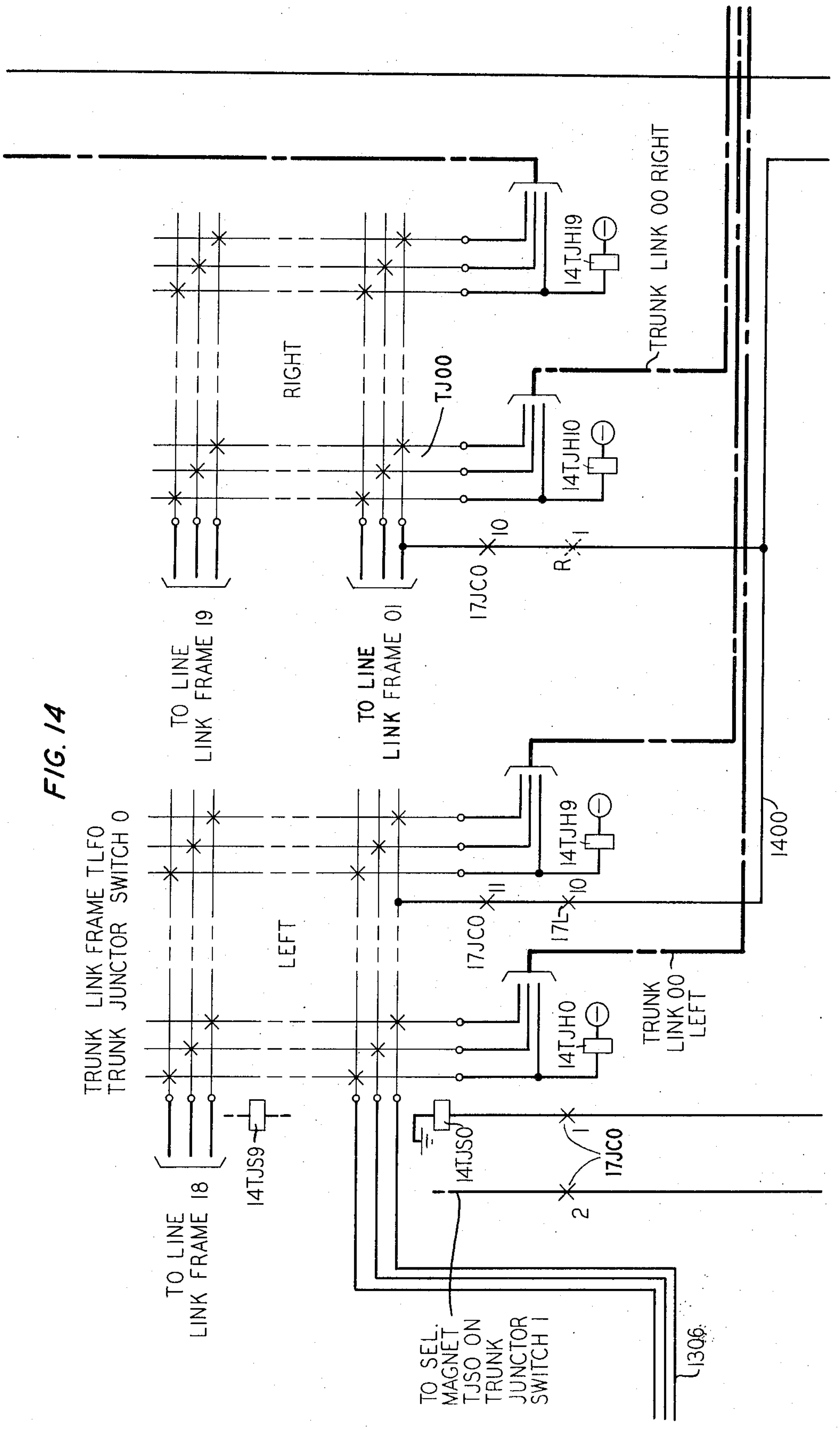
Figure 15:
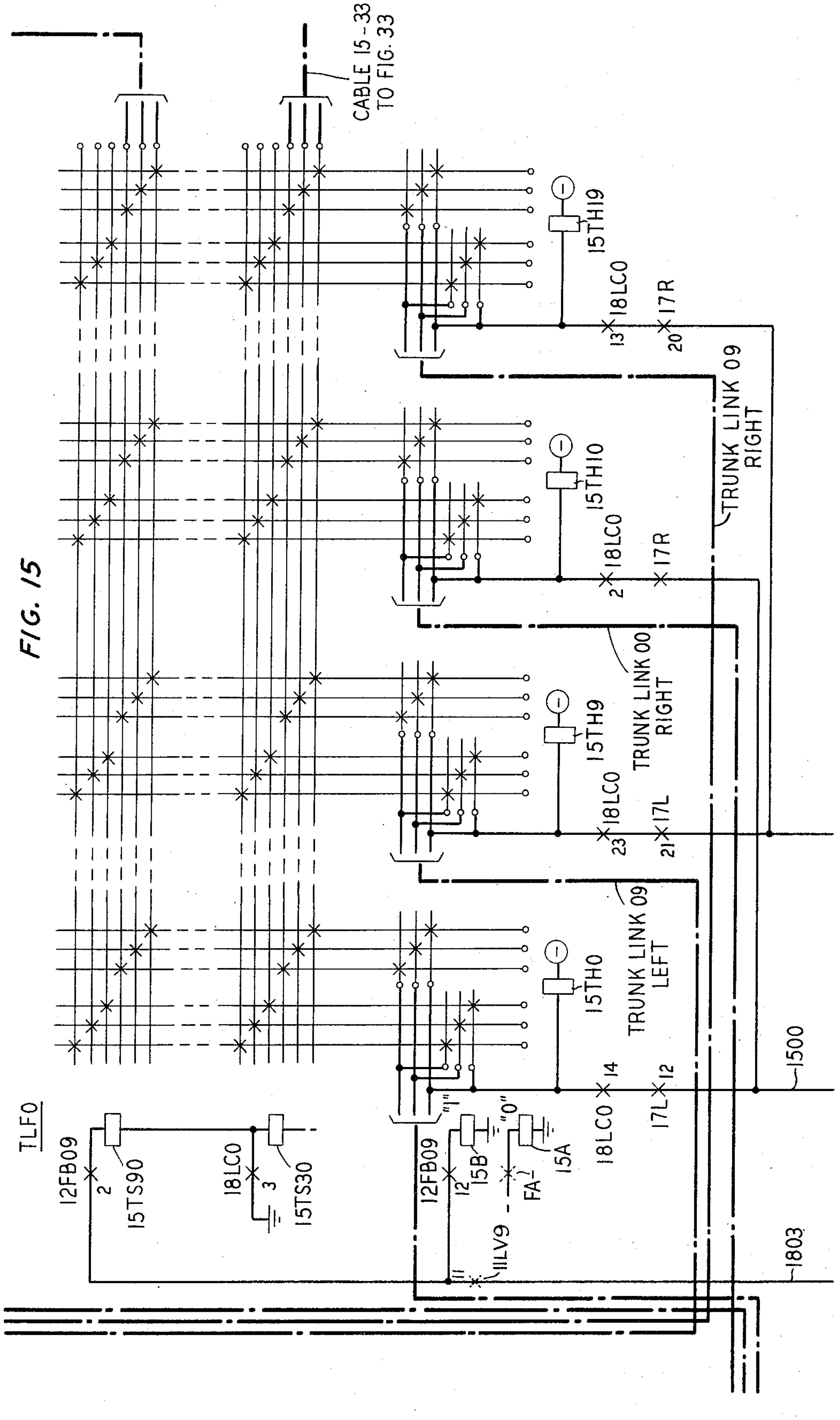

In order for the reader to obtain a better understanding of how this system operates, a description of several calls will be given. In the first call, it will be assumed that the customer at station 103 calls the customer at station 104. The telephone sets 103TS and 104TS for stations 103 and 104, respectively, are shown in FIG. 13 and are connected to line switch 0 of audio line link frame LLFO, while the corresponding video sets 103VS and 104VS are shown in FIG. 2 connected to switches 2LAO and 2LA9 of the wideband line link frame WLFO.

As set forth in the general description, when the customer at station 103 wishes to originate a visual telephone call or an audio-only call, he lifts the receiver of his telephone set 103TS and is connected to a dial tone originating register (shown in FIG. 33) over the audio network. The establishment of a dial tone connection is described in considerable detail in the aforementioned Busch disclosure and will not be described herein. When the dial tone connection is established, the calling customer's audio line equipment location and class of service is stored in the originating register and the customer receives dial tone. If the customer wishes to establish an audio-only call, the customer now begins transmitting the telephone number of the called customer. In the example being described, the telephone number comprises the three digit local office code followed by a four digit code assigned to the called customer. After the calling customer transmits these seven digits to the originating register, the register selects an idle marker which translates the called number into the equipment location of the called line. The marker also selects an idle intraoffice trunk and interconnects the calling and called stations via the selected trunk and channels on the audio line link and audio trunk link frames (FIGS. 9–15). The manner in which an audio-only intraoffice call is established is also described in the aforementioned Busch patent and will not be described in detail herein. For the purpose of this description, it will be assumed that the customer at station 103 wishes to establish a visual telephone call to the customer at station 104. It will also be assumed that customer telephone station 103TS has been connected over the audio network to originating register OR (FIG. 33) and the customer has transmitted to the register a special prefix plus seven digits of the telephone number of called station 104. The special prefix as described above will signal the switching system that a visual telephone connection is desired.

When originating register OR receives sufficient digits an idle marker is seized via marker connector ORMC. When the marker is seized, certain relays are actuated to prepare the marker for operation, these relays are the CKG1–CKG6, LLC1–LLC3, TLC1 and TLC2. While only the contacts of these relays have been shown to simplify the drawing, the reader can refer to the aforementioned Busch patent for a description of the operating circuits for these relays. After the originating register is connected to the marker, information is transmitted through the originating register marker connector ORMC to the marker for processing the call. The originating register forwards the audio line equipment location of the calling station 103TS in terms of the line link frame tens and units, vertical group, horizontal group and vertical file indication plus the class of service of the calling line in the form of a class tens and class units indication. The originating register also forwards the digits dialed by the calling customer in a two-out-of-five code format to the marker. As a result of the calling customer dialing a prefix indicating a visual telephone call, relay 33PP in the marker is operated. Relay 33PP operates its contacts 33PP-1 to provide an obvious operating circuit for relay 33PK.

The class of service tens relay 33CTO and class of service units relay 33CUO, which are operated by the originating register, complete a circuit for operating a class of service screening relay 33SO. This circuit includes contacts 33CTO-1 and 33CUO-1, marker equipment (not shown) and the winding of screening relay 33SO. Of course it will be realized that the drawing only shows a small portion of the class screening circuitry and, in reality, many other class treatments are furnished by circuitry now shown. With the class of service screening relay operated and relays 33PP and 33PK operated, a circuit is completed in FIG. 28 for operating a wideband request relay 28WBO. This circuit includes battery through the winding of relay 28WBO, make contacts 33SO-1, 33PP-2, 33PK-1 and CKG2 to ground. Had the calling customer not dialed the visual telephone prefix, relay 33PP would have been released and nonwideband request relay 28NW would have operated. On the other hand, if the calling customer is not entitled to wideband service, a different class of service screening relay S- may have been operated ultimately resulting in the operation of a route relay which would route the call to a reorder tone trunk. The tone trunk would then inform the calling customer that he has improperly dialed a visual telephone call.

Certain classes of services may include both wideband and nonwideband customers. In those cases the marker will utilize the wideband line control circuit to determine if an individual line is equipped for wideband service.

Figure 28:
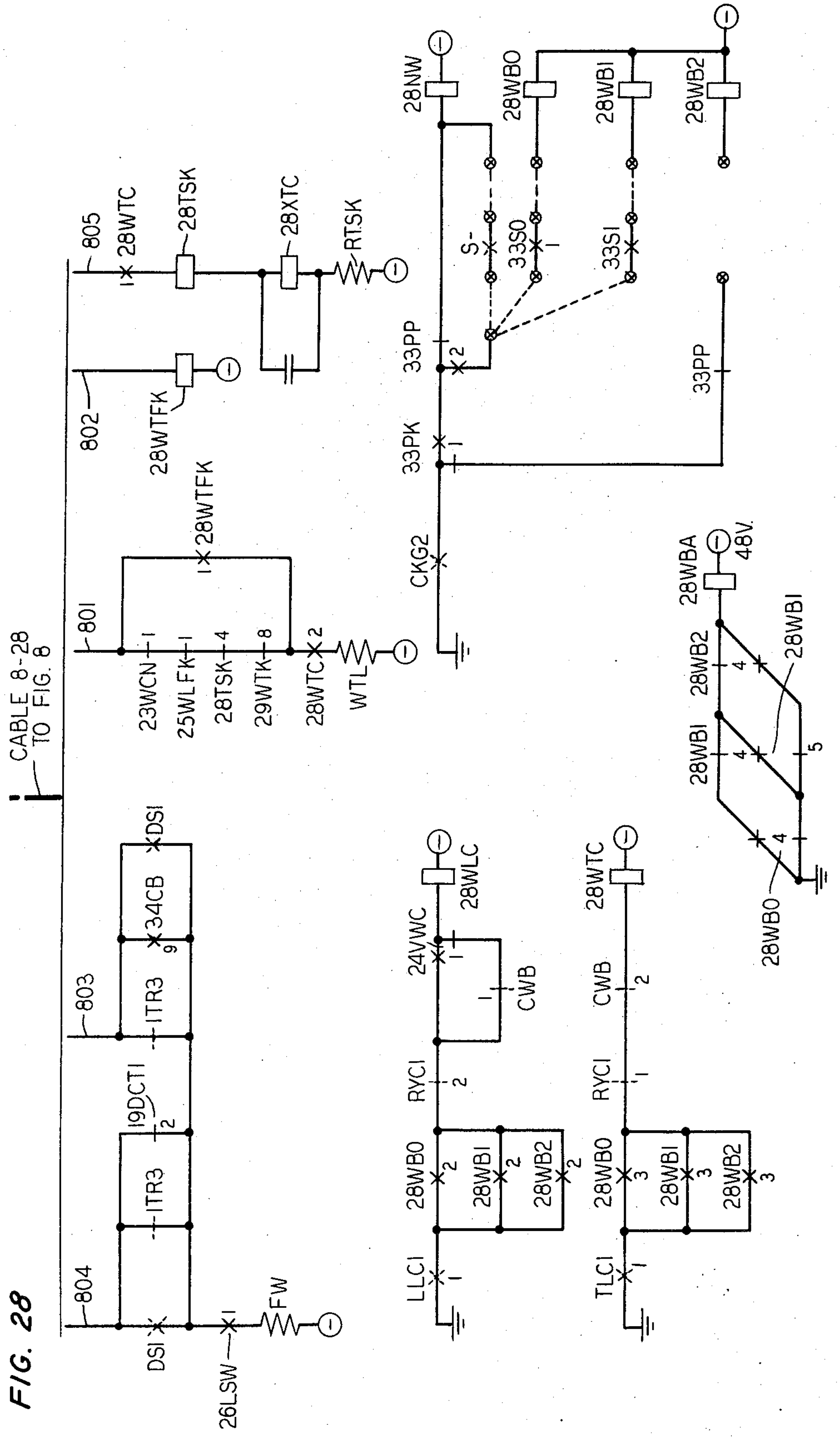

In the example being described, it has been assumed that the calling customer is equipped for visual telephone service and wideband request relay 28WBO has operated entitling him to wideband service. When any wideband request relay operates, auxiliary relay 28WBA in FIG. 28 also operates to check that only one wideband request relay has operated. With relay 28WBO operated, circuits are completed for operating wideband line link control relay 28WLC and wideband trunk link control relay 28WTC. The circuit for operating relay 28WTC is shown in FIG. 28 and includes battery through the winding of relay 28WTC, break contacts CWB-2 and RYC1-1 and make contacts 28WBO-3 and TLC-1. Relay 28WLC operates over a circuit including battery through its winding, break contacts 24VWC-1, CWB-1 and RCY1-2 and make contacts 28WBO-2 and LLC1-1. Relays 28WLC and 28WTC prepare the marker for operation with the wideband line and trunk links.

Figure 26:
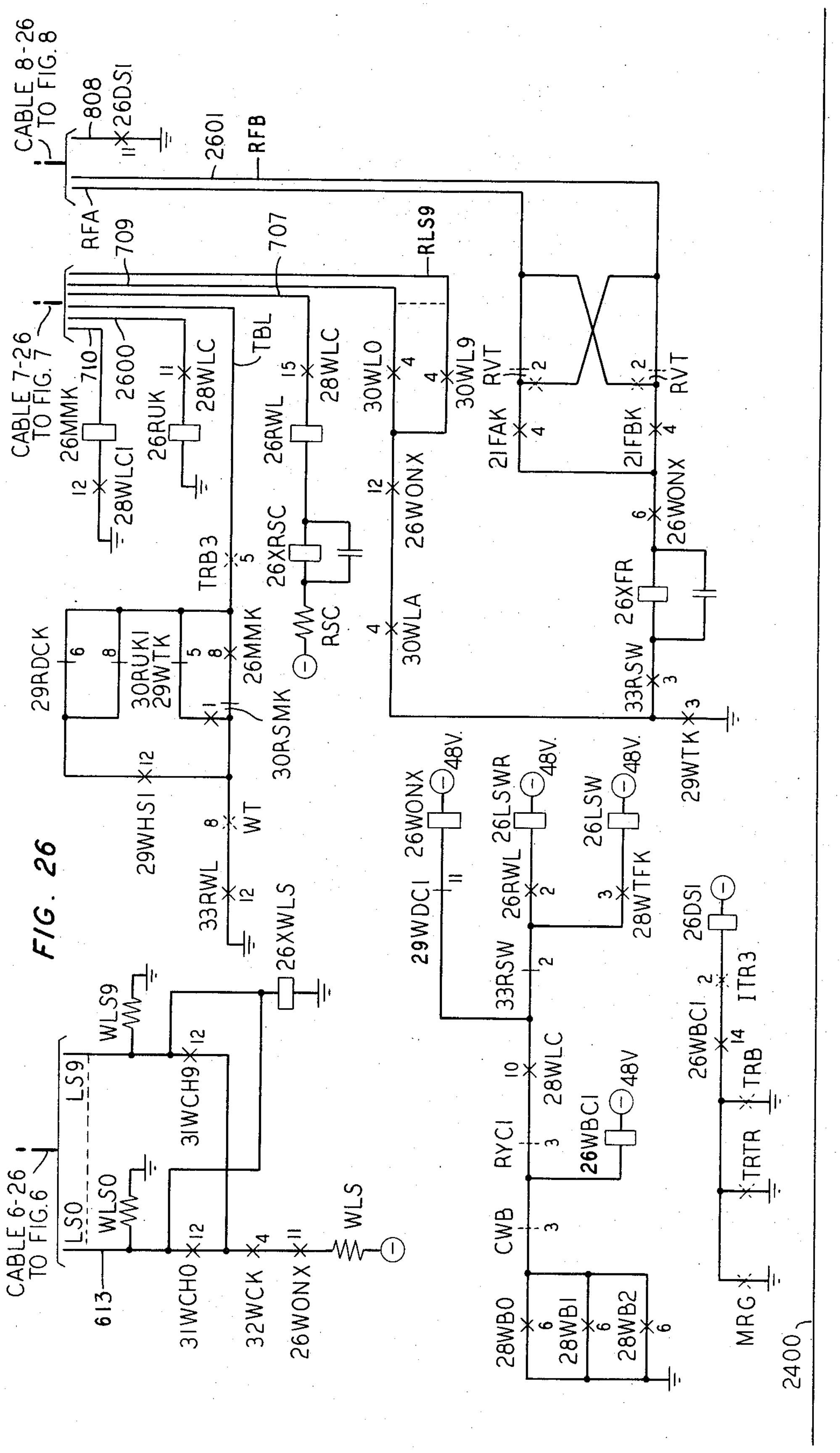

Relay 28WBO also closes its contacts 28WBO-6 in FIG. 26 to provide an obvious operating circuit for wideband control relay 26WBC1. In operating, relay 26WBC1 prepares many circuits in the marker for wideband operation as will be described below. For example, at its contacts 26WBC1-6 in FIG. 24 relay 26WBC1 operates relay 24VWC. The same ground that operated relay 26WBC1 is also extended through contacts RYC1-3, 28WLC-10 and 29WDC1-11 to operate relay 26WONX.

The office code digits dialed by the customer are now coupled to a called directory number translator 3300 which translates the ABC code into a one-out-of-N indication that appears as a ground on one of the code points. The code points can be cross-connected through various screening relays and route relays to give each three digit office code a distinct routing treatment. In the example being described, the local office code point will be grounded and this code point is cross-connected to punching 3301 which extends a path for operating one of several route relays depending on which screening relay is operated. Since wideband request relay 28WBO is operated, route relay 33RR1 operates.

Figure 12:
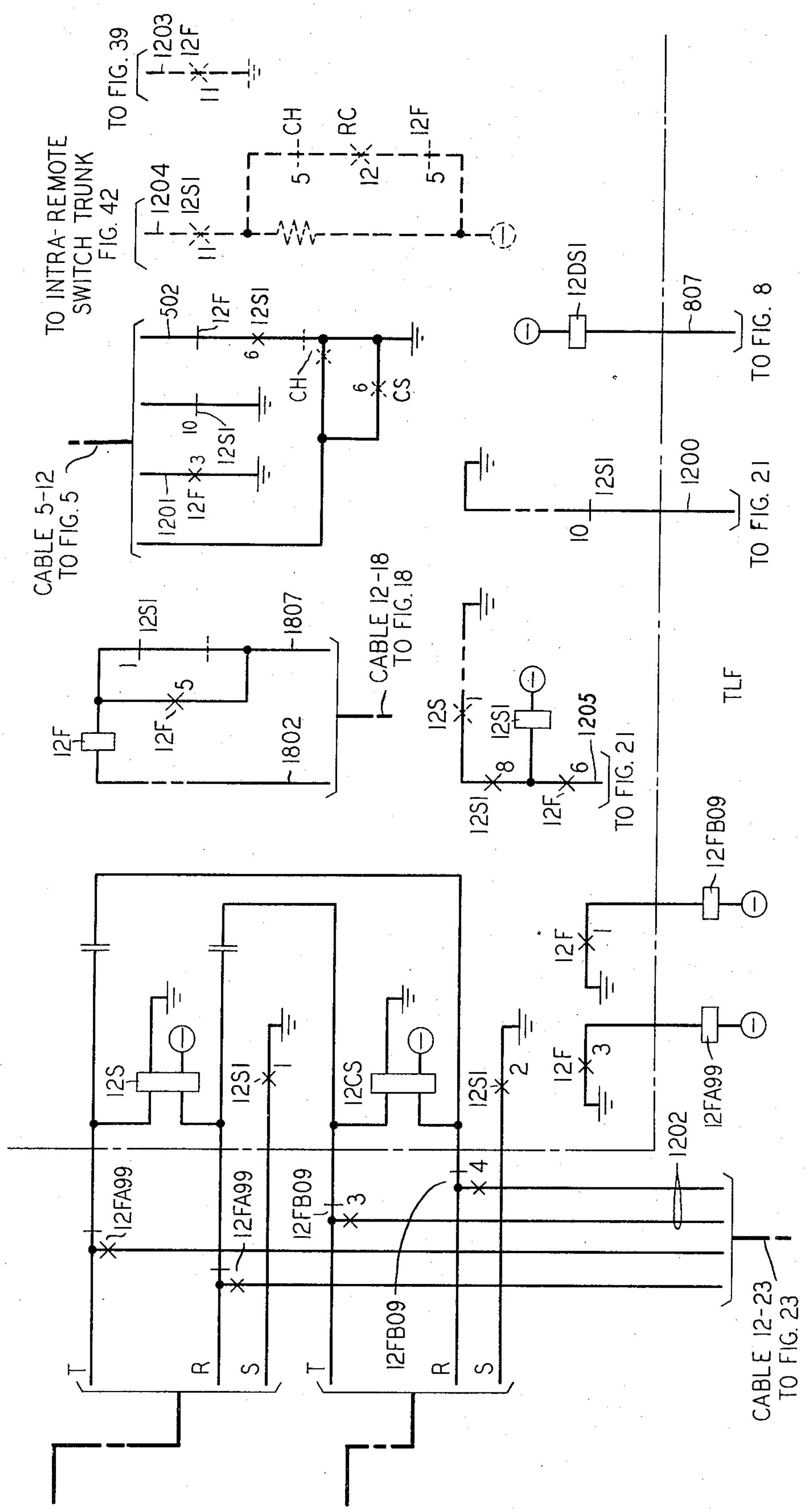

Route relay 33RR1 is associated with intraoffice trunks arranged for visual telephone service. When route relay 33RR1 operates, it prepares the marker for selecting an idle trunk by furnishing busy-test leads to the appropriate trunks. As described above, a visual telephone call requires an audio communication path via an audio trunk connected to the audio network and also a video communication path via a wideband trunk connected to the wideband network. Each wideband trunk therefore has a corresponding audio counterpart and selection of both audio and wideband trunk circuits is accomplished by testing the audio trunk circuit. To equalize traffic in the networks, the trunks in each route are spread over many trunk link frames. Each trunk connected to the audio network has a test conductor which is extended to the marker by the operation of the route relay associated with that trunk. For example, the intraoffice trunk shown in FIG. 12 is assumed to be idle and, in its idle condition, the intraoffice trunk extends ground through equipment not shown and contacts 12S1-10, over conductor 1200, through contacts 33RR1-11 and through the winding of relay 21FTC to battery. Relay 21FTC operates indicating that there is at least one idle intraoffice trunk on that trunk link frame. In addition, at any given time, only one marker is permitted to work with a trunk link frame. The marker therefore has facilities for testing which of the audio trunk link frames are busy with other markers. Trunk link frame TLF appears idle to the marker by the released condition of frame busy relay 21FB in FIG. 21. With frame busy relay 21FB released and relay 21FTC operated, an obvious circuit is completed for operating frame select relay 21FSO.

Figure 18:
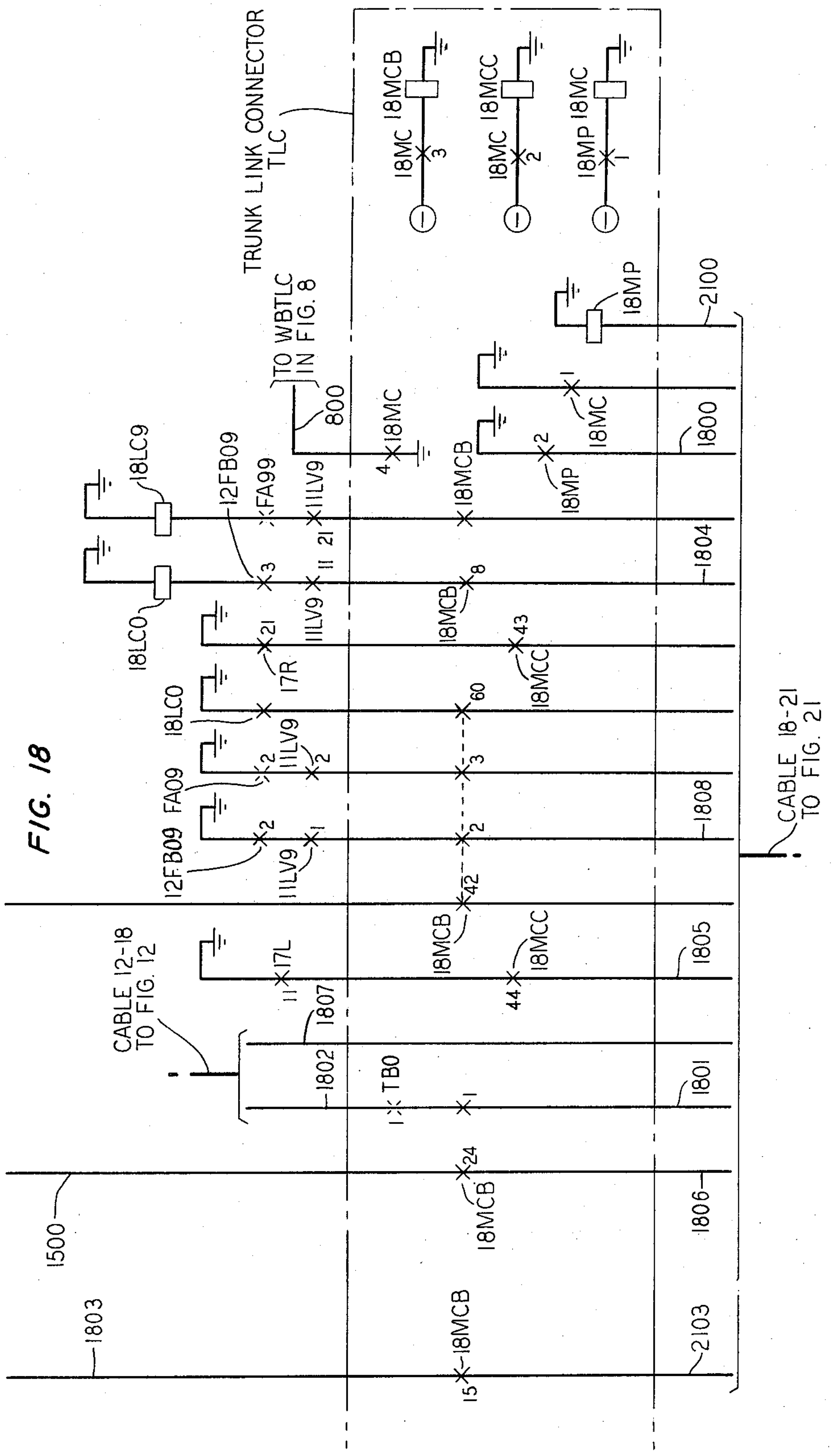
Figure 21:
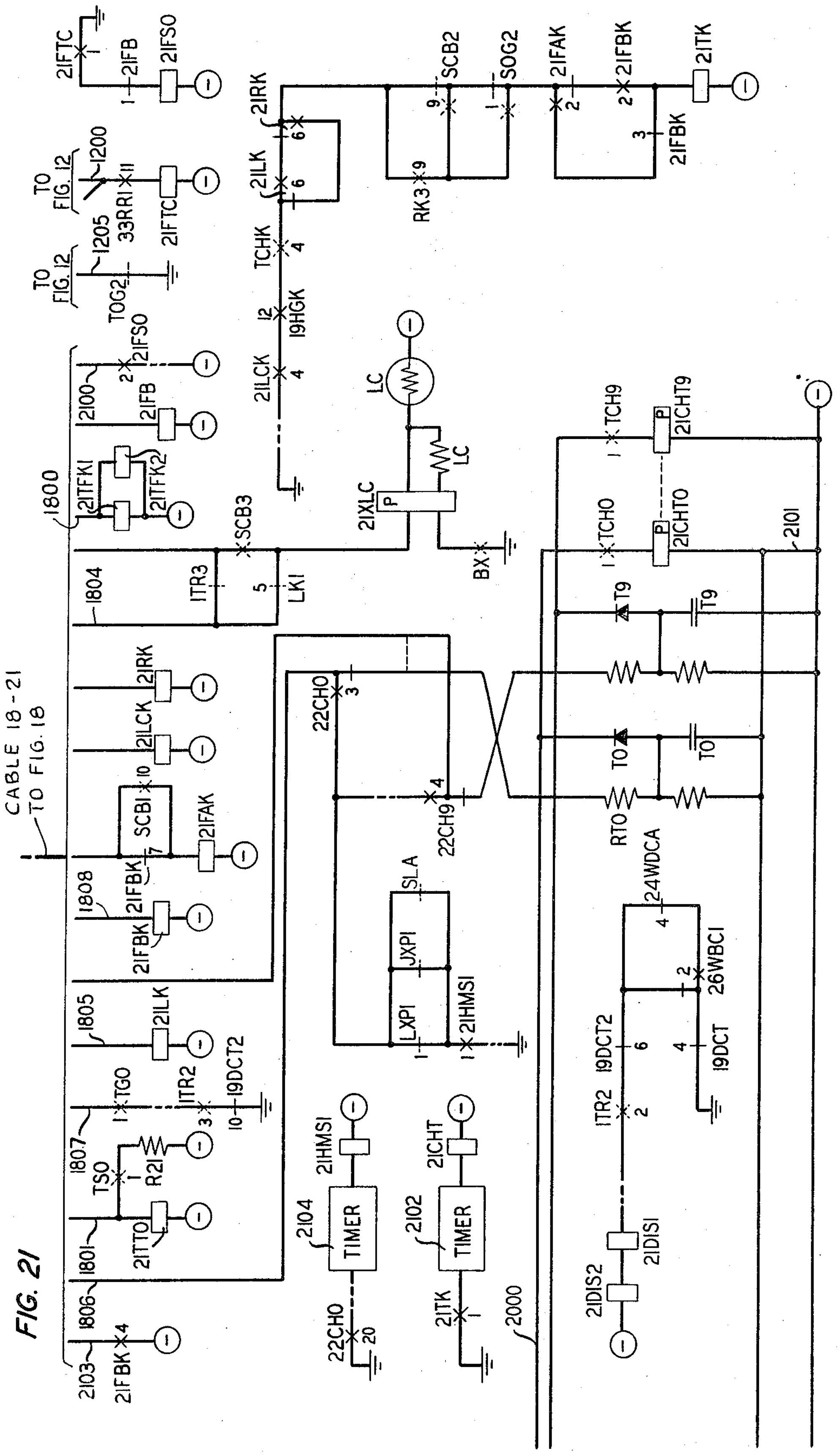
Figure 22:
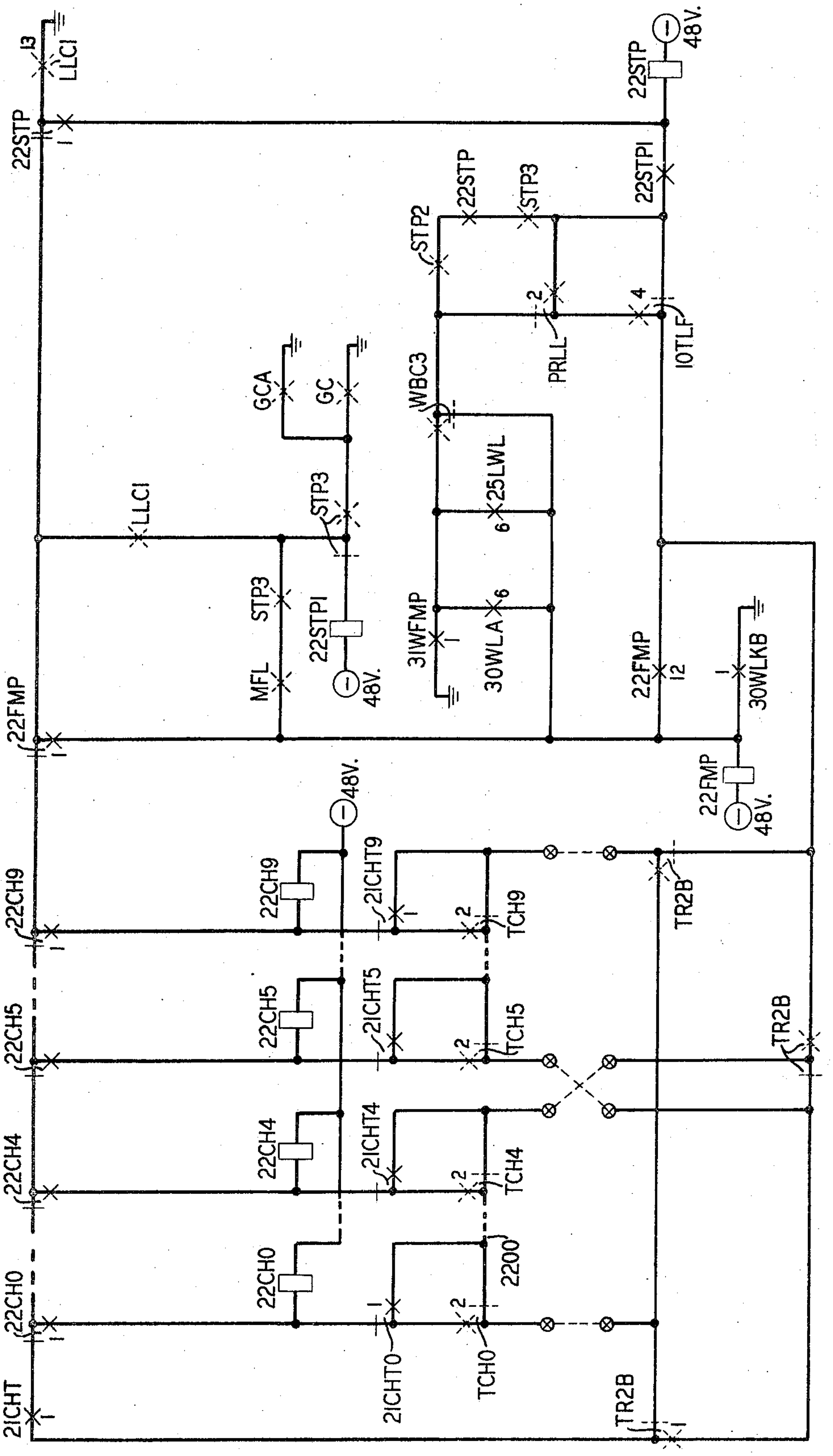

When relay 21FSO operates, battery is extended through marker equipment not shown, contacts 21FSO-2 in FIG. 21 and over start lead 2100 in cable 18–21 to FIG. 18 and through the winding of marker preference relay 18MP to ground operating relay 18MP in trunk link connector TLC. Relay 18MP will operate if no other markers are attempting to seize trunk link frame TLF. When relay 18MP operates, it closes its contacts 18MP-1 to operate multicontact relay 18MC and relay 18MC operates multicontact relays 18MCB and 18MCC over obvious circuits. In operating, these multicontact relays extend a plurality of test and control conductors from trunk link frame TLF to the marker so that the marker can select a particular trunk on the trunk link frame. Relay 18MC also operates relay 21FB and similar relays in other markers thereby indicating to the markers that trunk link frame TLF is now busy.

When relay 18MC operates, it also extends ground through its contacts 18MC-4 over conductor 800 to FIG. 8 through the winding of relays 8MA and 8MB in the wideband trunk link connector WBTLC, over conductor 801 in cable 8-28 to FIG. 28 through break contacts 23WCN-1, 25WLFK-1, 28TSK-4, and 29WTK-8, through make contacts 28WTC-2 and through resistance WTL to battery. Relays 8MA and 8MB operate to extend a plurality of test and control leads from the wideband trunk link to the marker. When relays 8MA and 8MB operate, ground is extended through make contacts 8MB-6 and 8MA-28 over conductor 802 in cable 8-28 to FIG. 28 and through the winding of relay 28WTFK to battery operating relay 28 WTFK. When relay 28WTFK operates, it indicates to the marker that the wideband trunk link switch WBTLO has been seized.

Relay 28WTFK, in operating, also completes a circuit for operating relay 26LSW. This circuit can be traced in FIG. 26 from battery through the winding of relay 26LSW through make contacts 28WTFK-3, break contacts 33RSW-2 and over the previously traced circuit to ground on contacts 28WBO-6. When relay 26LSW operates over this circuit, it indicates to the marker that this is a locally switched wideband call which does not require the use of the wideband remote switch unit.

Turning now to FIG. 18, when the audio trunk link was seized via trunk link connector TLC, relay 18MP operated contacts 18MP-2 to extend ground over conductor 1800 in cable 18-21 to operate relays 21TFK1 and 21TFK2 in the marker. Relays 21TFK1 and 21TFK2 indicate to the marker that the audio trunk link frame has been seized and the marker can now proceed with a selection of an idle trunk.

When the marker is connected to the audio trunk link frame TLFO, a group of busy test leads is extended from the marker to the trunk link frame. The trunks on a trunk link frame are divided into trunk blocks each with a maximum of 20 trunks. While a trunk block may contain trunks to many routes, all trunks in a route must be in the same trunk block. The trunk block and the location of the trunks for a route are determined by the operation of the route relay.

When route relay 33RR1 operated, it completed operating circuits (not shown) for trunk block relay TBO and trunk group relay TGO. With these relays operated, the busy test leads for the audio intraoffice trunks on trunk link frame TLFO are extended to the marker. Only one of these circuits is shown and this circuit can be traced from battery through the high resistance winding of relay 21TTO, over conductor 1801 in cable 18-21, through make contacts 18MCB-1 and TBO-1, over conductor 1802 in cable 12-18 to the audio intraoffice trunk circuit in FIG. 12 through equipment not shown and through the winding of relay 12F, through contacts 12S1-1 and back over conductor 1807 in cables 12-18 and 18-21 to FIG. 21 through make contacts TGO-1, through marker equipment not shown and through contacts ITR2-3 and 19DCT2-10 to ground. Relay 21TTO operates over this circuit indicating that the trunk is idle but relay 12F in the audio trunk circuit does not operate at this time. Other relays (not shown) similar to relay 21TTO may also operate indicating that other audio intraoffice trunks are idle and the marker must select one from the group.

In the marker there is a sequence circuit which advances for each marker usage. Although many units of equipment may be idle, the sequence circuit is used to select different units of equipment on each marker usage to equalize the traffic over all the equipment. In example being described, it will be assumed that sequence relay TSO has been operated and it closes its contacts TSO-1 in FIG. 21 to connect low resistance battery through resistance R21 to the previously traced circuit. Relay 12F in the audio intraoffice trunk now operates and relay 21TTO in the marker remains operated. In operating, relay 12F completes a circuit for operating slow release relay 12S1. This circuit includes ground over conductor 1205 from the marker, contacts 12F-6 and battery through the winding of relay 12S1. Relay 12S1 makes the trunk test busy and prepares a circuit for holding the connection after the channel is established. Audio intraoffice trunks have two appearances on the audio trunk link frame. These appearances are connected to the calling and called lines over separate channels. The marker determines if the called line is busy and establishes a connection to the called line first before connecting the intraoffice trunk with the calling line. When relay 12F operates in the audio intraoffice trunk, it operates two relays on trunk link frame TLF to partially extend test leads from each appearance of the trunk to the marker. These relays are designated 12FA99 and 12FB09 and their operating circuits are shown in FIG. 12. When either of these relays operate, a circuit is completed in FIG. 11 for operating relay 11LV9. With relays 12FA99, 12FB09 and 11LV9 operated, a plurality of circuits is extended from the audio trunk link frame to the marker. For example, ground through the winding of relay 18LCO is extended through contacts 12FB09-3, 11LV9-11, 18MC-8, over conductor 1804, through contacts LK1-5 and the winding of relay 21XLC to battery.

Relay 21FBK now operates indicating to the marker the FB- and LV-relays on the audio trunk link frame have operated. The operating circuit for relay 21FBK includes battery through its winding, conductor 1808 in cable 18-21, make contacts 18MCB-2, make contacts 11LV9-1 and ground through make contacts 12FBO9-2. Relay 21FAK does not operate at this time.

While the marker has been setting up connections to the audio trunk link frame TLFO, the marker is also busy preparing for operation with the wideband intraoffice trunk. When relay 12F in the audio intraoffice trunk operated, it extended ground through its make contacts 12F-3 over conductor 1201 in cable 5-12 to FIG. 5 and through the winding of relay 5F to battery operating relay 5F in the wideband intraoffice trunk.

Figure 5:
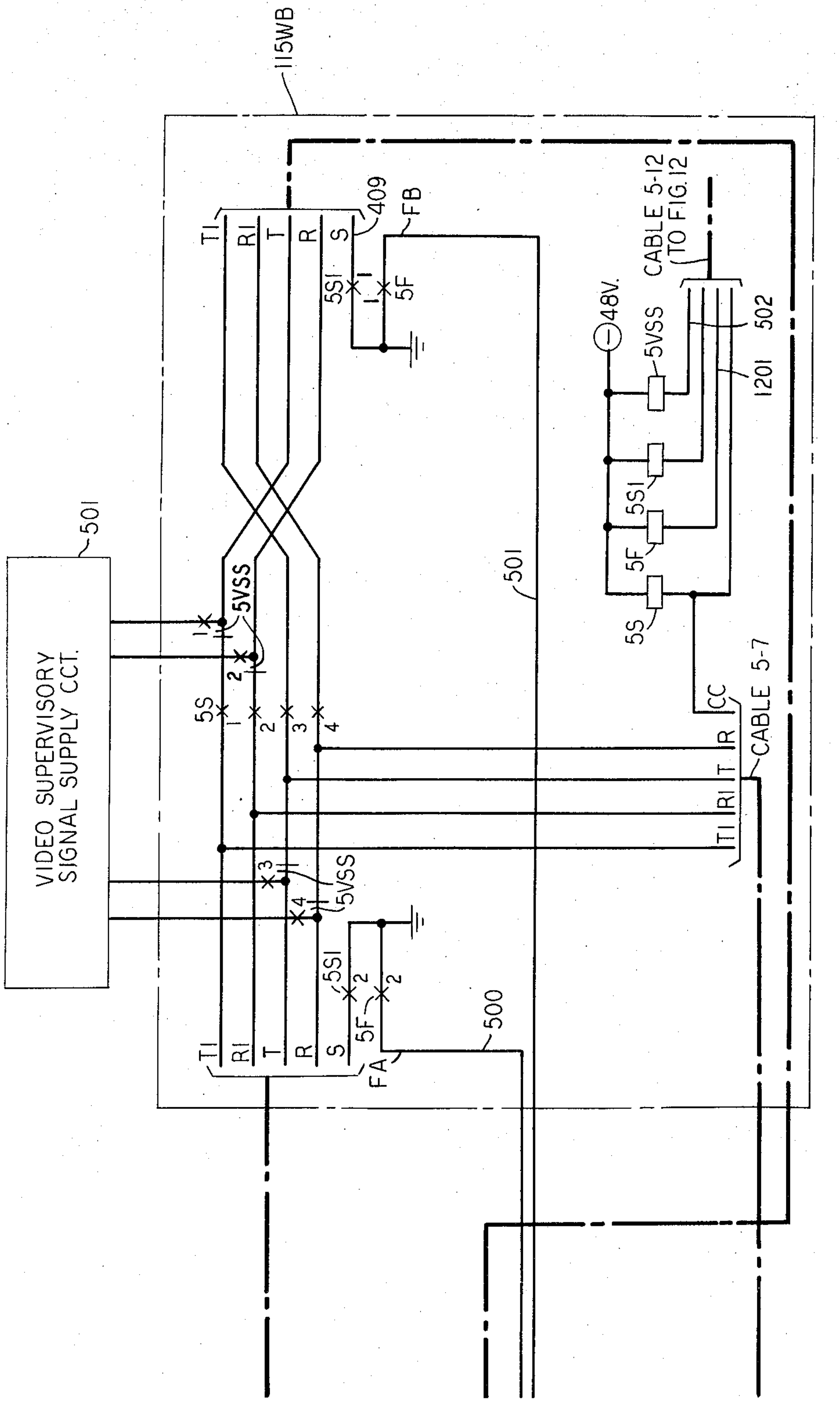

Relay 5F, in operating, closes its contacts 5F-1 in FIG. 5 to extend ground over conductor 501 to FIG. 4 through the winding of relay 4FO over conductor 401 through make contacts 8MB-4 over conductor 804 in cable 8-28 to FIG. 28 and through break contacts 19DCT1-2, make contacts 26LSW-1 and resistance FW to battery. Relay 4FO operates at this time. Relays 4F- on the wideband trunk link prepare paths for operating select magnets on the wideband trunk link.

Each trunk, therefore, operates a different 4F- relay corresponding to the level to which the wideband trunk is connected.

When relay 4FO operates, it closes its contacts 4FO-1 to extend ground over conductor 402 and through the winding of relay 8T in the wideband trunk link connector WBTLC. Relay 8T operates connecting ground from resistance TSK through make contacts 8MA-29 over conductor 805 in cable 8-28 to FIG. 28 through contacts 28WTC-1, the winding of trunk switch check relay 28TSK and cross detection relay 28XTC to battery through resistance RTSK. Relay 28TSK operates indicating to the marker that a trunk switch relay (T-) has operated but relay 28XTC does not operate at this time since relay 28XTC only operates if more than one relay T- operates.

Up to this point, the marker has ascertained this to be an intraoffice call and has seized an idle trunk on both audio and wideband trunk link frames. The marker is now ready to determine the location of the called line. To determine the audio line link location of the called line, the marker uses a number group circuit. Each number group circuit is used to translate 1000 directory numbers and the marker will seize the proper number group by using the thousands digit of the called number. The hundreds, tens and units digits of the called number are then translated by the number group into the audio line location in terms of the line link frame number, vertical group, horizontal group and vertical file. The manner in which a directory number is translated into a line equipment location is set forth in considerable detail in the above-identified Busch patent and need not be reiterated herein. Instead it will be assumed that the marker has seized number group NG in FIG. 33; and after forwarding a directory number to the number group NG, the marker receives the line equipment location for telephone station 104TS. This location is registered on relays 33FTTO, 33FUTO, 33VGTO, 33HGTO and 33VFTO.

The marker is now ready to seize the audio line link frame LLF on which telephone station 104TS is terminated. With frame tens relay 33FTTO and frame units relay 33FUTO operated, a circuit is completed in FIG. 19 for connecting battery to the start lead associated with line link frame LLF. This circuit can be traced from battery through marker equipment not shown, make contacts LLC1-6 and 21TFK2-1, 33FUTO-8 and 33FTTO-1 over conductor 1900 in cable 16-19 to FIG. 16 and through the winding of marker preference relay 16MP. Relay 16MP operates if line link frame LLF is idle and no other markers are simultaneously bidding for the same line link frame. When relay 16MP operates, it closes its contacts 16MP-1 to operate multicontact relay 16MC over an obvious operating circuit. Relay 16MC at its contacts 16MC-2 and 16MC-3 closes obvious operating circuits for multicontact relays 16MCA and 16MCB. Relay 16MC also closes its contacts 16MC-1 to complete a circuit for operating check relay 19LFK which indicate to the marker that the audio line link frame has been seized and is ready for operation with the marker.

When multicontact relays 16MC, 16 16MCA and 16MCB operated, a plurality of test and control leads were extended from the audio line link frame to the marker. Relay 16MC extends ground over conductor 1609 in cable 16-19 to operate relay 19LFK indicating to the marker that the line link is ready for operation. The marker can now seize and test the called line for busy. With relay 33VGTO operated, battery is extended through contacts 33VGTO-8 over conductor 1600 in cable 16-19, through contacts 16MCA-31 over conductor 1601 to FIG. 13 and through the winding of relay 13VGBO to ground thereby operating the relay 13VGBO. A similar circuit is completed for operating relay 13HGO on line link frame LLF. This circuit includes ground through the winding of relay 13HGO, conductor 1300 to FIG. 16, make contacts 16MCA-21 conductor 1602 in cable 16-19, contacts 33HGTO-5, marker equipment not shown, and battery through make contacts LLC1-7.

Figure 16:
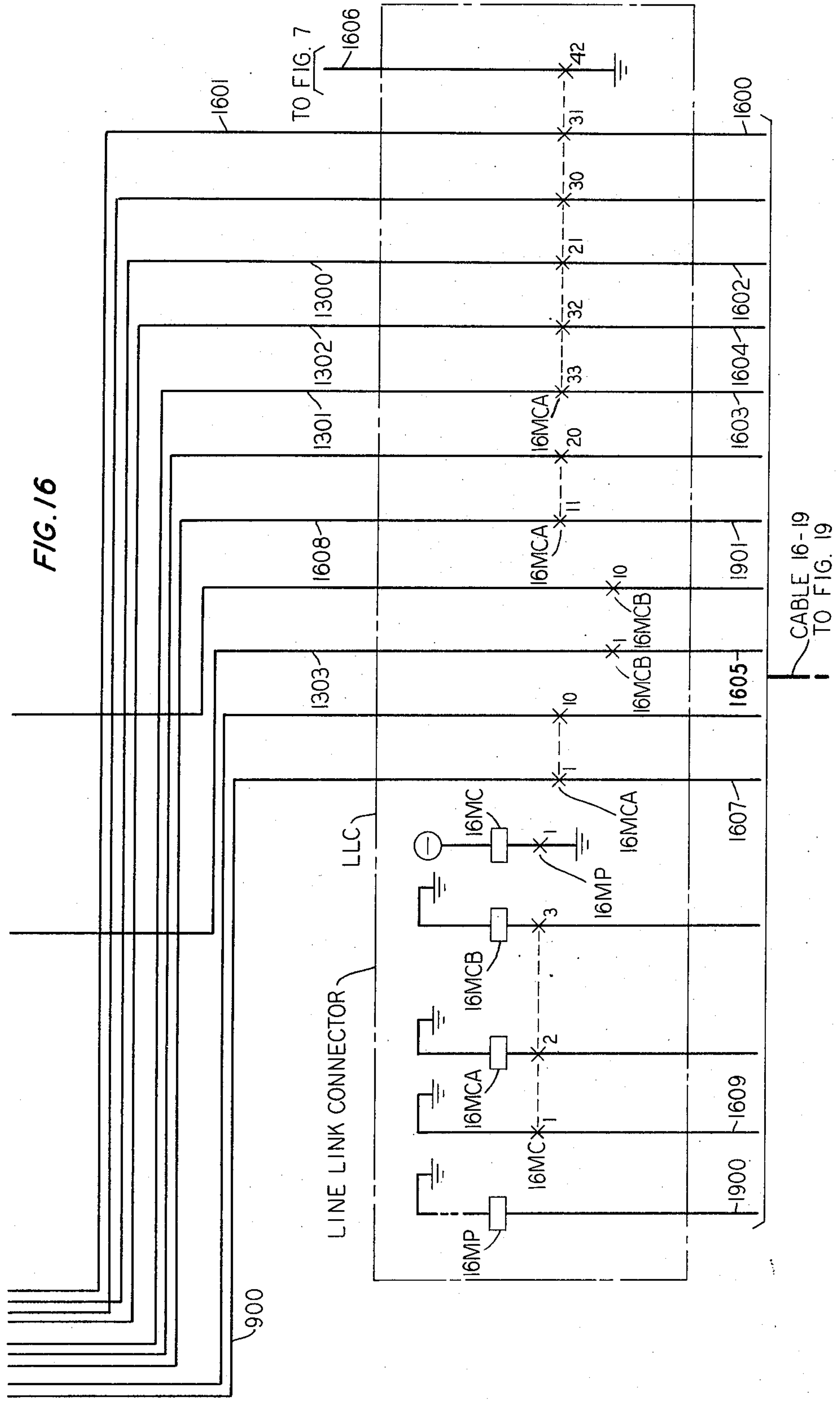
Figure 17:
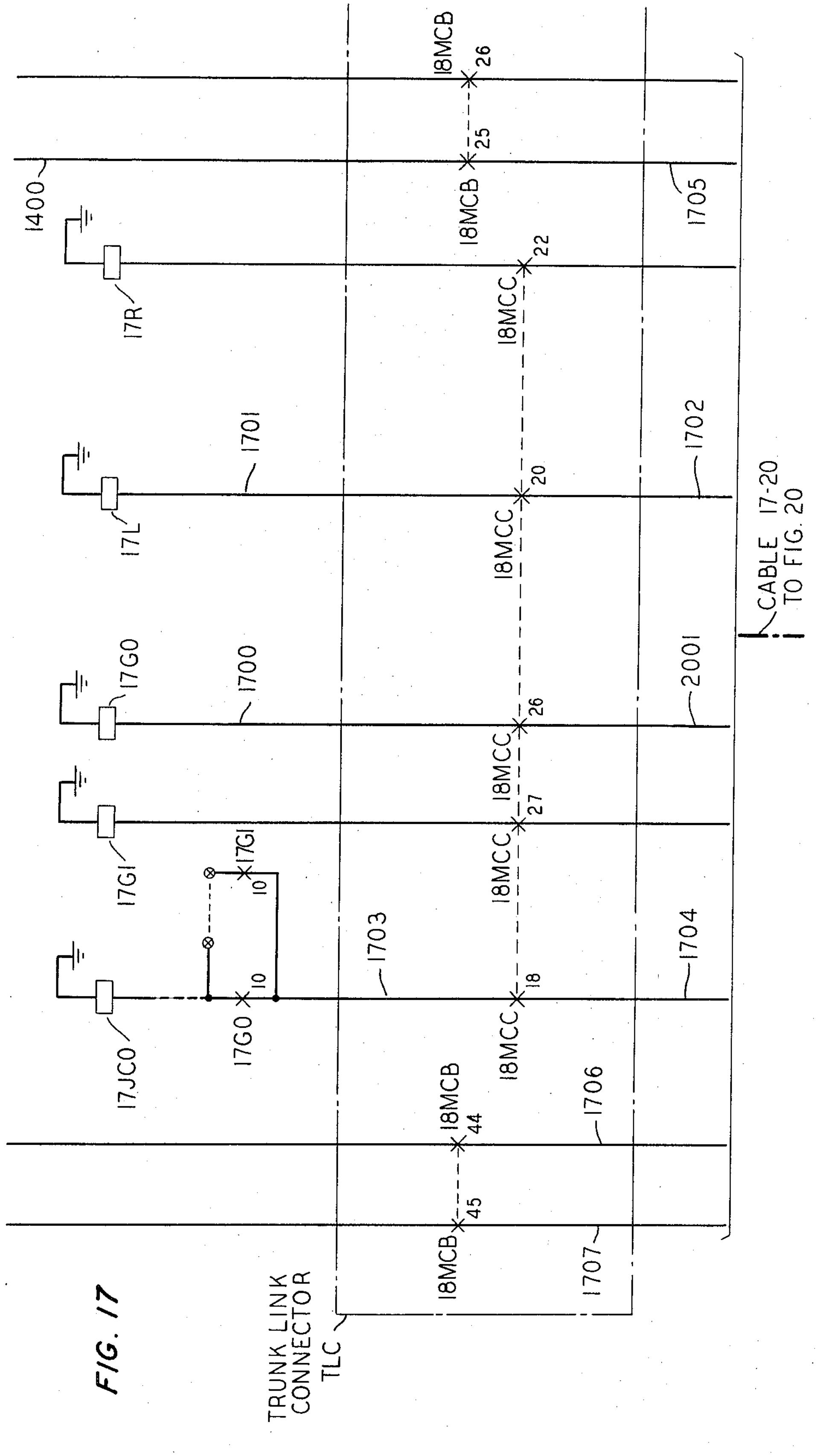

When relay 13HGO operates, it closes its contacts 13HGO-42 and FIG. 13 to extend ground over conductor 1301 to FIG. 16 through contacts 16MCA-33 over conductor 1603 in cable 16-19 and through the winding of relay 19HGK to battery. The operation of relays 13VGBO and 13HGO on the line link frame identifies the line group within which the called line is located, and these relays together with relay 19HGK complete a circuit for operating line group relay 13LGO. This circuit includes ground through the winding of relay 13LGO, make contacts 13HGO-3 and 13VGBO-1, conductor 1302 to FIG. 16, make contacts 16MCA-32, conductor 1604 in cable 16-19, contacts LLC1-10 and 33HGK-1. Relay 13LGO, in operating, extends five busy test circuits connected to the sleeve conductors of the five audio lines in the selected line group. The circuit associated with the telephone set 104TS extends from battery through the winding of line hold magnet 13LHOO, make contacts 13LGO-1, conductor 1303, make contacts 16MCB-31 over conductor 1605 in cable 16-19, through contacts 33VFTO-9, through market equipment not shown, through break contacts LXP1-5, through break contacts 21HMS1-7 through market equipment not shown and through the windings of relays 19LBT and 19LIT to ground at resistance RLIT. If the audio line is busy, ground will be connected to the sleeve conductor 1304 and the line busy test relay 19LBT will be operated. However, it will be assumed that the line is idle and relay 19LBT does not operate at this time, but relay 19LIT operates.

When the audio line link frame was seized through the audio line link connector, the wideband line link connector in FIGS. 6 and 7 was also actuated to permit the marker to work with the wideband line link frame. More specifically, when relay 16MCA operated in FIG. 16, it extended ground through its contacts 32 and over conductor 1606 to FIG. 7 and the winding of relay 7MA and back over conductor 700 in cable 7-25 to FIG. 25 through make contacts 28WLC-3 and resistance WLLO to battery. When relay 7MA operates, it closes its make contacts 7MA-1 and 7MA-2 in FIG. 7 to complete obvious operating circuits for multi-contact relays 7MB, 7MC and 7MD. With these relays operated, ground is extended through make contacts 7MB-10, 7MC-10 and 7MD-10 over conductor 701 in cable 7-25 to FIG. 25 and through the winding of relay 25 WLFK to battery operating relay 25 WLFK. Relay 25 WLFK signals the marker that all multicontact connector relays have operated and the wideband line link frame is ready for operation with the marker.

In order to ascertain the wideband line location of the called station, the marker uses the wideband line control circuit shown in FIGS. 35 and 36. As mentioned above, the marker identifies the line on an audio line link frame according to its line link frame number, vertical group, horizontal group and vertical file as received from the number group. The same information from the number group is transmitted to the wideband line control circuit to ascertain if the audio line has wideband service and the location of the wideband line hold magnet. Marker access to the wideband line control circuit is through the wideband line link connector.

Figure 25:
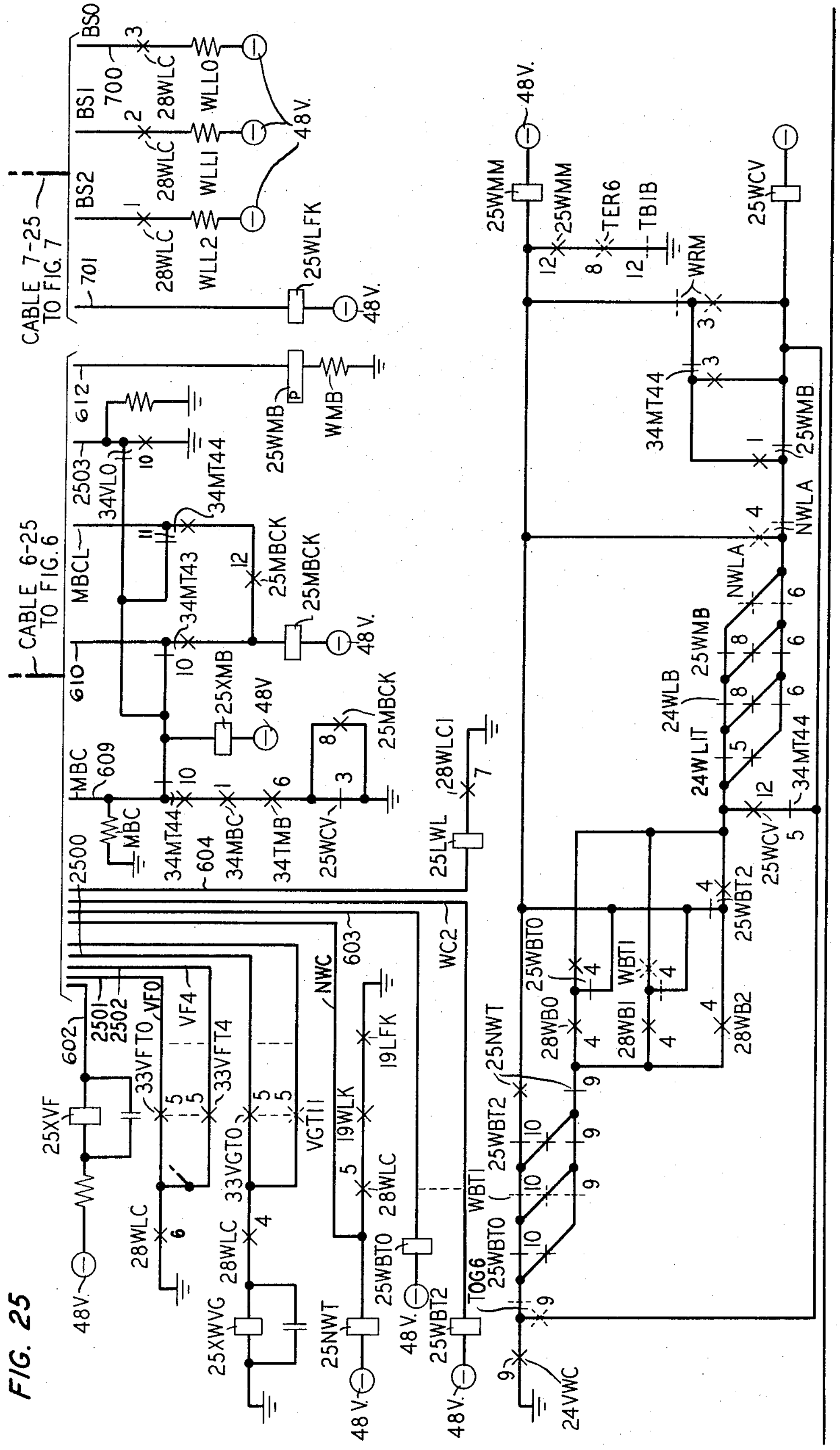

When relay 33VGTO operated from the information received from the number group, it closed its contacts 33VGTO-5 in FIG. 25 to extend ground over conductor 2500 in cable 6-25 to FIG. 6 through contacts 7MA-6 in the wideband line link connector, over conductor 600 in cable 6-36 to punching VGOO in FIG. 36. VG-punchings are cross connected to punching NWC if the audio vertical group is not associated with a corresponding wideband group and to punchings WVG– if the audio group has a corresponding wideband vertical group. In the example being described, let it be assumed that punching VGOO is connected by cross connection 3600 to punching WVGOO and relay 36WVGOO operates over the previously traced circuit.

When relay 36WVGOO operates for a particular vertical group, the vertical file leads are closed to operate a vertical file relay 36WVF–. Ground on contacts 28WLC-6 in FIG. 25 is extended through make contacts 33VFTO-5 and over conductor 2501 in cable 6-25 to FIG. 6, through contacts 7MA-4 and over conductor 601 in cable 6-36 to FIG. 36 through diode VFAO and contacts 36WVGOO-6, through the winding of relay 36WVFO and back over conductor 3601 to FIG. 6, through contacts 7MA-3, over conductor 602 to FIG. 25 and through the winding of relay 25XVF to battery. Relay 36WVFO in the wideband line control circuit operates at this time but relay 25XBF in the marker remains released.

The same ground that operates relay 36WVFO is also extended through diode VFBO and contacts 36WVGOO-1 to punching FCO. Punching FCO is cross connected to punching WCO to extend the ground over conductor 3602 in cable 6-36 to FIG. 6, through contacts 7MB-2 and over conductor 603 to FIG. 25 and through the winding of wideband class relay 25WBTO, operating at relay. If the particular vertical file were not equipped for wideband service, punching FCO in FIG. 36 would have been cross connected to punching NWC to operate wideband class relay 25NWT in the marker. Each WC-terminal is connected to a different class relay in the market so that a line can indicate to the marker that it is a video telephone class, data class, etc.

All wideband lines in a vertical file are terminated on the local wideband line link frame or a remote switch unit. The operation of the wideband vertical file relay 36WVFO indicates this to the market by connecting battery to punching LLN or RLN. In the example being described, it has been assumed that the line is served locally and battery as extended in FIG. 36 through contacts 36WVFO-11, over cross connection 3603 to punching LLN over conductor 3604 to FIG. 6, through contacts 7MB-4 and over conductor 604 in cable 6-25 to FIG. 25 and through the winding of relay 25LWL and contacts 28WLC-7 to ground. Relay 25LWL operates indicating to the marker that this is a local wideband line.

When relay 36WVFO operated, it also closed through ten test leads to punchings L- in FIG. 35. These punchings correspond to the audio line location in terms of its vertical group, horizontal group and vertical file. Those audio lines having wideband service are assigned to the wideband counterpart by cross connecting punching L- with one of the LL- punchings in FIG. 35 if the wideband station is served by a local wideband line link. Punching L- is cross connected to an RL- punching if the wideband counterpart is served by a remote switch unit. For audio lines not having wideband service, the L- punching is cross connected to the NWL punching in FIG. 35.

For the called audio line in the example being described, punching LO is cross connected to punching LLOO to complete a circuit for making a busy test on the associated wideband line 103VS. A busy test is made by determining the potential on the sleeve of that line. Assuming the line is idle, battery from bold magnet 2LHOO is extended over conductor 605 in cable 6-35 to FIG. 35, through break contacts 35MBOO-1 and 36MTO-1 to punching LLOO over cross connection 3500 to punching LO, through make contacts 36WVFO-1 and back over conductor 3501 in cable 6-35, through make contacts 7MD-1, over conductor 606 in cable 6-24 to FIG. 24, through make contacts 33HGTO-10, break contacts 29WHS1-10 and 34MT43-3 and through the windings of polarized relays 24WLIT and 24WLBT to a voltage divider circuit comprising battery through resistance VLT1 and contacts 24VWC-10 and ground through resistance VLT2. If the wideband line had been busy, ground would have been extended over the previously traced path to operate wideband line busy test relay 24WLBT. If relay 24WLBT operates indicating that the wideband line is busy, relay 19LBT should also operate indicating that the corresponding audio line is busy. If relay 19LBT does not operate with relay 24WLBT operated, the marker action is blocked indicating a trouble. For nonworking wideband lines the L-punching is cross connected to punching NWL in FIG. 35 and this causes relay 24NWL in the marker to operate when a line busy test is made. Relay 24NWL causes the call to be routed to an announcement trunk.

However, it has been assumed that the line is idle and battery from the hold magnet will operate wideband line idle test relay 24WLIT. With relay 24WLIT operated, a circuit is completed in FIG. 25 for operating wideband class verification relay 25WCV. This circuit includes battery through the winding of relay 25WCV, through break contacts 25WMB-1, NWLA-4, NWLA-6, 25WMB-6, and 24WLB-6, through make contacts 24WLIT-5, 25WBTO-4 and 28WBO-4, through break contacts 25NWT-9, 25WBT2-9, and WBT1-9, through make contacts 25WBTO-10, through break contacts TOG6-9 and through make contacts 24VWC-9 to ground.

Up to this point in the call the marker has seized in audio trunk link frame and a wideband trunk link switch and selected corresponding audio and wideband intraoffice trunks. The market has also translated the called line number into an audio line link frame equipment number and a wideband line link frame equipment number and has tested both the audio and wideband lines for busy. Finding both the wideband and audio lines associated with station 104 idle, the marker is now ready to establish audio and wideband channels between the intraoffice trunks and the lines associated with station 104.

CHANNEL SELECTION

As discussed above, each audio channel or connecting path through the network is made up of three components, i.e., audio line links which connect the audio line switches with the audio line junctor switches, audio trunk links which connect the audio trunk switches with the audio trunk junctor switches and audio junctors which interconnect the audio trunk junctor and audio line junctor switches.

The number of audio line and trunk links is determined by the size of the cross bar switches while the number of audio junctors may vary, depending on the size of the office. In any event, the market is capable of testing ten audio channels at a time and a channel is idle only if all three matching components (i.e., audio line link, audio junctor and audio trunk link) are idle.

The group of audio line links associated with the audio channels to be tested is determined by the location of the called audio line. In other words, the ten audio line links are the links which terminate on the line switch (FIG. 13) of audio line link frame LLF. When relay 13HGO on the audio line link frame operated, a test lead from the sleeve conductor of each audio line link was extended to the marker. For example, the test lead for audio line link O can be traced from sleeve conductor 1305 over conductor 1306 to FIG. 9, through make contacts 13HGO-10, break contacts 13HG9-10, over conductor 900 to FIG. 16, through contacts 16MCA-1, over conductor 1607 in cable 16-19, through break contacts 2 of relays LL7 or LL4, through contacts 22CHO-1, resistance RLO and diode LO to conductor 2000. If the audio line link is busy, ground would be extended over the circuit through contacts TCHO-1 in FIG. 21 and through the winding of channel test relay 21CHTO and over conductor 2101 and through equipment not shown to battery. Ground on conductor 2000 would operate relay 21CHTO indicating that the channel is busy.

As previously mentioned, the number of available audio junctors depends on the size of the office. The junctors are arranged in groups having a maximum of ten junctors per group. The various junctor patterns and the manner in which the junctor groups are selected is described in the aforementioned Busch patent and need not be reiterated herein. Instead, let it be assumed that junctor group relay JGO in the marker has operated. When relay JGO operates, it closes its contacts JGO-8 in FIG. 20 to extend ground over conductor 2001 in cable 17-20 to FIG. 17, through contacts 18 MCB-26, over conductor 1700 and through the winding of relay 17GO to ground operating that relay. Relay JGO also closes its contacts JGO-6 in FIG. 20 to complete a similar path for operating relay 17L. This circuit includes ground through the winding of relay 17L, conductor 1701, contacts 18MCC-20, conductor 1702, contacts JGO-6 and 33FUTO-7 to battery. Junctor cut-in relay 17JCO on the audio trunk link frame also operates over a circuit including ground through its winding in FIG. 17, make contacts 17GO-10 conductor 1703, make contacts 18MCC-18 and conductor 1704, make contacts 33FUTO-3 and JGO-7 to battery. Relay 17L extends ground through contacts 18MCC-44 and over conductor 1805 to operate marker relay 21LK and relay 17JCO extends the windings of the junctor select magnets over conductors 1706 and 1707 to operate relays 20JCKO and 20JCK1 in the marker.

With relays 17JCO and 28L operated, test conductors are extended between the sleeves of 10 junctors and the marker, so that the marker can ascertain which junctors are idle. The test circuit for the junctor sleeve associated with channel 0 can be traced from battery through line junctor hold magnet 13LJHO in FIG. 13, over conductor 1306 to FIG. 14, through make contacts 17JCO-11 and 17L-10, over conductor 1400 to FIG. 17, through make contacts 18MCB-25 and over conductor 1705 to FIG. 20, through break contacts 22CHO-2, resistance RJO, and diode JO to conductor 2000. A similar test circuit is extended for each of the other channels but only the paths for channels 0 and 9 have been shown to simplify the drawing.

When relay 17L operates, it also completes a plurality of paths for extending 10 test leads from the marker to the audio trunk links connected to the verticals of the trunk switch which serves the selected intraoffice trunk. The path for channel 0 extends battery from the winding of hold magnet 15THO, through make contacts 18LCO-14 and 17L-12, over conductor 1500 to FIG. 18, through make contacts 18MCB-24, over conductor 1806 in cable 18-21 to FIG. 21, through break contacts 22CHO-3, through resistance RTO and diode TO to conductor 2000. Thus, the audio line link, audio junctor and audio trunk link for each channel are coupled through a resistor-diode network to a conductor such as conductor 2000 associated with channel 0 and if any channel component is busy, ground on the conductor will operate a corresponding relay 21CHT– indicating that the associated channel is busy.

Before proceeding with the selection of an idle channel, the marker makes a check that certain relays have been operated as previously described. This check is made when relay 21TK operates over a circuit including battery through the winding of relay 21TK, make contacts 21FBK-2, break contacts 21FAK-2 SOG2-1, SCB2-9 and 21RK-6, make contacts 21 LK-6 TCHK-4, 19HGK-12, 21LCK-4 and through equipment not shown to ground.

Relay 21TK, in operating, starts timer 2102 which delays the operation of relay 21CHT to allow channel components to restore to normal for those channels that were just released from a prior call. When relay 21CHT operates, it closes its contacts in FIG. 22 to complete a path for operating one of the 22CH– relays. This path can be traced from ground through make contacts LLC1-13, through break contacts 22STP-1, through break contacts 22FMP-1, and 22CH9-1 through contacts of other channel relays not shown, through break contacts 22CHO-1, make contacts 21CHT-1, through marker equipment not shown, break contacts TR2B-1, through make contacts TCHO-2, break contacts 21CHTO-1 and through the winding of relay 22CHO to battery operating relay 22CHO. Had channel 0 been busy, relay 21CHTO would have been operated and the previously traced circuit would have been extended over conductor 2200 to operate a higher numbered relay 22CH-.

After the selection of an idle audio channel, the marker will proceed to set up a connection over this channel between the called line and the intraoffice trunk by first operating the select magnets and then the hold magnets associated with the selected channel. The marker will then test the channel to determine if the channel is in condition for service.

When relay 28HGO operated on audio line link frame 0, it also extended leads to the marker for operating the select magnets on both line and line junctor switches. With relay 22CHO operated battery is extended through its contacts 22 CHO-3 in FIG. 19 over conductor 1901 in cable 16-19, through make contacts 16MCA-11 in FIG. 16, over conductor 1608 to FIG. 13, through make contacts 13HGO-30 and 13HGO-40 to operate line junctor select magnet 13LJSO and line select magnet 13LSO.

Figure 20:
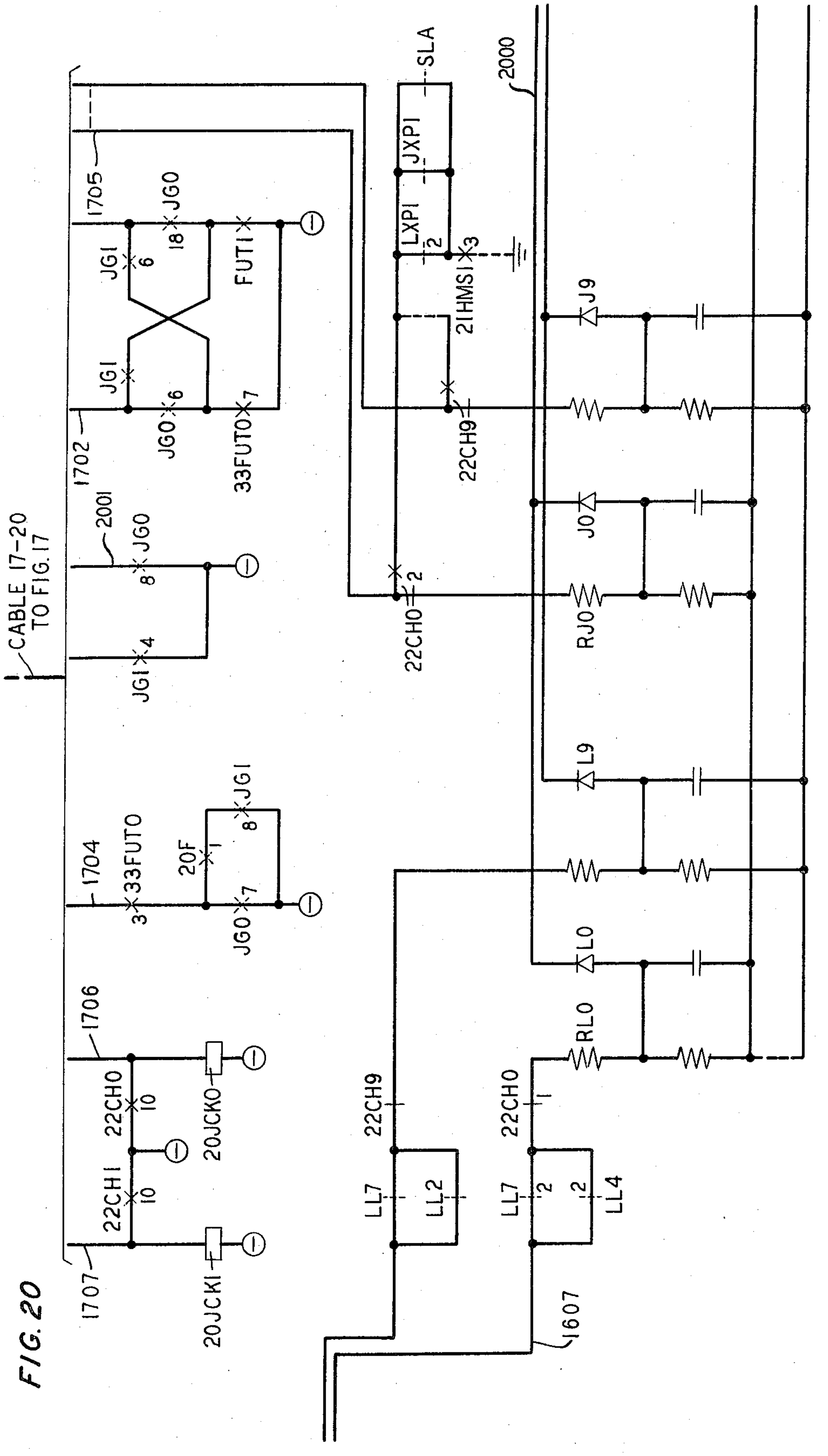

In FIG. 20 battery is extended through contacts 22CH-10 and over the previously traced circuit for operating relay 20JCKO to operate trunk junctor select magnet 14TJSO. The trunk switch on the audio trunk link frame is a six-wire switch with two trunks appearing on each of levels 2–8. Access to the individual trunk is had by operating the select magnet corresponding to the level of the trunk along with one of the A or B select magnets. In the example being described, select magnet 15TS90 and 15B are operated. The operating circuit includes battery through contacts 21FBK-4 conductor 2103 in cable 18-21 contacts 18MCB-15, conductor 183 to FIG. 15, through contacts 11LV9-11 and 12FB09-2, the winding of select magnet 15TS90, contacts 18LCO-3 to ground. The same battery is also extended through contacts 12FB09-12 and the winding of select magnet 15B to ground.

In order to complete the operation of the crossbar switch, the marker must now operate the appropriate hold magnets on these switches. The marker delays the operation of hold magnets to allow select magnets to fully operate. This timing interval is measured by hold magnet timing circuit 2104 in FIG. 21 which delays the operation of relay 21HMS1. When relay 21HMS1 operates, it extends ground through its contacts 21HMS1-1 in FIG. 21, break contacts LXP1-1, make contacts 22CHO-3 over the previously traced trunk link test circuit to operate trunk link hold magnet 15THO in FIG. 15 and trunk junctor hold magnet 14TJHO in FIG. 14, thereby closing the cross points on the audio trunk switch and the audio trunk junctor switch. A similar circuit is completed for operating the line junctor hold magnet on the audio line link frame. This circuit can be traced from ground through contacts 21HMS1-3 in FIG. 20, through contacts LXP1-2, through make contacts 22CHO-2 and over the previously traced test path to the winding of line junctor hold magnet 13LJHO. This hold magnet operates and closes its crosspoints on the audio line junctor switch.

When relay 21HMS1 operates, it also extends ground from the lower winding of relay 19LXP, through marker equipment not shown, through its make contacts 21HMS1-7, through break contacts LXP1-5, through equipment not shown, through contacts 33VFTO-9 and over the previously traced circuit to the winding of line hold magnet 13LHOO. The line hold magnet operates at this time closing the crosspoints on line switch and relay 19LXP is shunted down. In its released condition relay 19LXP operates relay LXP1 but this circuitry has not been shown to simplify the drawing.

Figure 19:
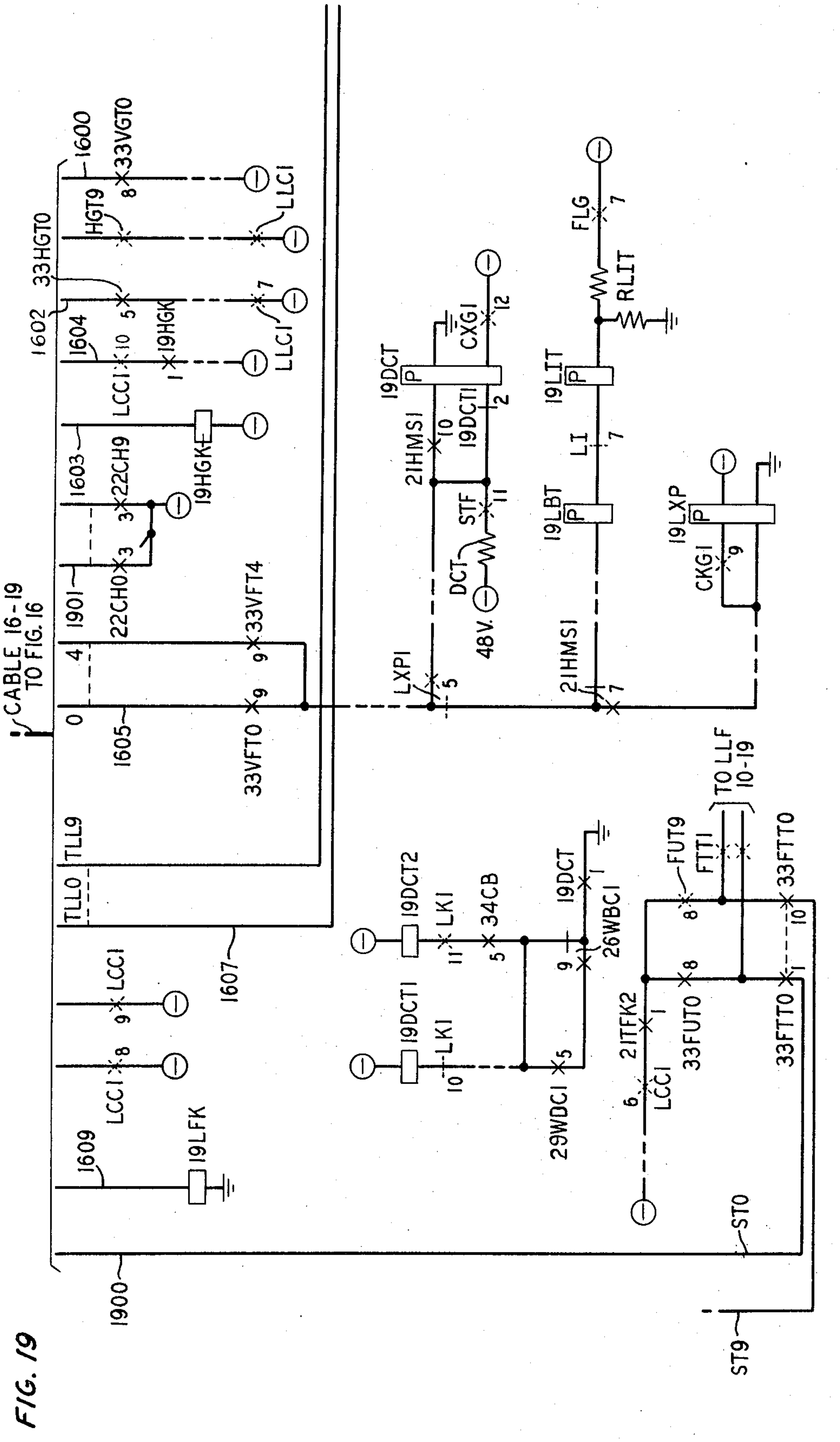
FIGS. 19–34, when arranged according to FIG. 48C, show part of a marker circuit and other common control equipment at the central office.

When relay LXP1 operates, it transfers (at its contacts LXP1-5) conductor 1605 in FIG. 19 from the winding of relay 19LXP to the winding of double connection test relay 19DCT. Ground through the upper winding of relay 19DCT is connected to the sleeve of the audio channel to maintain the hold magnets operated. Relay LXP1, at its contacts LXP1-1 and LXP1-2, removes the ground which was originally used to operate the line junctor, trunk junctor and trunk switch hold magnets. If no other ground is present on the sleeve conductor of the channel, relay 19DCT operates in series with the line hold magnet indicating a satisfactory double connection test. When the line hold magnet operates, the audio channel is completed from the telephone station through the audio switching network and through make contacts 12FBO9-3 and 12FBO9-4 over conductors 1202 on cable 12-23 to the audio continuity test circuit 2300 in the marker. The marker is now ready to perform a continuity test on the audio channel and for details of this test reference can be made to the aforementioned Busch patent.

WIDEBAND CHANNEL SELECTION AND OPERATION

While the marker was busy setting up the audio channel or connecting path through the audio network, the marker was also establishing a path through the wideband network. As discussed above, the wideband network in the illustrative embodiment is a three stage network. Each wideband line switch has its ten horizontals or wideband links distributed over ten wideband junctor switches and each wideband trunk switch has its ten verticals or wideband trunk links distributed over the same 10 junctor switches. For a wideband channel to be idle, each wideband line link and trunk link must be idle and no other marker must be in the process of setting up a linkage through the corresponding junctor switch serving the idle links.

Prior to making a channel selection, the marker checks that certain relays have already operated by the operation of a wideband total check relay 29WTK. The circuit for operating this relay includes battery through the winding of relay 29WTK, make contacts 25WLFK-2 and 28WTFK-2, break contacts 32WCK-2, make contacts 24VWC-3, break contacts 33RSW-10, 30WLA-3 and 31WCHA-3, make contacts 28TSK-2 and 26LSW-7, break contacts 26RWL-10 and make contacts 25LWL-3 and 26LSW-8 to ground.

Before selecting a channel, relay 29WSRK must also be operated indicating several check relays have released from the prior call handled by the marker. Relay 29WSRK operates over a circuit including a battery through its winding, break contacts 27WJGK-5, 27WTGK-5, 24WLGK-5 and 29WSLA-11 and through make contacts 28WLC-8 to ground.

When the wideband line link connector was operated, ten circuits were extended from the marker to the sleeves of the wideband line links for testing the idle conditions of these links. For example, the test circuit for a wideband line link O extends from battery through hold magnet 3JA10 over conductor 300, through make contacts 7MC-3, over conductor 702 in cable 7-27 to FIG. 27, through break contacts 31WCHO-11, through resistance AAO and diode AO and through the winding of polarized relay 27WCTO, through break contacts 33RSW-4, and through marker equipment not shown to battery. If wideband line link O is busy, ground would be extended over that lead to operate relay 27WCTO but in this example, let it be assumed that the line link is idle and relay 27WCTO does not operate. Similar test circuits are extended to other wideband junctor switch hold magnets for other channels.

In addition, test circuits are extended through the wideband trunk link connector for testing the wideband trunk links. For example, the circuit for testing wideband trunk link O extends battery from hold magnet 4THO, over conductor 403, through make contacts 8T-12 and 8MA-12, over conductor 703 in cable 7-27 to FIG. 27, through break contacts 31WCHO-7, resistance ABO and diode BO to the winding of relay 27WCTO. Similar test circuits are extended for other wideband trunk links.

Figure 32:
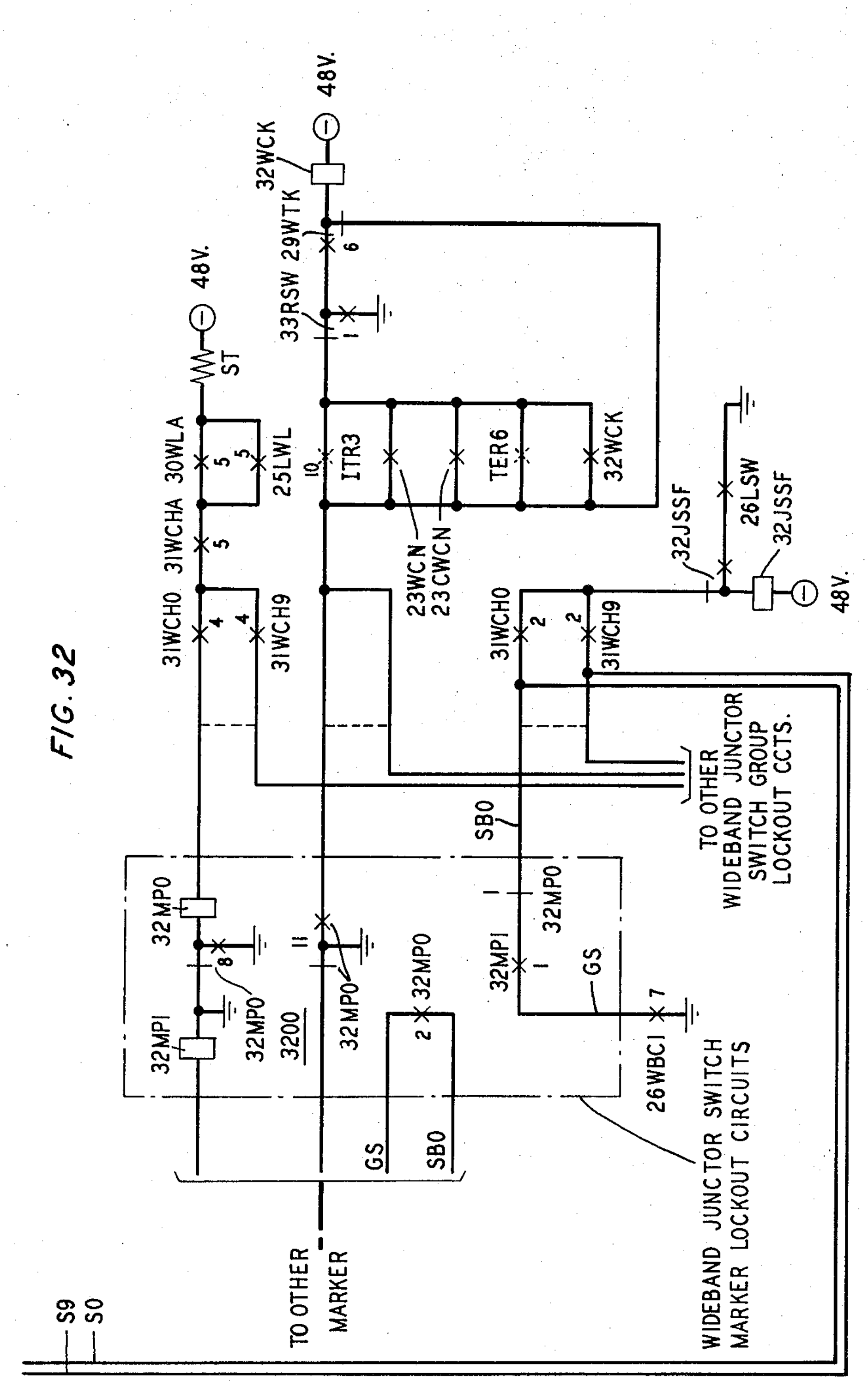
Figure 33:
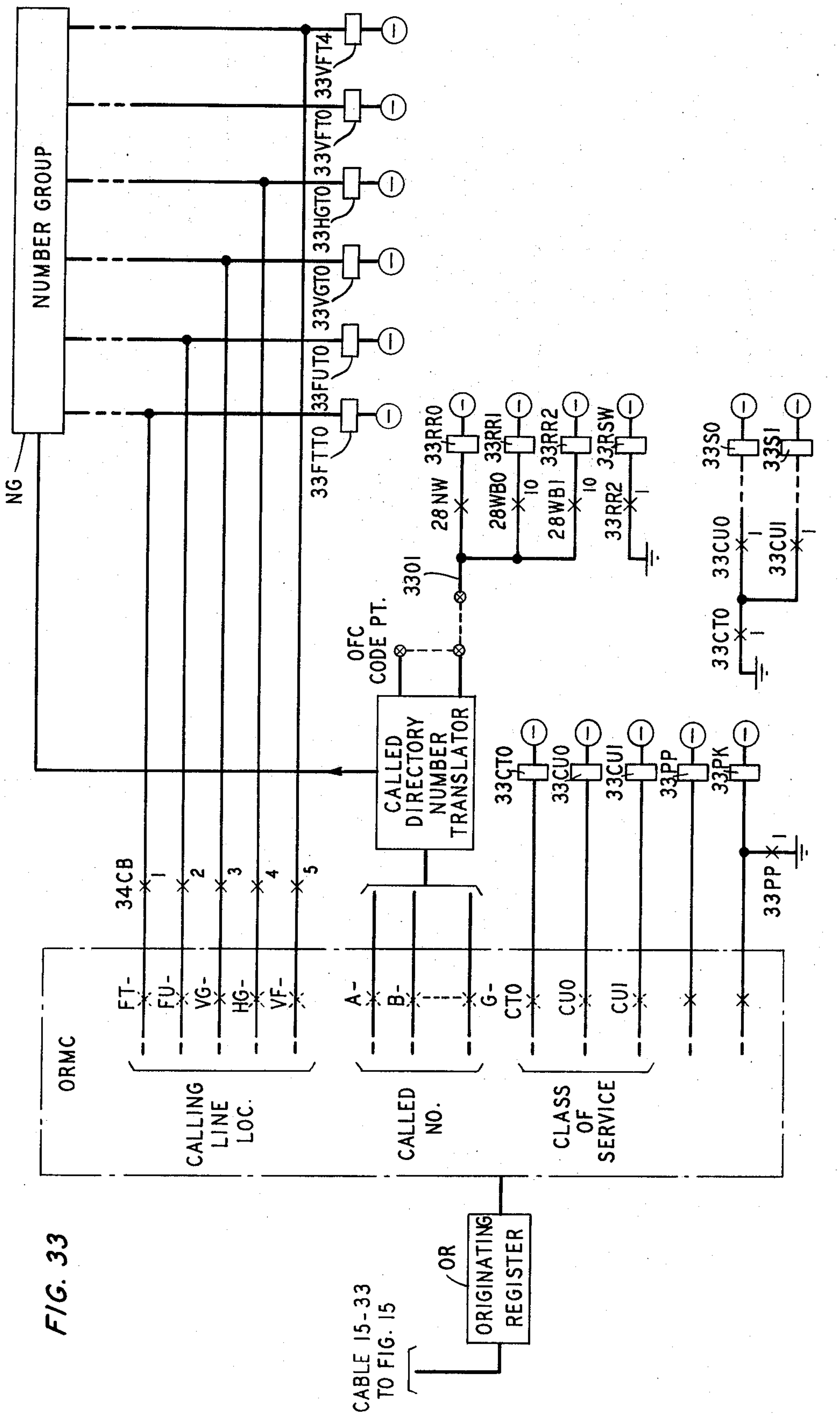
Figure 34:
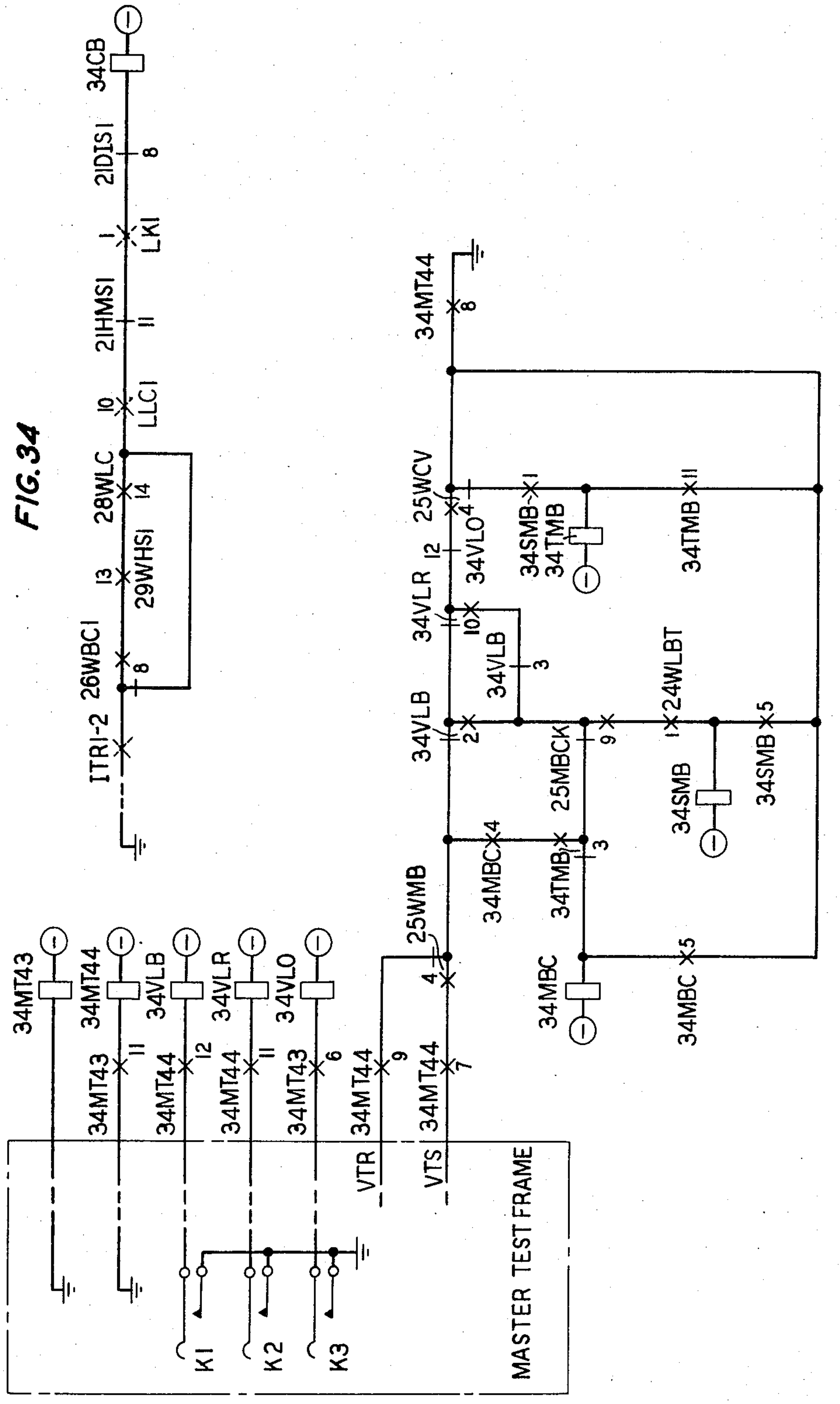

The other components of the wideband channels are tested for idle by determining whether or not another marker is trying to set up connection via the junctor switch. The wideband junctor switch lockout circuit 3200 in FIG. 32 is used to prevent more than one marker at a time from gaining access to a junctor switch group. If, for example, another marker were working in the wideband junctor switch group associated with channel O, relay 27WCTO would be operated in a circuit including battery through the winding of relay 27WCTO (as previously traced) diode CO, conductor 2700 to FIG. 32, through break contacts 32MPO-1 and the make contacts 32MP1-1 and 26WBC1-7 to ground. Relay 32MP1 would be operated by the other marker if that marker were holding the junctor switch group busy. Let it be assumed, however, that no other markers working in this junctor switch group and relay 27WCTO does not operate. A circuit is now completed for operating relay 31WCHO in preparation for selecting a wideband channel. This circuit includes battery through the winding of relay 31WCHO, break contacts 27WCTO-5 and TR2F-3, make contacts 29WSRK-11 and 29WTK-2, break contacts 8 of all of the wideband channel selecting relays (31WCH-), through break contact 31WFMP-6 and 32JSSF-7 to ground on make contacts 26LSW-4. Had any of the components of wideband channel O been busy as indicated by the operation of relay 27WCTO, one of the higher numbered channel selector relays would have operated. When relay 31WCHO operates, it operates relay 31WCHA over a typical check circuit to assure that one and only one channel selector relay has operated.

With relays 31WCHO and 31WCHA operated, a circuit is completed for operating the marker preference relay in lockout circuit 3200. This circuit includes ground through break contacts 32MPO-8, make contacts 31WCHO-4, 31WCHA-5 and 25LWL-1, resistance ST and battery. When relay 32MPO operates, it closes its contacts 32MPO-2 to make the junctor switch group busy to other markers.

Figure 27:
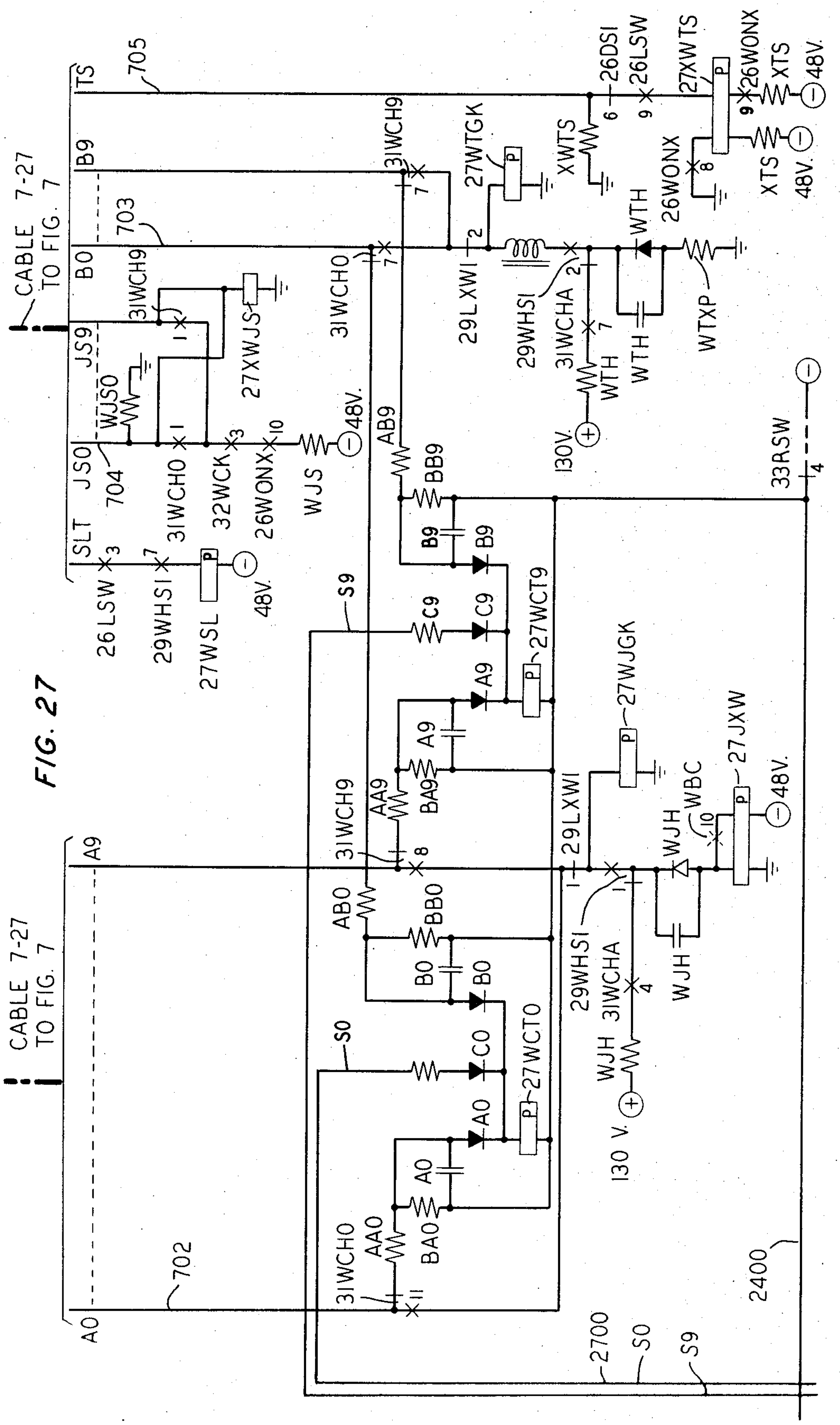

When the channel selector relay associated with a wideband channel operated, it also closed its make contact 31WCHO-11 in FIG. 27 to extend the battery from the junctor switch hold magnet 3JA10 and conductor 702 through break contacts 29LXW1-1 and through the winding of relay 27WJGK to ground. Relay 27WJGK operates, checking that the path through the wideband junctor hold magnet is continuous, but due to the high resistance of relay 27WJGK, the wideband junctor hold magnet does not operate at this time. A similar path is completed for extending the battery from the wideband trunk switch hold magnet through contacts 31WCHO-7 in FIG. 27, through contacts 29LXW1-2 and through the winding of relay 27WTGK, operating relay 27WTGK.

When relay 32MPO operated in the wideband junctor switch lockout circuit 3200, it closed its contacts MPO-11 to extend ground through make contacts ITR3-10, break contacts 33RSW-1 and 29WTK-6 and through the winding of relay 32WCK to battery.

Relay 32WCK, in operating, also operates select magnets on the appropriate wideband line switch, wideband junctor switch and wideband trunk switch. The circuit for operating select magnet 2LDO on the wideband line switch includes ground through the winding of select magnet 2LDO, conductor 200, contacts 7MD-7, conductor 613 in cable 6-26 to FIG. 26, contacts 31WCHO-12, 32WCK-4 and 26WONX-11, resistance WLS and battery. The circuit for operating select magnet 3JO on the wideband junctor switch includes ground through the winding of that select magnet, conductor 301, contacts 8T-2 and 8MA-2, conductor 704 in cable 7-27 to FIG. 27, contacts 31WCHO-1, 32WCK-3 and 26WONX-10 and resistance WJS to battery. The select magnet associated with the terminating end of the wideband intraoffice trunk (4TO) is operated over a circuit including ground through its winding, contact 4FO-4, conductor 404 to FIG. 7, contacts 8T-22 and 8MA-22, conductor 705 in cable 7-27 to FIG. 27, contacts 26LSW-9 and the winding of relay 27XWTS, contacts 26DS1-6 and 26WONX-9 and resistance XTX to battery.

Figure 29:
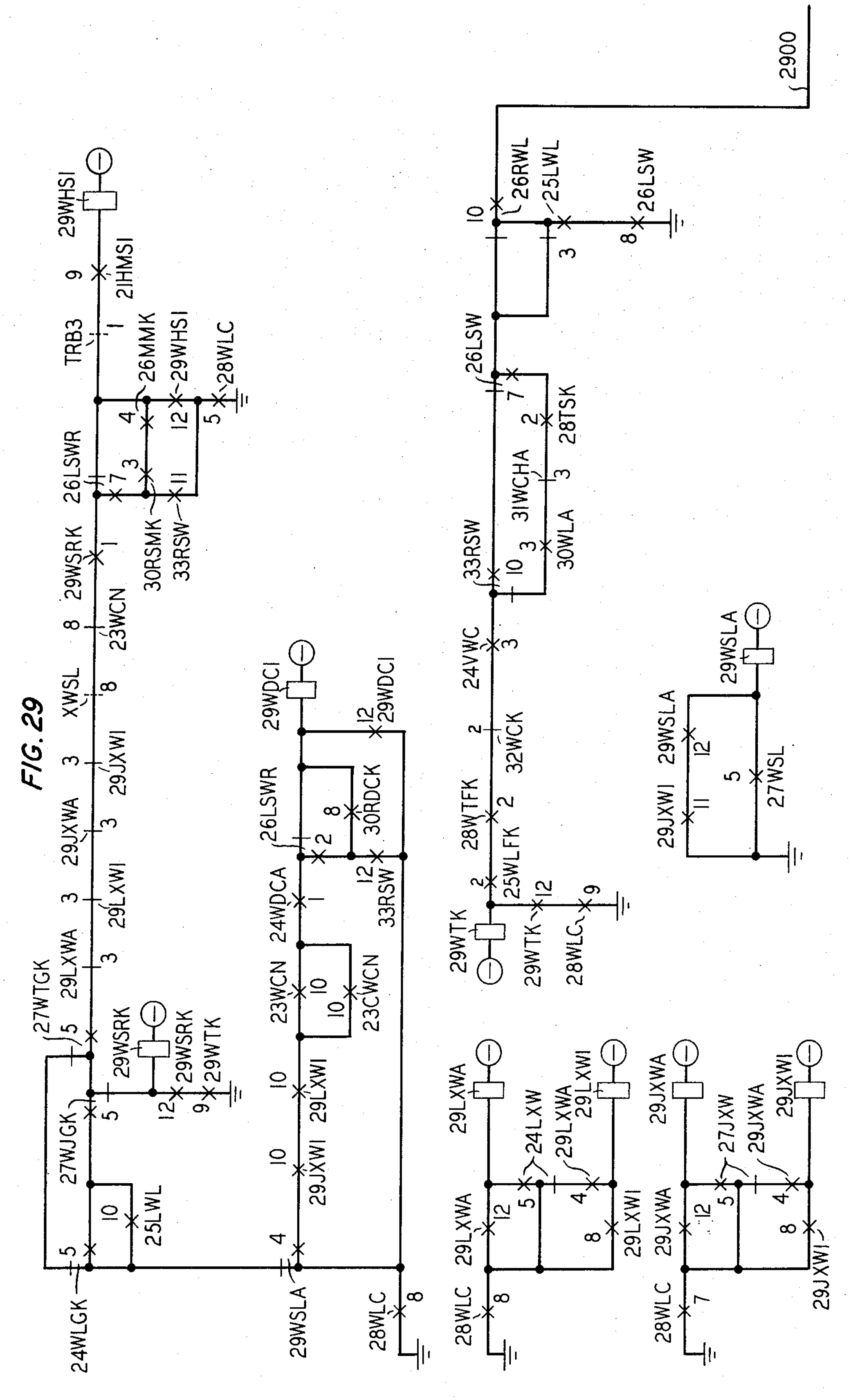

Since the wideband channel and the audio channel are being established substantially at the same time by the marker, the marker can use the hold magnet timing circuit previously described for assuring that the select magnets in both networks have had sufficient time for operating before the hold magnets are operated. When hold magnets start relay 211HMS1 operated to begin the operation of the hold magnets in the audio network, relay 21HMS1 also completed a circuit for operating wideband hold magnet start relay 29WHS1. This circuit can be traced in FIG. 29 from battery through the winding relay 29WHS1, through make contacts 21HSM1-9, through break contacts TRB3-1 and 26LSWR-7, make contacts 29WSRK-1, break contacts 23WCN-8, XWSL-8, 29JXW1-3, 29JXWA-3, 29LXW1-3 and 29LXWA-3 through make contacts 27WTGK-5, 27WJGK-5 and 25LWL-10, through break contacts 29WSLA-4 to ground through make contacts 28WLC-8. Relay 29WHS1 closes its contacts 29WHS1-1 to extend ground through the left hand winding of relay 27JXW through diode WJH over conductor 702 and the previously traced path through the winding of junctor switch hold magnet 3JA10 to battery operating the junctor switch hold magnet and relay 27JXW. In FIG. 29 relay 27JXW completes a path for operating relay 29JXWA. This circuit includes battery through the winding of relay 29JXWA, make contacts 29JXW-5 and 28WLC-7 to ground.

When relay 29WHS1 operated, it also closed its contacts 29WHS1-2 in FIG. 27 to extend the ground from resistance WTXP and diode WTH, through break contact 29LXW1-2, make contacts 31WCHO-7 and over conductor 703 and the previously traced path to operate trunk hold magnet 4THO. This ground is also extended over sleeve conductor 405 of the wideband trunk link through crosspoints 302 and back over conductor 300 in the previously traced path to shunt down relay 27JXW. In releasing relay 27JXW actuates its break contacts 27JXW-5 in FIG. 29 to provide an obvious operating circuit for relay 29JXW1. Thus, the counting circuit comprising relays 29JXWA and 29JXW1 monitors the operation and release of relay 27JXW and verifies that the sleeve of the wideband channel is continuous from the trunk switch to the junctor switch. The same ground that operated trunk hold magnet 4THO is extended through crosspoints 406, over the sleeve conductor 407, through contacts 4FO-2 over conductor 408 to FIG. 7, through contacts 8T-1 and 8MA-1, over conductor 706 in cable 7-27 to FIG. 27, through contacts 26LSW-3 and make contacts 29WHS1-7 and through the winding of relay 27WSL to battery, operating relay 27WSL. In FIG. 29 relay 27WSL provides an obvious operating circuit for relay 29WSLA which locks through contacts of relay 29JXW1.

Figure 23:
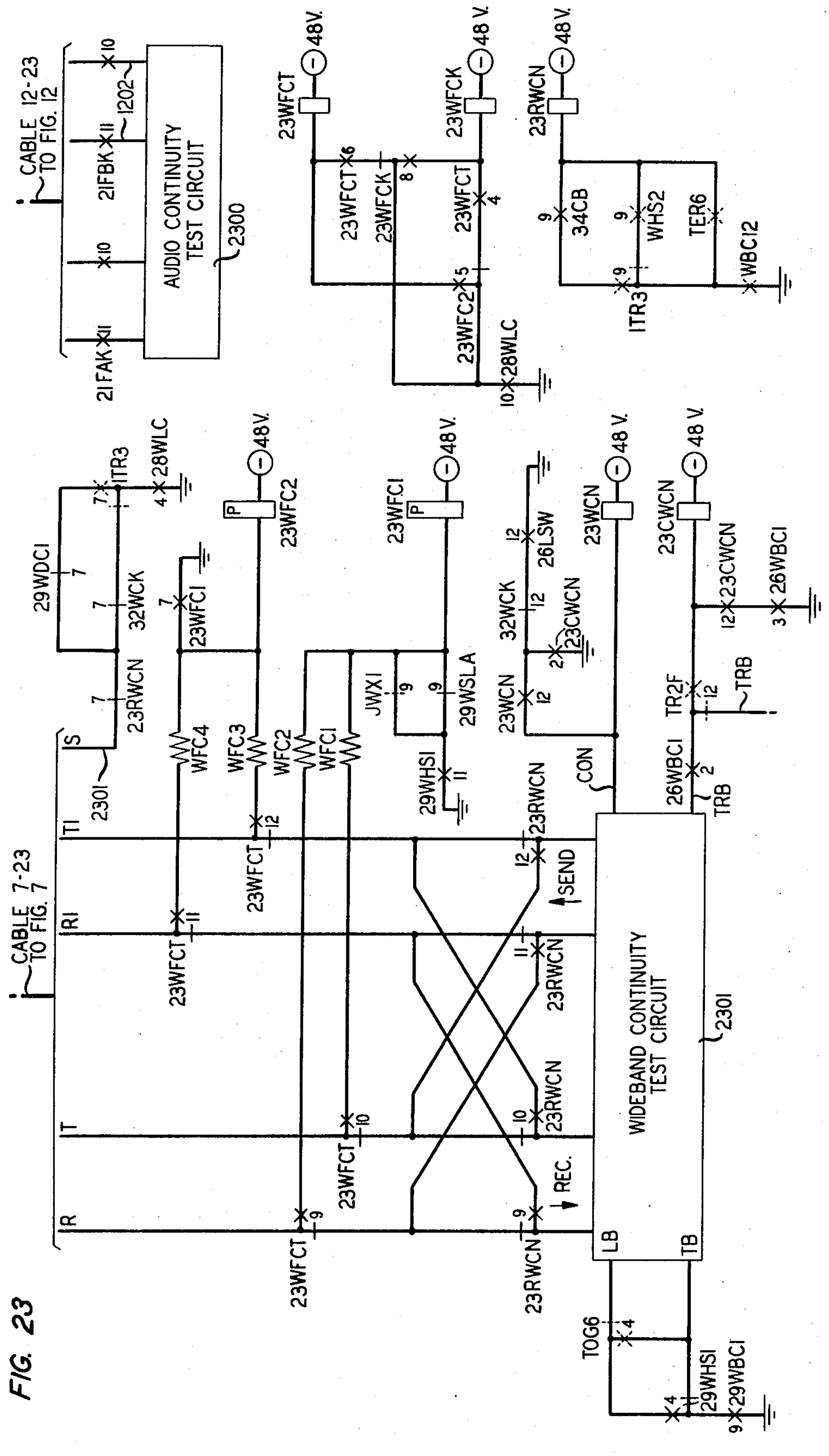

When relay 29WHS1 operates, it also closes its contacts in FIG. 23 to operate relay 23WFC1 before either relay 29JWX1 or relay 29WSLA had operated. Relay 23WFC1, in operating, closes its contacts 23WFC1-7 to operate relay 23WFC2. Relay 23WFCT now operates over a circuit including battery through its winding, contacts 23WFC2-5 to ground on contacts 28WLC-10. Through its contacts 9 and 10 relay 23WFCT extends one pair of transmission conductors of the four-wire wideband channel through resistances WFC1 and WFC2 to the winding of relay 23WFC1 and through its contacts 11 and 12, the other transmission pair is extended to winding of relay 23WFC2. After relays 29JWX1 and 29WSLA operate indicating a satisfactory sleeve check, the operating circuit for relay 23WFC1 is opened and relay 23WFC1 will only hold operated if there is a false cross or ground on the transmission conductors to which it is connected. Assuming that these conductors do not have a foreign potential connected to them, relay 23WFC1 releases, thus opening the operating path for relay 23WFC2. Relay 23WFC2 now checks the other pair of transmission conductors for a false cross or ground. If no false ground exists on this transmission path, relay 23WFC2 releases. With relay 23WFC2 released and 23WFCT operated, obvious circuits are completed in FIG. 23 for operating relay 23WFCK. Relay 23WFCK, in operating, opens the operating circuit for relay 23WFCT and relay 23WFCT releases to disconnect the false cross and ground test relays from the transmission conductors.

The marker is now ready to operate the wideband line hold magnet. The circuit for operating the line hold magnet includes ground through the left winding of relay 24LXW, diode WLH, make contacts 23WFCK-10 and 29WHS1-4, break contacts 29LXW1-5, make contacts 25LWL-11 and 33HGTO-8 and over conductor 606 and the previously traced circuit to line hold magnet 2LHOO. Line hold magnet 2LHOO closes its crosspoints 201 to interconnect the wideband line with the established wideband channel. Relay 24LXW operates over this same circuit and completed an obvious circuit in FIG. 29 for operating relay 29LXWA.

The ground present on the sleeve conductor of the wideband channel which shunted down relay 27JXW is now extended over sleeve conductor 202, through crosspoints 201 and back over conductor 605 and the previously traced path to shunt down relay 24LXW in the marker. Relay 24LXW, in releasing, provides a path in FIG. 29 for operating relay 29LXW1.

When relay 29WHS1 operated, it extended ground in FIG. 23 from make contacts 26WBC1-9, through its make contacts 29WHS1-4, through break contacts TOG6-4 to the LB input of wideband continuity test circuit 2301. The wideband continuity test circuit responds by sending a 12 kilohertz signal over the one path of the wideband channel. This signal traverses the channel to the called station where it is looped to the other path and sent back over the receive pair to test circuit 2301. If the test is satisfactory, relay 23WCN operates in the marker after the line hold magnet has been operated on a wideband wide link frame.

When relay 29LXW1 operates, it opens its contacts 29LXW1-2 in FIG. 27 to remove the ground that originally operated the wideband trunk and junctor hold magnets. Instead, ground is connected through the upper winding of relay 24WDCT and make contacts 29WHS1-9 and 29LXW1-5 to the sleeve, thereby holding the channel operated. If there is a double connection, relay 24WDCT will not operate. In the example being described, let it be assumed that relay 24WDCT operates and completes a path for operating relay 24WDCA.

Relay 24WDCA, in operating, completes a circuit for operating relay 29WDC1. This circuit includes battery through the winding of that relay, break contacts 26LSWR-2, make contacts 24WDCA-1, 23WCN-10, 29LXW1-10, 29JXW1-10, 29WSLA-4 and ground at contacts 28WLC-8. When relay 29WDC1 operates, it releases relay 26WONX and relay 26WONX releases select magnets on all switches in the wideband network. Relay 29WDC1 also opens its contacts 29WDC1-7 in FIG. 23 to remove the ground from conductor 2301, thereby releasing relay 5S in the wideband trunk.

When relay 19DCT operated indicating a satisfactory double connection test had been performed on the audio network connection, relay 19DCT operated relay 19DCT1. At its contacts 19DCT1-2 in FIG. 28, relay 19DCT1 removed the battery from conductor 804 to release relay 4FO on the wideband trunk link frame. Relay 4FO, in releasing, releases rely 8T in the wideband trunk link connector and the release of relay 8T releases relay 28TSK. At its break contacts 4FO-2 in FIG. 4, relay 4FO also extends sleeve conductor 407 to conductor 409, through contacts 5S1-1 to ground. This ground shunts down relay 24WDCT and relay 24DCT releases relay 24DCA.

At this point, the marker has established serviceable channels between the audio and wideband intraoffice trunks and the corresponding terminals of the called line. The marker is now ready to establish similar connections to the audio and wideband terminals of the calling line. The satisfactory establishment of channels to the called station is manifested by the operation of linkage check relays LK1 and LK2 (not shown). When linkage check relays operate, they release line link control relay LLC1. Relay LLC1 begins the release of information stored in the marker which was used on the call forward portion of the call and prepares the marker to receive information concerning the call back portion, i.e., that portion involving the calling line. Relay LLC1 in releasing opens its contact LLC1-6 in FIG. 19 to interrupt the start lead for the audio line link connector. This causes all relays in the audio line link connector and its associated line link frame to release. The hold magnets of the established channel remain operated, however. Relay LLC1 also opens its contacts LLC1-1 in FIG. 28 to release relay 28WLC. Relay 28WLC, in releasing, interrupts the operating circuit for relay 7MA in the wideband line link connector and relays 7MA, 7MB, 7MC and 7MD release, thereby releasing the wideband line link frame. Relay 28WLC releases relays 36WVGOO and 36WVFOO in the wideband line control circuit, thereby releasing that circuit.

Relay 28WLC, in releasing, also causes relays 25LWL, 26LSW, 29JXW1, 29WSLA, 29LXW1, 29LXWA, 31WCHO and 31WCHA to release in the marker.

When the appropriate marker relays have released, a circuit is completed for operating call back relay 34CB. This circuit includes battery through the winding of relay 34CB, break contacts 21DIS1-8, make contacts LK1-1, break contacts 21HMS-11, LLC1-10, 28WLC-14 and 29WHS1-13, make contacts 26WBC1-8 and ITR1-2 through equipment not shown to ground. Relay 34CB and other similar relays operate and prepare the marker for establishing the call back connection. For example, relay LLC1 (not shown) is reoperated to once again operate wideband line control relay 28WLC. Relay 34CB also cuts through the calling line location stored in the originating register (FIG. 33) to the proper marker registration relays. In the example being described, it will be assumed that the calling line is on the same audio line link frame and in the same vertical and horizontal groups but a different vertical file. Therefore, relays 33FTTO, 33FUTO, 33VGTO, 33HGO and 33VFT4 will be operated. With the calling line location registered in the marker, the marker proceeds to seize the audio line link frame and wideband line link frame as previously described. This time with relay 33VFT4 operated, the marker will make a line busy test of the audio line served by line hold magnet 13LH04. With relay 33VFT4 operated, ground is extended through its contacts 33VFT4-5 in FIG. 25 over conductor 2502 in cable 6-25 to FIG. 6, through contacts 7MA-5, over conductor 614 in cable 6-36 to FIG. 36 through contacts 36WVGOO-10 to operate relay 36WVF4 in a wideband line control circuit. This permits the marker to now make a line busy test on the wideband line which is served by hold magnet 2LH79 on the wideband line link frame. Both audio and wideband line busy test operations are performed substantially the same as the test previously described with respect to the called station and need not be reiterated. In addition, relay 25LWL operates in the marker, indicating that the wideband line is served by the local switching network.

When call back relay 34CB operates, it also closes its contacts 34CB-9 in FIG. 28 extending battery over conductor 803 in cable 8-28 to FIG. 8, through contacts 8MB-5, over conductor 400 to FIG. 4, through the winding of relay 4F9 and over conductor 500 to ground on contacts 5F-2 in FIG. 5. Relay 4F9 on the wideband trunk link frame operates and reoperates relay 8T in the wideband trunk link connector. Relay 8T operates relay 28TSK in the marker over the previously traced path.

The marker can now proceed to select audio and wideband channels for interconnecting the calling station with the audio and wideband intraoffice trunks. The selection of the channels for the call back portion of an intraoffice call is similar in operation to the selection of channels for the call forward portion. Namely, the marker examines the line link, junctor and trunk link components of ten channels in the audio network and seeks a channel having all three components idle. In the meantime, the marker is also examining the appropriate wideband line links and wideband trunk links in the wideband network to ascertain if a wideband channel is available. After independently selecting available channels in both networks, the marker proceeds to operate the appropriate select magnets to interconnect the calling line with the intraoffice trunk. It is at this time that the marker signals the originating register to release the dial tone connection so that the calling customer can assume control of the intraoffice connection. If the marker encounters trouble in completing the call back linkage, relay 26DS1 operates to extend ground over conductor 808 in cable 8-26, through contacts 8MB-3, and over conductor 807 to operate relay 12DS1 in the audio intraoffice trunk. Relay 12DS1 disconnects the wideband trunk immediately to prevent a possible trouble condition on a subsequent call. The trouble condition might occur if the audio line appearance is idle while the wideband line appearance remains held busy by the slower releasing wideband trunk.

When call back relay 34CB operated, it closed its contacts 34CB-9 to provide an obvious operating circuit for reverse continuity test relay 23RWCN. At its contacts 23WCN-9 through 23RWCN-12, relay 23RWCN transposes the send and receive transmission paths between the intraoffice trunk and the wideband continuity test circuit 2301 so that a continuity test can be performed over the wideband channel to the calling station which has its transmitter and receiver equipment connected opposite to the called station equipment. The continuity test and the false cross and ground test are performed after the wideband line hold magnet is operated.

The marker also makes a double connection test on both channels to the calling station and if this test is satisfactory, relays 29WDCT and 19DCT are operated. A circuit is now completed for operating relay 19DCT2. This circuit includes battery through the winding of relay 19DCT2, contacts LK1-11, 34CB-5, 24WDC1-5, equipment not shown and contacts 19DCT-1. Relay 19DCT2, in operating, releases relay 12F in the audio intraoffice trunk by opening its contacts 19DCT2-10 in FIG. 21.

Relay 12F, in releasing, releases relay 12FA99 and 12FB09 on the audio trunk link frame. When these relays release, the control of the audio intraoffice trunk is turned over to the calling and called stations. More specifically, the channel for the calling station is cut through to operate relay 12S in the audio intraoffice trunk and relay 12S maintains slow release relay 12S1 operated to prevent the channel from releasing. In a similar manner, the release of relay 12FB09 extends the audio channel to the winding of relay 12CS, but relay 12CS does not operate until the called station has answered.

With relay 12F released, ground is extended through equipment not shown, over conductor 502 to FIG. 5 to operate relay 5VSS in the wideband intraoffice trunk. Relay 5VSS, in operating, connects a video supervisory signal circuit 501 to the receive pair of both calling and called wideband stations. The signal transmitted by circuit 501 turns on the video equipment at both stations and causes a distinctive ring at the called station indicating the video telephone call. The signal provided by circuit 501 also serves to synchronize the two stations.

When the called party answers, relay 12CS in the audio intraoffice trunk operates. Relay 12CS operates other trunk relays (not shown) which cause relay 5VSS in the wideband trunk to release. The release of the wideband connection is now under control of the audio connection, and the audio connection is controlled by the calling and called customer stations in a well-known manner.

When relay 12FA99 released on the trunk link frame, the ground from the audio intraoffice trunk which holds the channel also shunts down relay 19DCT in the marker. Relays 21DIS1 and 21DIS2 now operate to begin the release of the marker. The operating circuit for these relays includes the winding of these relays contacts 19DCT-4, make contacts 26WBC1-2, break contacts 24WDCA-4, 19DCT2-6, ITR2-2 and other marker equipment not shown. The operation of relays 21DIS1 and 21DIS2 initiate the release of the originating register from the marker and the marker restores to normal as set forth in the aforementioned Busch disclosure. When certain relays such as LLC1, TLC1, CKG2, etc. release of the marker, the circuitry for controlling the wideband portion of the call also releases.

REMOTELY SWITCHED CALLS

As described above, when a number of customers in the same geographic location have wideband service, those customers can be served by a remote switch unit located in close proximity to the customers' stations. The remote switch unit will serve the wideband needs of the customers while the audio connections will still be routed through the audio network at the central office.

Among other things, the remote switch unit performs a concentrator function using a small number of transmission paths from the central office to serve a large number of customers. On calls between two customers served by the same remote switch unit, the wideband portion of the call can be completed wholly within the remote switch unit. The remote switch unit comprises a switching network and control circuitry as shown in FIGS. 41–47. The remote switch unit is controlled by the marker through the wideband switch signal control circuit shown in FIGS. 37–40. The switching network in this one illustrative embodiment comprises a plurality of crossbar switches with the wideband stations connected to the verticals of the crossbar switches and the horizontals of the switches connected over remote links to verticals on the wideband line link switches at the central office or to intraremote switch trunk circuits such as trunk 108WB in FIG. 42.

The remote switch unit is used on locally switched calls, i.e., when only one of the customers to be connected is served by the remote switch unit and on remotely switched calls where both the calling and called customers are served by the same remote switch unit. Descriptions will now be given of calls using the remote switch unit to demonstrate how the unit operates.

REMOTE LINE—5 LOCALLY SWITCHED

To better illustrate the operation of the remote switch unit, let it be assumed that station 103 which has both its audio and wideband service furnished from the central office places a visual telephone call to station 102 which is furnished wideband service via the remote switch unit and audio service directly from the central office. The call proceeds the same as the intraoffice call previously described. The called directory number assigned to station 102 is translated via number group such as NG and the line location information received from the number group is used by the marker in selecting the appropriate line link frame vertical group, horizontal group and vertical file on which the audio line appears.

It will be recalled from the prior description that the wideband line control circuit was also used to translate the audio line location into a location for the wideband line associated with that station. The wideband line control circuit also indicated to the marker whether the line was served locally or by a remote switch unit. In the example now being described, let it be assumed that a different wideband vertical file relay such as 36WVF1 operates in the wideband line control circuit from the called audio line location information in the marker.

Figure 37:
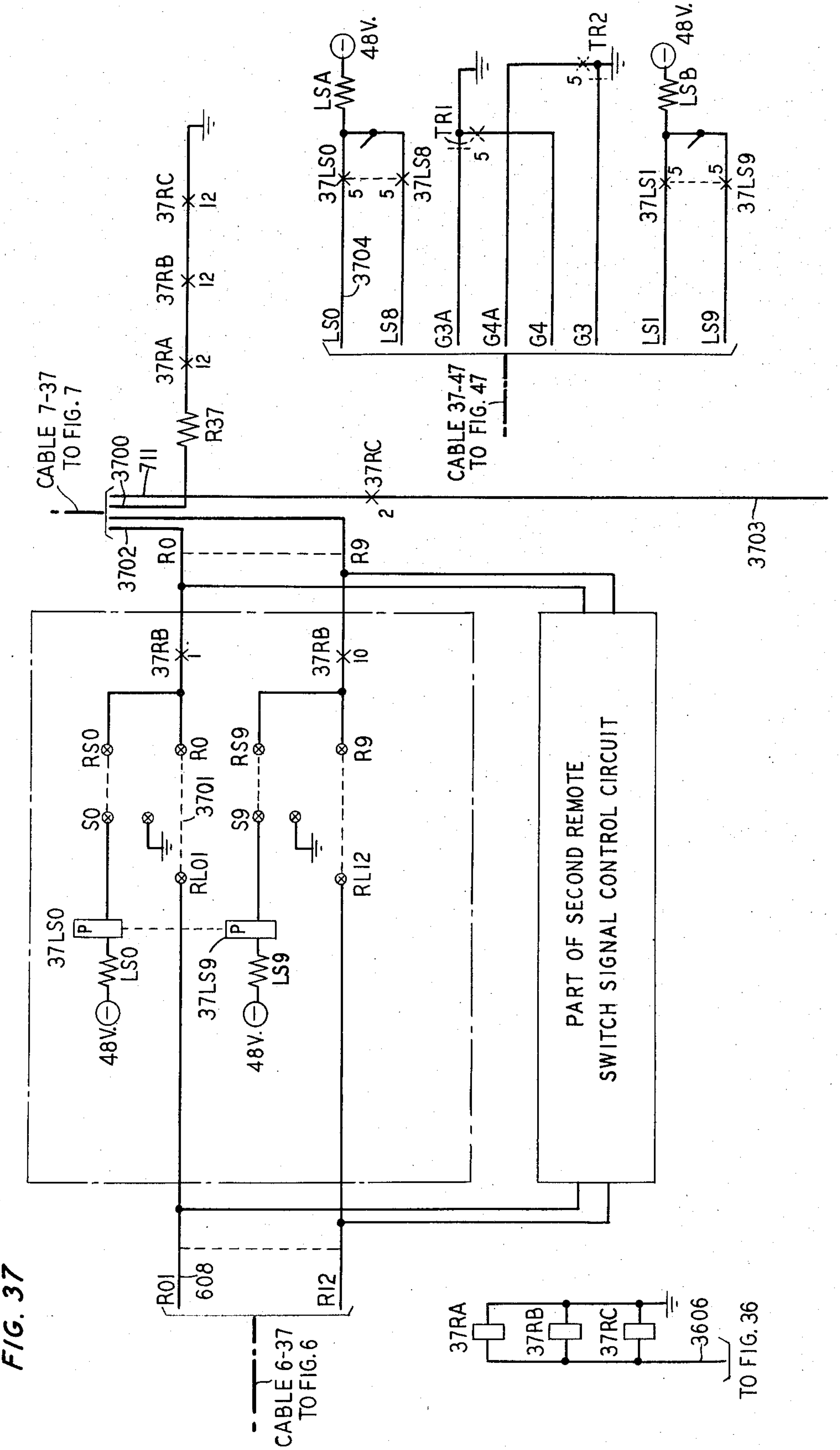
FIGS. 37–40, when arranged according to FIG. 48E, show a remote switch signal control circuit for controlling a wideband remote switch unit.

With relay 36WVF1 operated, battery in FIG. 36 is extended through resistance A, contacts 36WVF1-11 to punching WVA1, over cross connection 3605 to punching RLNO and over conductor 3606 to the remote switch signal control circuit in FIG. 37 to operate connector relays 37RA, 37RB and 37RC. With these relays operated, ground is extended through contacts 37RC-12, 37RB-12 and 37RA-12, resistance R37, over conductor 3700 in cable 7-37 to FIG. 7, through contacts 7MB-6, over conductor 707 in cable 7-26 to FIG. 26, through contacts 28WLC-15, the windings of relays 26RWL and 26XRSC, and through resistance RSC to battery. Relay 26RWL operates indicating to the marker that the called line is served by a remote switch unit.

Locally switched wideband relay 26LSW operates as previously described after the wideband trunk link connector has been actuated as indicated to the marker by the operation of relay 28WTFK. Thus, the marker knows that the call will be locally switched, i.e., via the central office wideband network and one of the stations is served by the remote switch unit. This is manifested in the marker by the operation of relay 26LSWR over a circuit including battery through the winding of that relay, contacts 26RWL-2, 33RSW-2, 28WLC-10, RYC1-3, CWB-3 and 28WBO-3 to ground. For this type of call, the same marker operations are required as previously described and in addition, selection and control of a remote link is required.

Certain verticals of the wideband line link switches can be used for terminating remote links from remote switch units. In setting up a call using the remote links, the remote link appearance on the wideband line link switch takes the place of a customer appearance on these switches.

When relay 37RB operated, the windings of selected wideband line hold magnets associated with remote links were extended to the marker for testing. For example, assuming that wideband line hold magnet 2LH19 is associated with a remote link, then the battery through its winding would be extended over conductor 203 and cross connection 607, through break contacts MBO1-5, over conductor 608 in cable 6-37 to FIG. 37, over cross connection 3701, through contacts 37RB-1, over conductor 3702 in cable 7-37 to FIG. 7, through contacts 7MC-6 in the wideband line link connector, over conductor 708 in cable 6-24 to FIG. 24, through break contacts 30WLO-3, the winding of relay 24WLTO and resistance WLTO, over conductor 2400 to FIG. 27 and through contacts 33RSW-4 to battery. Relay 24WLTO and similar relays will only operate if their associated remote links are busy. Let it be assumed, however, that the remote link associated with hold magnet 2LH19 is idle and relay 24WLTO does not operate.

Figure 30:
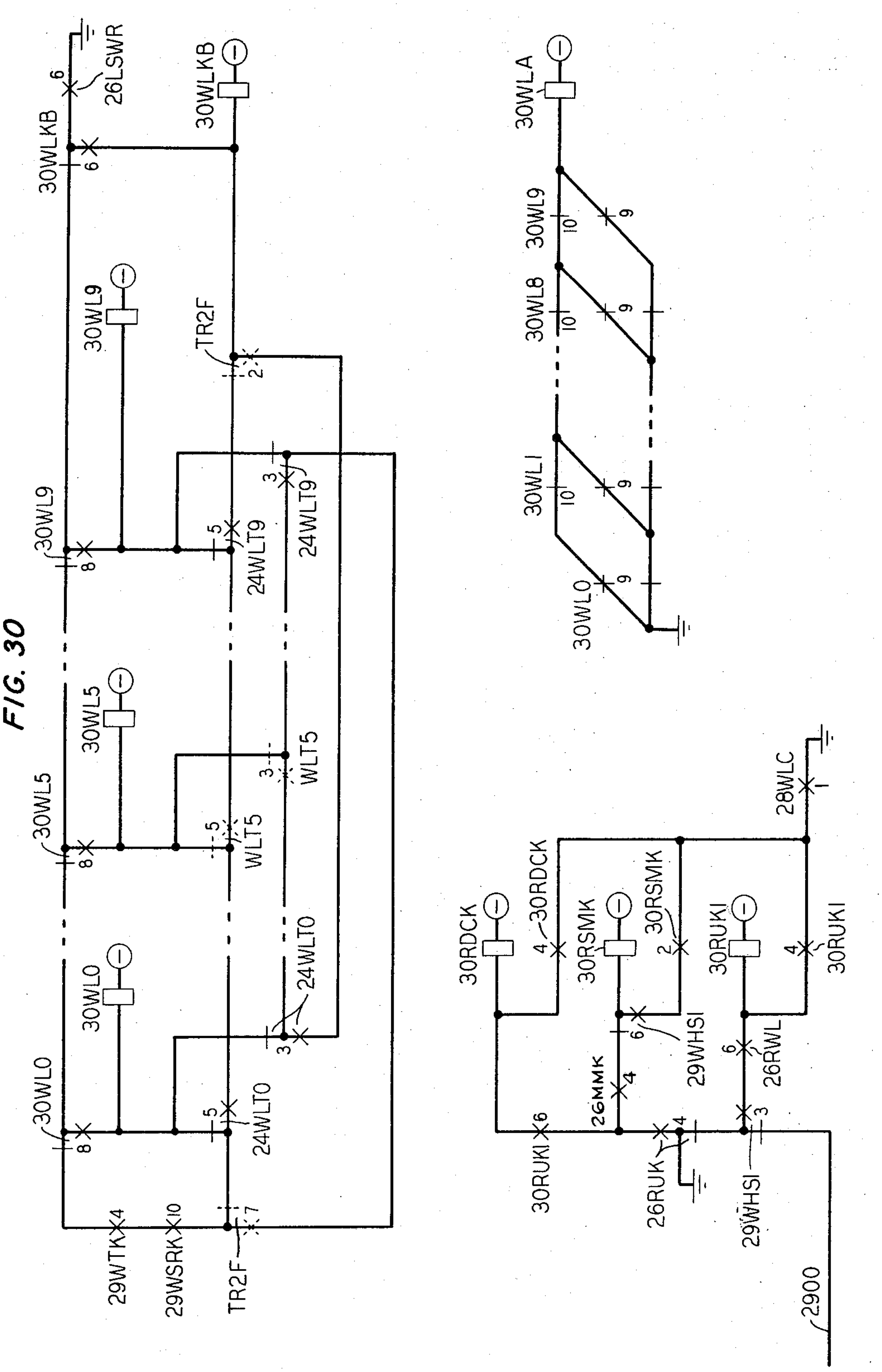

At the same time that the marker is selecting an audio and wideband channel through the respective audio and wideband central office networks, a remote link is being selected by the marker. In FIG. 30, ground is extended through contacts 26LSWR-6, break contacts 30WLKB-6, contacts 8 of relays 30WLO-30WL9, through contacts 29WTK-4, 29WSRK-10, break contacts TR2F-7 and 24WLTO-5 and through the winding of relay 30WLO to battery operating relay 30WLO. If remote link O had been busy, relay 24WLTO would have been operated to extend the ground to a higher numbered relay 30WL- and if all links were busy, the same ground would have operated relay 30WLKB. Relay 30WLO operates relay 30WLA over an obvious circuit which checks that only one wideband link select relay 30WL- has operated. Relay 30WLA also closes its contacts 30WLA-5 in FIG. 32 to extend battery over the start lead to the wideband junctor switch lockout circuit 3200. This delays selection of a central office wideband channel until a remote link is selected.

Figure 24:
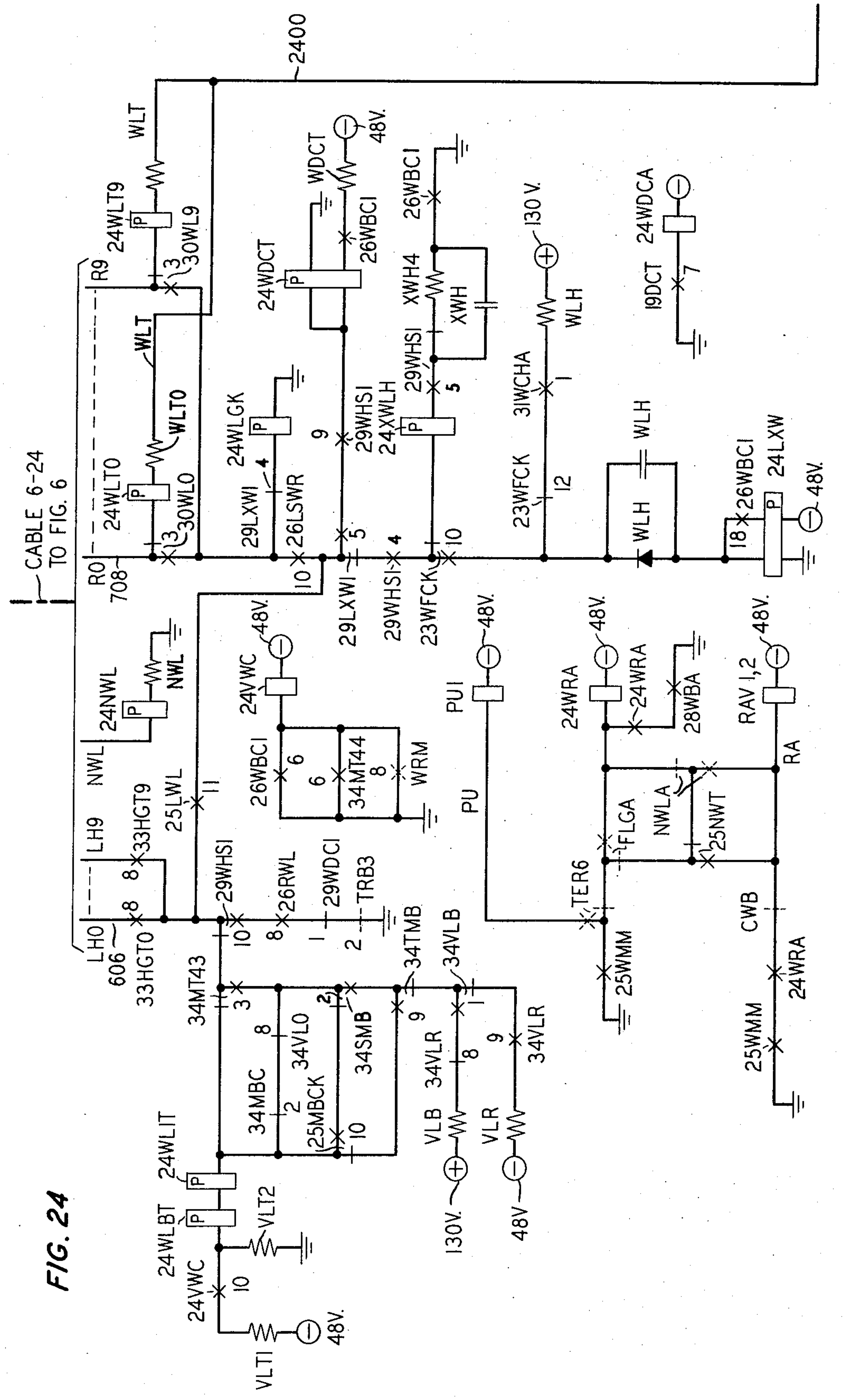

When relay 30WLO operates, its transfer contacts 30WLO-3 in FIG. 24 transfer conductor 708 from the winding of link test relay 24WLTO to the winding of relay 24WLGK to check if there is a false ground on the sleeve of the remote link. Relay 24WLGK operates over this circuit, but the high resistance winding of that relay prevents the remote link hold magnet from operating at this time.

In the illustrative embodiment of the invention, the remote switch unit can have as many as 20 horizontals for trunks and remote links. The marker must therefore identify the horizontal and switch number of the selected remote link so that the proper select magnet can be operated at the remote switch unit. In the example being described, relay 30WLO completes a path for operating relays 39SO and 39AS in the remote switch signal control circuit. This path can be traced from battery through the windings of these relays over cross connection 3900 through contacts 37RA-1 over conductor 3901 in cable 7-39 to FIG. 7, through contacts 7MC-8, over conductor 709 in cable 7-26 to FIG. 26 through contacts 30WLO-4, 26WONX-12, 30WLA-4 and 29WTK-3 to ground. With relay 39SO and 39AS operated, battery is extended through resistance LK in FIG. 39 and through contacts of relays 39AS, 39BS and 39SO- checking that only 39AS and 39SO relays have operated, over conductor 3902 in cable 7-39 to FIG. 7 through contacts 7MC-4, over conductor 710 in cable 7-26 to FIG. 26, through the winding of relay 26MMK and contacts 28WLC-12 to ground operating relay 26MMK.

Figure 40:
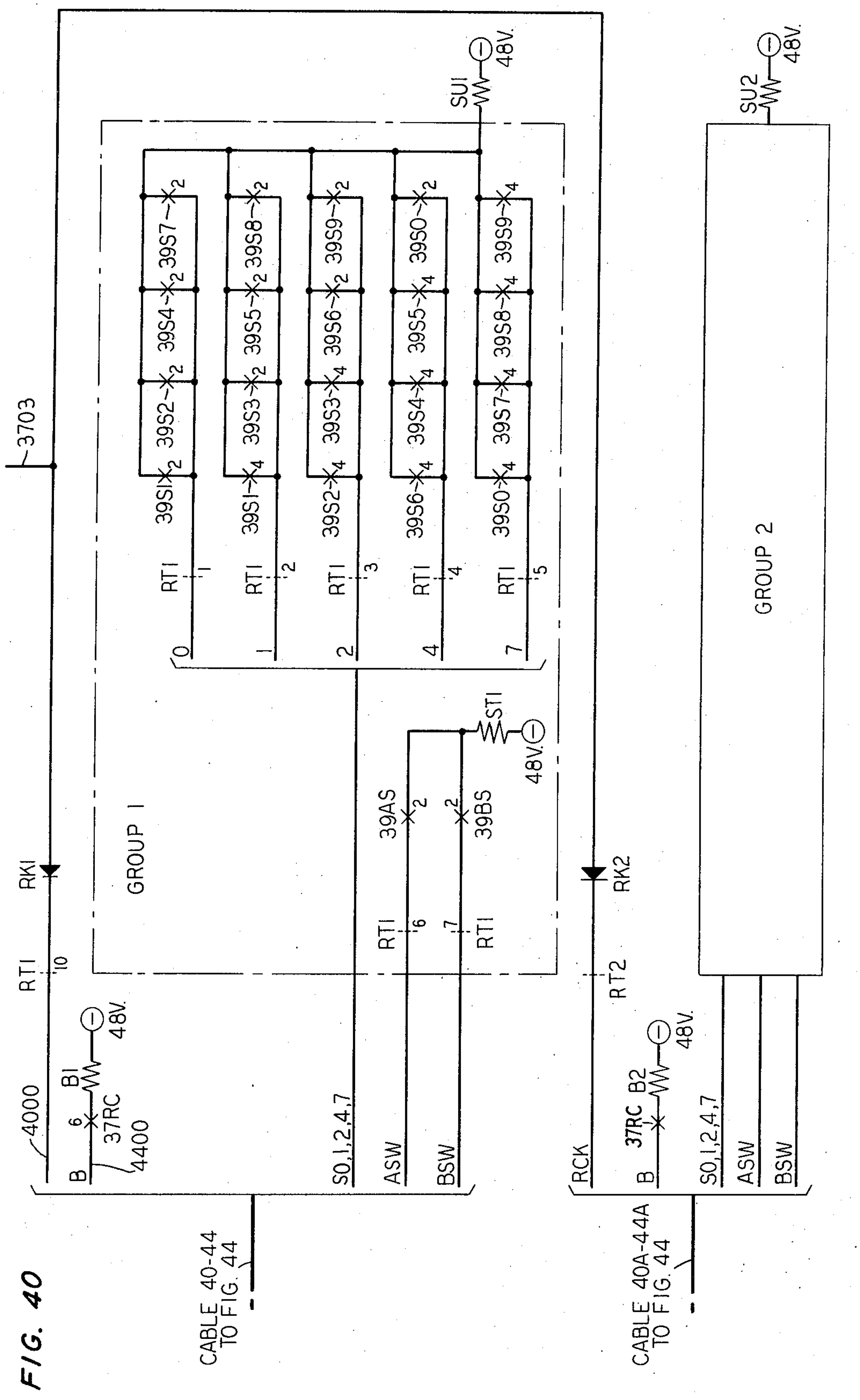
Figure 41:
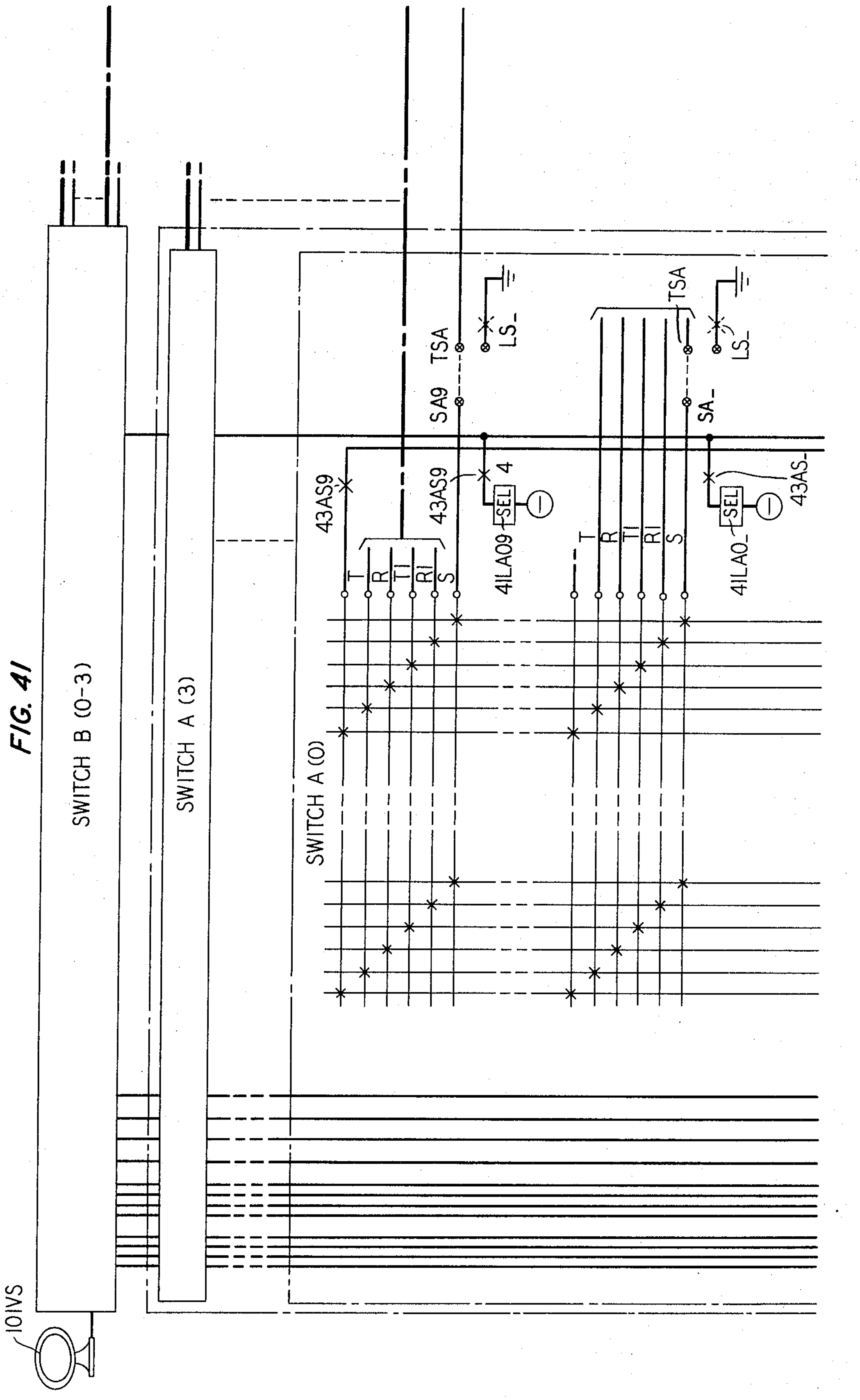
FIGS. 41–47, when arranged according to FIG. 48F, show a wideband remote switch unit.

The information required from the marker for operating the remote switch unit is encoded by the remote switch signal control circuit and transmitted to decoders at the remote switch unit. For reliability certain portions of the encoders and decoders have been provided in duplicate. In FIG. 40, the select magnet information corresponding to the selected remote link is encoded into a one-out-of-two and two-out-of-five indication by the group 1 encoder and transmitted over cable 40-44 to the group 1 select magnet decoder in FIG. 44. Relays 44S4, 44S7, and 44ASW operate in a decoder circuit, and these relays operate relays 44SL4, 44SL7 and 44A, respectively, over obvious circuits in FIG. 44. With relays 44L7, 44L4 and 44A operated, a circuit is completed for operating relay 43ASO. This circuit includes battery through the winding of relay 43ASO conductor 4300 contacts 44A-1, 44SL7-4 and 44SL4-2 to ground.

A path is now completed for operating the select magnet on a remote switch unit associated with the selected remote link. This path includes the winding of select magnet 43LAOO, contacts 43ASO-4, break contacts 43BS9-11 and break contacts of other AS- and BS- relays to ground through make contacts 43ASO-12. When a select magnet operates, it closes its contacts 43LAOO-1 to complete an obvious circuit for operating select magnet check relay 43SMK

Figure 44:
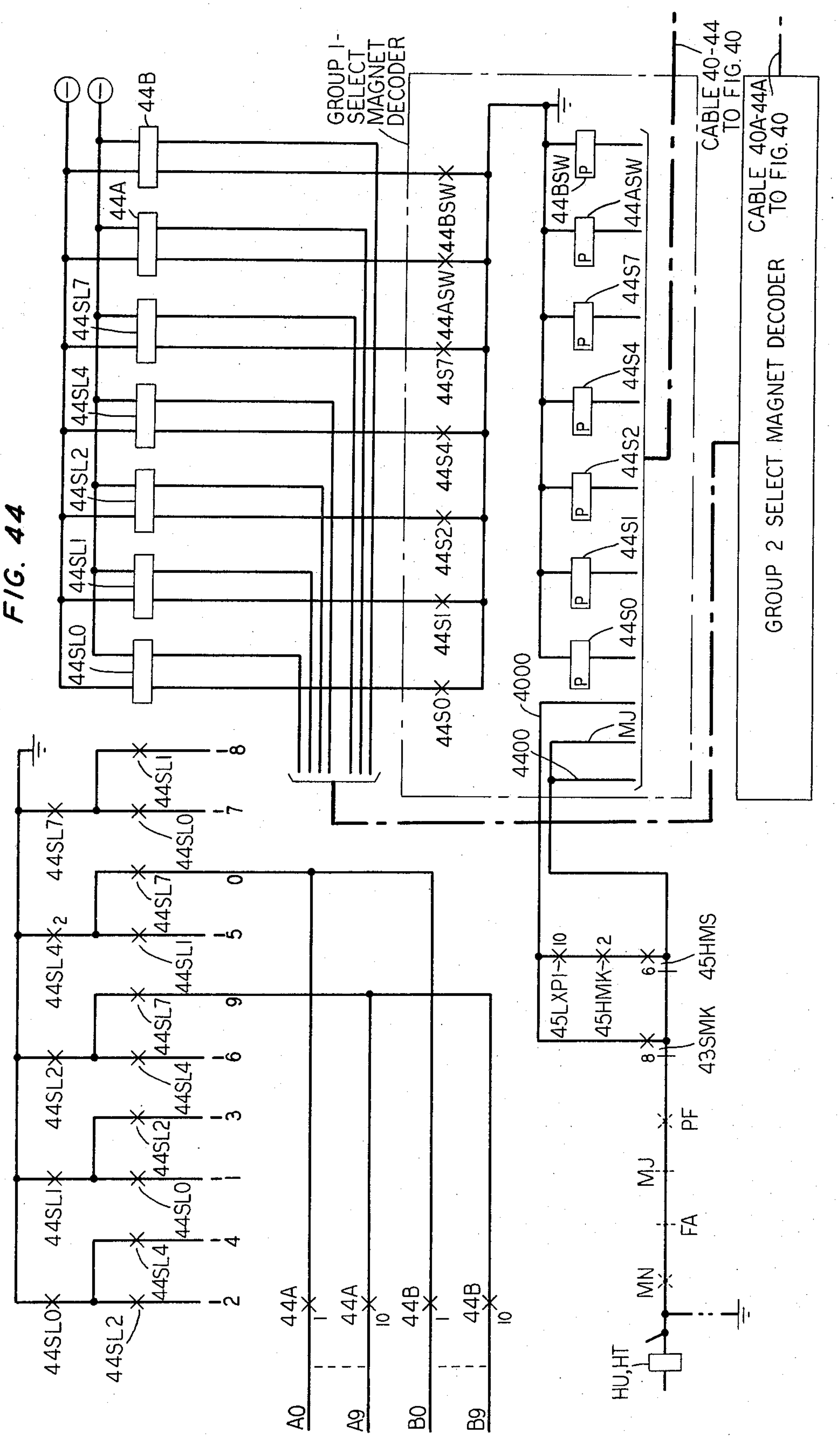

Relay 43SMK, in operating, operates remote switch check relay 26RUK in the marker over a circuit including ground through the winding of relay 26RUK, contacts 28WLC-11 conductor 2600 in cable 7-26 to FIG. 7, contacts 7MC-5 conductor 711 in cable 7-37 to FIG. 37, contacts 37RC-2, conductor 3703 to FIG. 40, diode RK1, normal contacts RT1-10, conductor 4000 in cable 40-44 to FIG. 44, contacts 43SMK-8, break contacts 45HMS-6, over conductor 4400 in cable 40-44 to FIG. 40 through contacts 37RC-6 to battery. At its contacts 26RUK-4 in FIG. 30, relay 26RUK connects ground through contacts 26MMK-4, break contacts 29WHS1-6 and through the winding of relay 30RSMK to battery operating remote select magnet check relay 30RSMK.

Turning now to FIG. 29, it will be noted that on a locally switched call involving a wideband line which is served by a remote switch unit, the operation of transfer contacts 26LSWR-7 prevent the wideband hold magnet start relay 29WHS1 from operating until relay 30RSMK operates. This assures that the hold magnets are not operated until one and only one select magnet on the remote switch is operated.

Relay 29WHS1, in operating, begins the operation of wideband junctor switch hold magnets and wideband trunk switch hold magnets in the central office network as previously described. In addition, relay 29WHS1 grounds a lead to begin encoding the remote line hold magnet information. Identification of the wideband line appearance is made in the wideband line control circuit and passed to a diode matrix in the remote switch signal control circuit. In the example being described, ground on contacts TRB3-2 in FIG. 24 is transmitted through contacts 29WDC1-1, 26RWL-8, 29WHS1-10 and 33HGTO-8 over conductor 606 in cable 6-24 to FIG. 6 through contacts 7MD-1, over conductor 3501 in cable 6-35 to the wideband line control circuit in FIG. 35, through contacts 36WVF1-1, over cross connections 3502 to punching RLAOO, over conductor 3503 in cable 35-38 to the remote switch signal control circuit in FIG. 38, through break contacts 38MBCO-1, 38MTO-1 and 38MBOO-1, over conductor 3800, through diode TOO to operate relay 39TO. The same ground is extended through diode UOO to operate relay 39UO. Relays 39TO and 39UO indicate the tens and units digits of the line hold magnet on the wideband remote switch unit.

Figure 38:
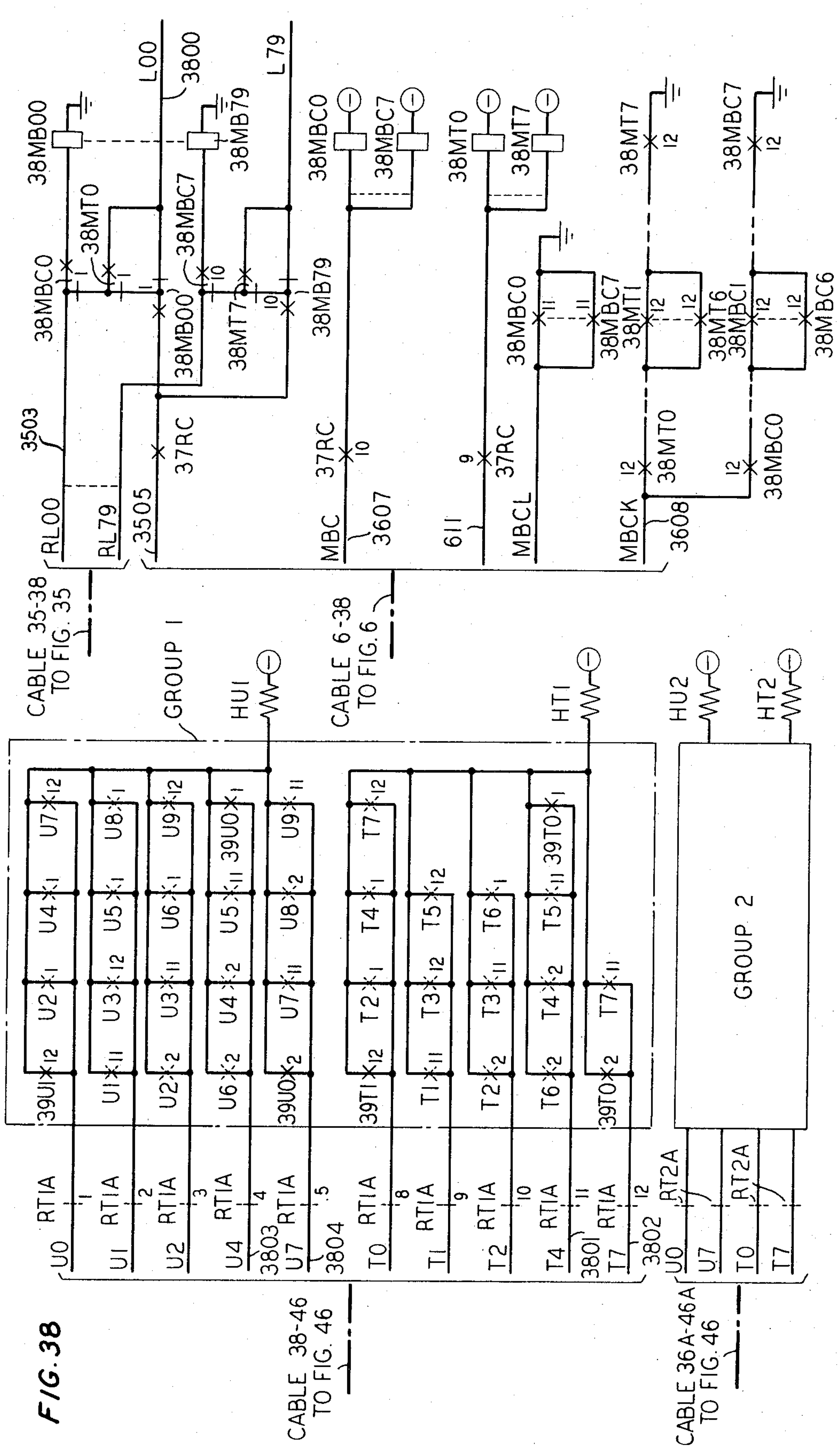
Figure 45:
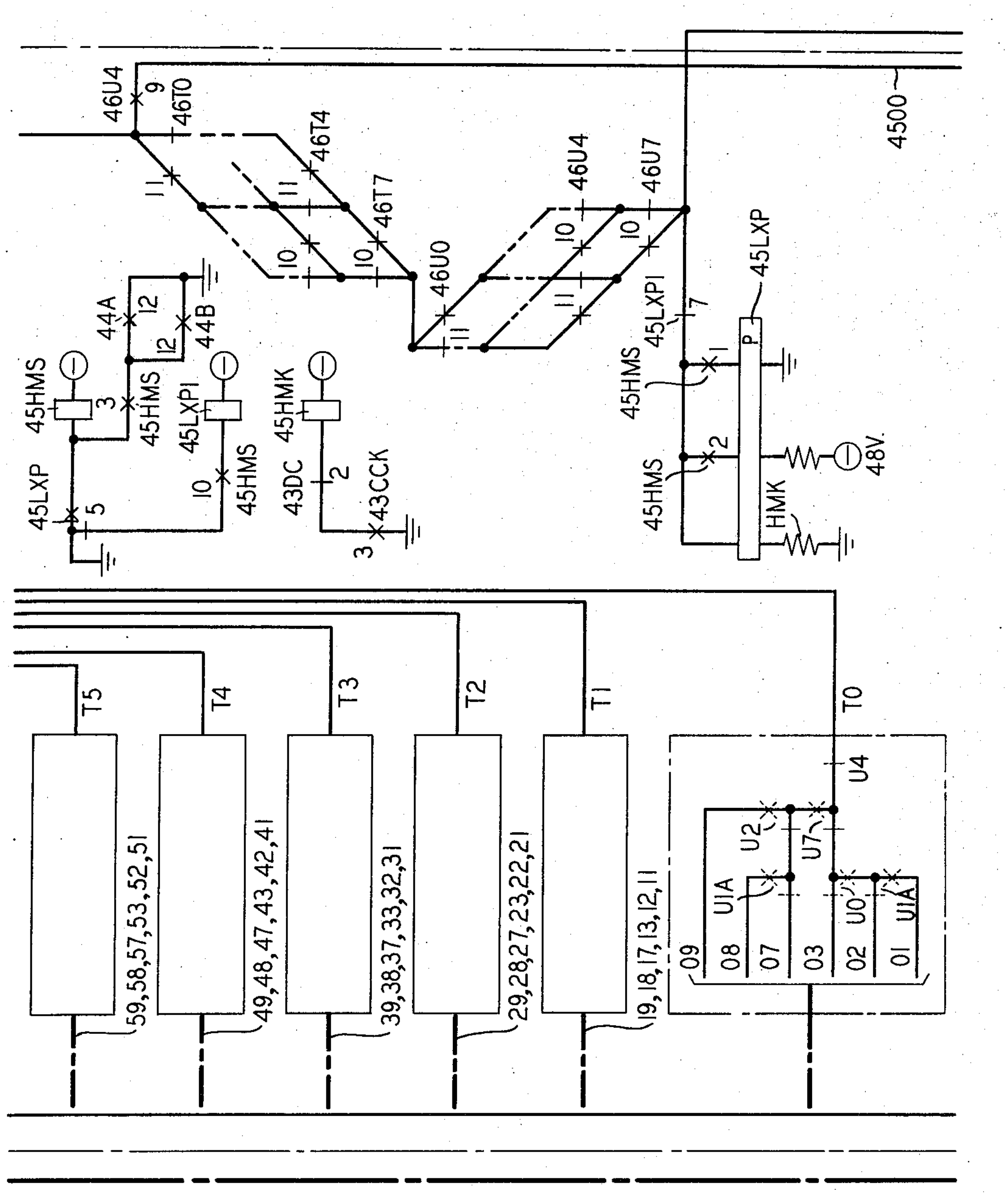
Figure 46:
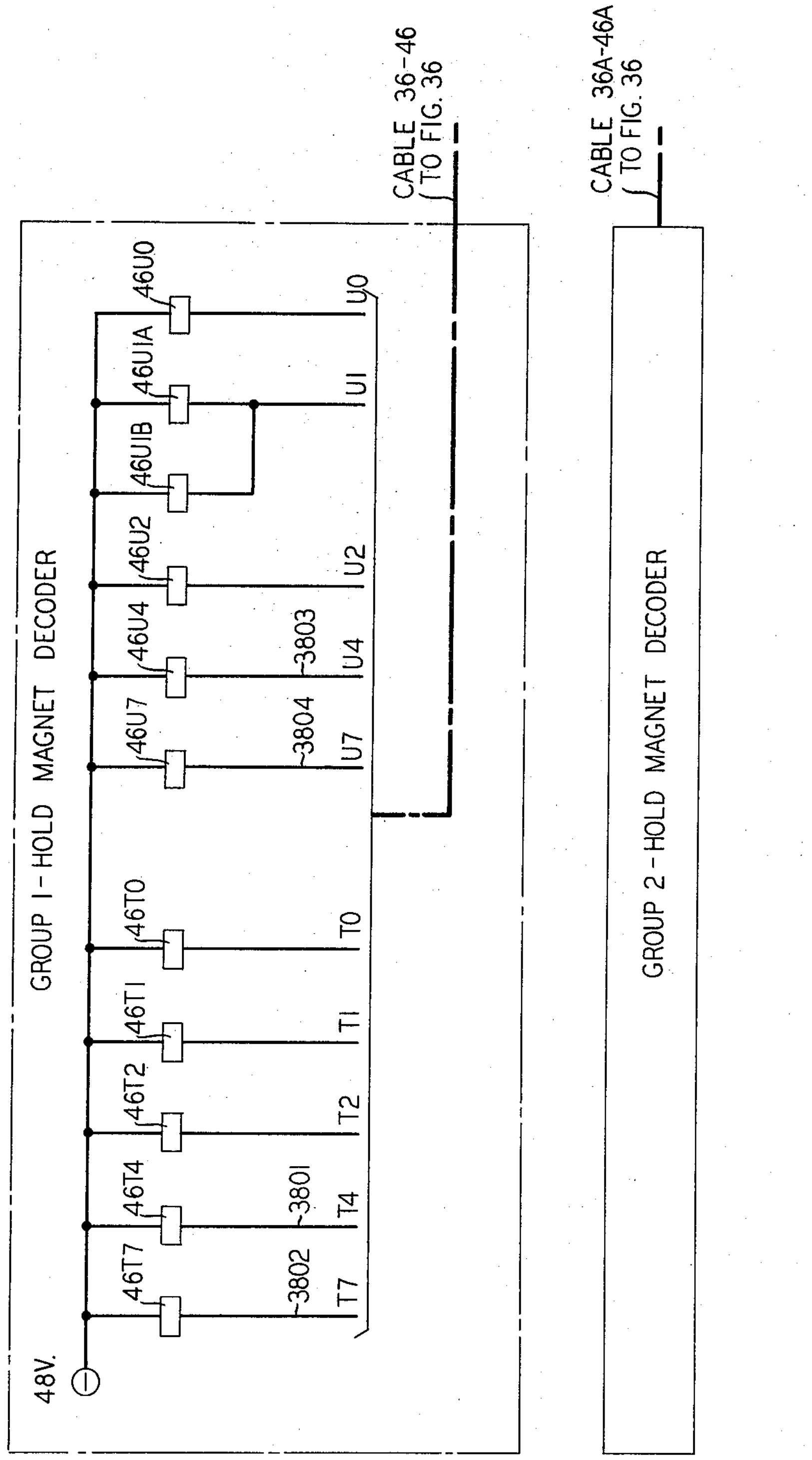

With relay 39TO operated, battery through resistance HT1 in FIG. 38 is transmitted through contacts 39TO-1 and 39TO-2, over conductors 3801 and 3802 in cable 36-46 to FIG. 46, causing relays 46T4 and 46T7 to operate. In a similar fashion, battery is transmitted through resistance HU1 in FIG. 38 through contacts 39UO-1 and 39UO-2, causing relays 46U4 and 46U7 at the remote switch unit to operate. With the tens and units relays (46T4, 46T7, 46U4 and 46U7) operated, ground is extended through resistance HMK in FIG. 45 through the left hand winding of relay 45LXP contacts 45LXP1-7, make contacts 46U7-10 and 46U4-11, break contacts of other 46U- relays including contacts 46UO-11, through make contacts 46T7-10 and 46T4-11, through break contacts of other 46T- relays including contacts 46TO-11, through contacts 46U4-9 over conductor 4500 to FIG. 47, through make contacts 46U7-9, break contacts 46TO-3 and 46T1-3, make contacts 46T4-3 and 46T7-12, over conductor 4700 and through the winding of line hold magnet 43LAHOO to battery. Relay 45LXP operates over this circuit, but because of the high resistance winding of relay 45LXP, the hold magnet 43LAHO does not operate at this time. Relay 45LXP completes an obvious circuit in FIG. 45 for operating relay 45HMS and relay 45HMS closes its contacts 45HMS-1 providing a low resistance ground for operating line hold magnet 43LAHO. In the meantime, the marker has established the audio and wideband channels at the central office and now operates the remote link hold magnet on the wideband line switch. The operating circuit for hold magnet 2LH19 includes ground through the left hand winding of relay 24LXW, diode WLH, contacts 23WFCK-10, 29WHS1-4, 29LXW1-5, 26LSWR-10, 30WLO-3, conductor 708 in cable 6-24 to FIG. 6, contacts 7MC-6, conductor 3702 in cable 7-37 to FIG. 37, contacts 37RB-1, conductor 3701 and 608 in cable 6-37 to FIG. 6, contacts MBO1-5, cross connection 607, conductor 203 and the winding of hold magnet 2LH19 to battery.

Figure 47:
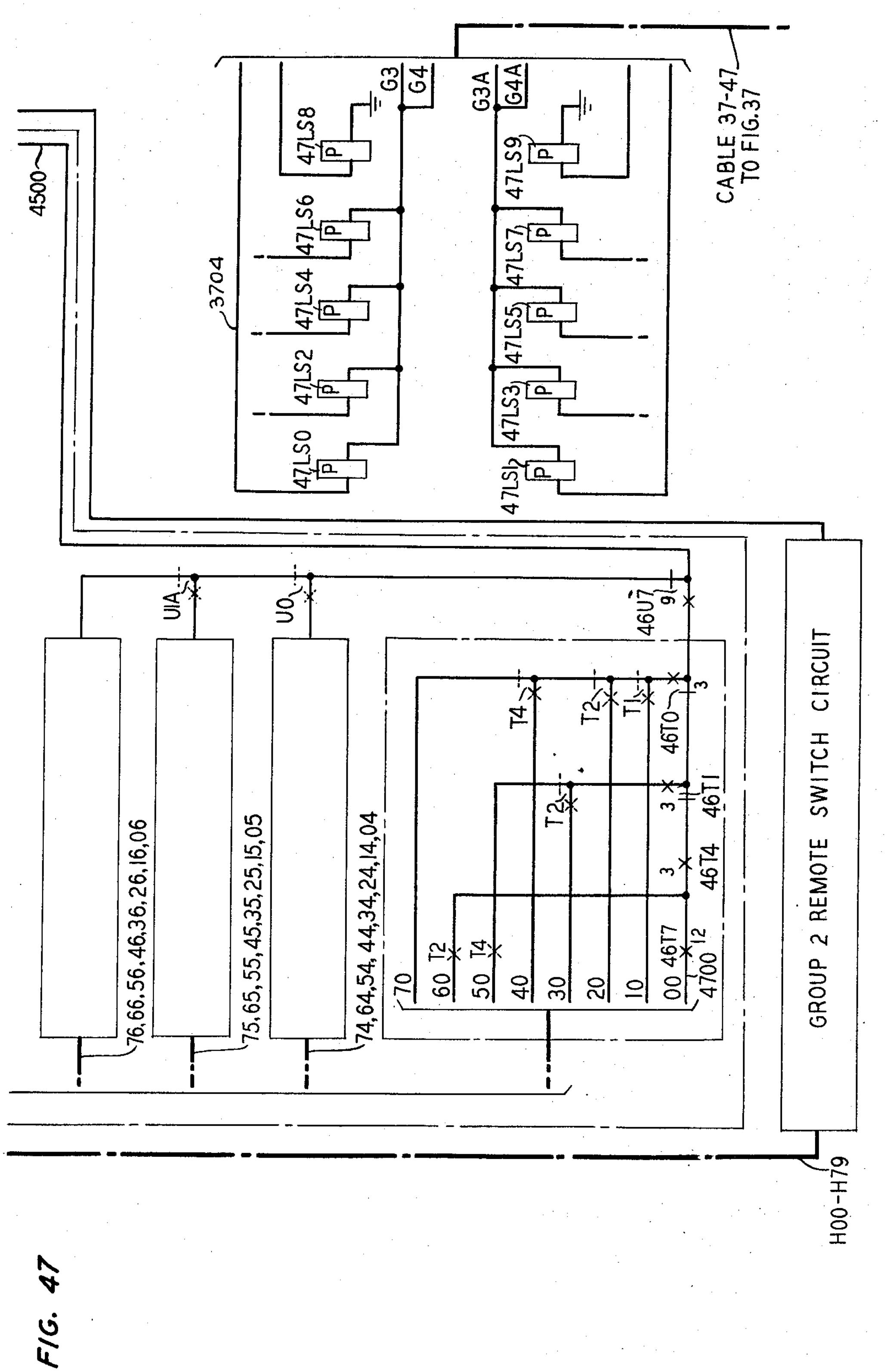

The ground which operates hold magnet 2LH19 also operates relay 37LSO in the remote switch signal circuit and relay 37LSO transmits battery through its contacts 37LSO-5 over conductor 3704 in cable 37-47 to FIG. 47 to operate relay 47LSO at the remote switch unit.

When the line hold magnet 43LAHO operates, it closes cross points 4301 and locks to ground over the sleeve from contacts 47LSO-2. This ground is also transmitted over the previously traced operating circuit for relay 45LXP and shunts down relay 45LXP. With relay 45LXP released and relay 45HMS operated, an obvious circuit is completed for operating relay 45LXP1.

Figure 43:
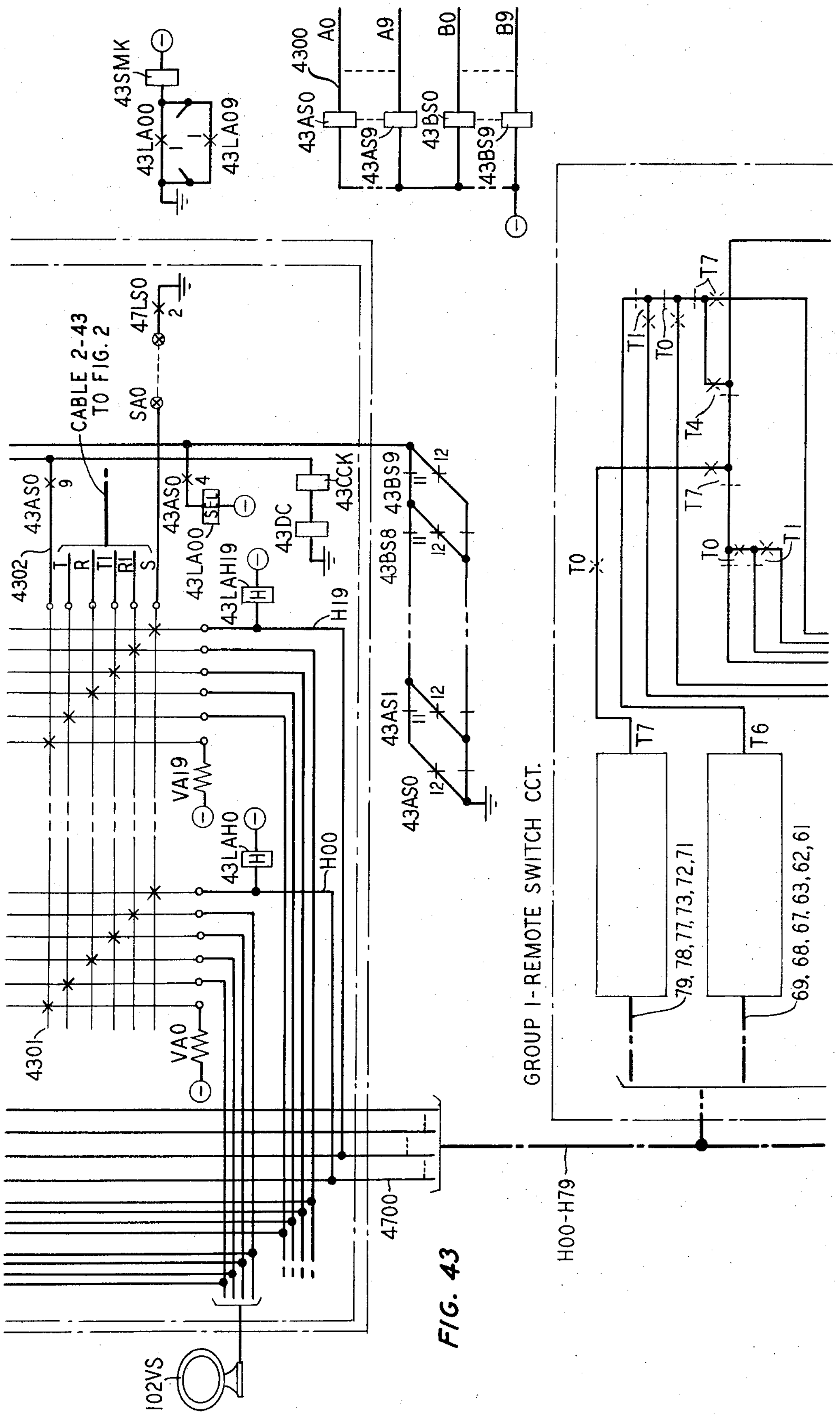

When the line hold magnet on the wideband remote switch unit operated, battery through resistance VAO in FIG. 43 was extended through the operated cross points over conductor 4302, through contacts 43ASO-9 and through the windings of relays 43CCK and 43DC to ground. Continuity check relay 43CCK operates, but due to the high resistance in this circuit, double connection relay 43DC does not operate at this time. Relay 43DC will operate, however, if a double connection exists, such as when both hold magnets 43LAHO and 43LAH19 are operated connecting resistances VAO and VA19 in parallel.

Relay 43CCK, in operating, closes its contacts 43CCK-3 in FIG. 45 to provide an obvious operating circuit for relay 45HMK. In FIG. 44, relay 45HMK closes its contacts 45HMK-2 to reestablish the operating path for marker relay 23RUK. With relays 23RUK and 30RUK1 operated, a path is completed for operating remote double connection check relay 30RDCK. This path includes battery through the winding of that relay, contacts 30RUK1-6 and make contacts 26RUK-4 to ground.

The successful completion of all wideband linkage checks is indicated by the operation of relay 29WDC1. This has been described with respect to the intraoffice call involving lines served by the same central office wideband network. On a locally switched call wherein one line is served by a remote switch unit, relay 30RDCK must be operated before relay 29WDC1 can operate to assure that the double connection test was satisfactorily performed at the remote switch unit.

The marker then proceeds in the manner described in the prior call by releasing the equipment associated with the called line so that the marker can proceed with the call back portion of the call wherein wideband and audio channels are established between the calling station and the intraoffice trunk. In releasing the equipment used on the call forward portion of the call, the marker also releases relays 39SO and 39AS in the remote switch signaling control circuit by opening its contacts 29WDC1-1 in FIG. 24 and removing the ground from conductor 606. The release of these relays releases the select magnet on the remote switch unit.

If two hold magnets on the remote switch unit were inadvertently operated causing double connection relay 43DC to operate, relay 43DC would block the operation of hold magnet check relay 45HMK and prevent this relay from signaling the marker that cross points have been properly closed at the remote switch unit. The marker would then abandon its attempt to set up this connection and produce the appropriate trouble indication.

REMOTE LINES—REMOTELY SWITCHED

Let it now be assumed that a customer served by a remote switch unit places a video telephone call to another customer served by the same remote switch unit whereby the wideband portion of the call will be completed over an intraremote switch trunk while the audio portion of the call will be completed via the central office network.

As mentioned in the general description, each audio trunk circuit has a wideband counterpart. In the case of intraoffice trunks, certain trunks have their wideband counterparts terminated on the wideband trunk link switches at the central office while other audio intraoffice trunks have their wideband counterparts terminated on switches at the remote switch unit. The selection of the appropriate audio and wideband intraoffice trunks is accomplished through the use of class of service information derived from the audio line equipment location and stored in the originating register during the dial tone connection. In the prior example, the calling station was served by the central office wideband network and class of service relays 33CTO and 33CUO were operated. With this class of service, the receipt of the local office code by the marker caused route relay 33RR1 to operate and route relay 33RR1 gave the marker access to the audio intraoffice trunks whose wideband counterparts were terminated on the wideband trunk link switches in the central office.

Stations whose wideband service is furnished via a remote switch unit have a different class of service and in the example being described, it will be assumed that the calling line class of service causes relays 33CTO and 33CU1 operate in the marker when the originating register seizes a marker after the customer completes dialing. With relays 33CTO and 33CU1 operated, an obvious circuit is completed for operating screening relay 33S1. With the local office code point grounded and screening relay 33S1 operated, a path is completed for operating route relay 33RR2. Route relay 33RR2 gives the marker access to a group of audio intraoffice trunks whose wideband counterparts are terminated on the remote switch unit serving the calling and called customers. When route relay 33RR2 operates, it completes an obvious path in FIG. 33 for operating relay 33RSW indicating to the marker that this is a remotely switched call. Relay 33RSW, at its contacts 33RSW-2 in FIG. 26, prevents relays 26LSW and 26LSWR from operating.

The marker now tests the appropriate trunk route and seizes an idle trunk in the manner previously described. The audio intraoffice trunk used on a remotely switched call is similar to the audio intraoffice trunk used on a locally switched call and it need not be shown separately in a drawing. Instead, let it be assumed that trunk 115A is now associated with the wideband intraremote switch trunk 108WB in FIG. 42 via the circuitry shown dotted in FIG. 12.

After seizing the idle audio intraoffice trunk, the marker seizes a number group to translate the called directory number into an equipment location on the audio line link frame. In an example being described, let it be assumed that the call originated at station 101 and is directed to station 102. The called directory number for station 102 is translated into the line link frame number, vertical group, horizontal group and vertical file and the marker uses this information to seize the audio line link frame. As with the locally switched call involving a remote line, the called line location is also transmitted to the wideband line control circuit.

Although with a remotely switched call, no connections will be established on the wideband line link switches and wideband trunk link switches, the marker gains access to the wideband remote switch signal control circuit via the wideband trunk link connector and wideband line link connector. When the marker seizes the audio trunk link frame, therefore, it also seizes the appropriate wideband trunk link connector and operates relays 8MA and 8MB. With these relays operated, ground is transmitted from the wideband trunk link connector over conductor 801 to operate check relay 28WTFK in the marker. The operating circuits for these relays have been previously traced and need not be repeated herein.

It will be noted, however, that there is no relay in the intraremote switch trunk corresponding to relay 5F in wideband trunk 115WB. Relay 8T does not operate in the wideband trunk link connector as indicated by the release condition of check relay 28TSK in the marker.

In a similar fashion, the marker actuates the wideband line link connector operating relays 7MA, 7MB, 7MC and 7MD. These relays cause wideband line link frame check relay 25WLFK to operate in the manner previously described.

As with locally switched calls involving a remote line, the called line location is also transmitted to the wideband line control circuit which causes relays 37RA, 37RB and 37RC to operate in the wideband remote switch signal control circuit. On locally switched calls, however, relay 37RB extended the sleeve conductors from as many as ten remote links to the windings of relays 24WLT0-24WLT9 so that the marker could determine the busy-idle status of the remote links. Since remote links are not used on a remotely switched call, contacts 33RSW-4 in FIG. 27 interrupt the operating circuits for the remote link test relays 24WLT-.

A circuit is now completed for operating the wideband total check relay 29WTK. This circuit includes battery through the winding of that relay, contacts 24WLFK-2, 28WTFK-2, 32WCK-2, 24VWC-3, make contacts 33RSW-10, break contacts 26LSW-7 and 25LWL-3, make contacts 26RWL-10 over conductor 2900 to FIG. 30 and through break contacts 29WHS1-3 and 26RUK-4 to ground.

Figure 31:
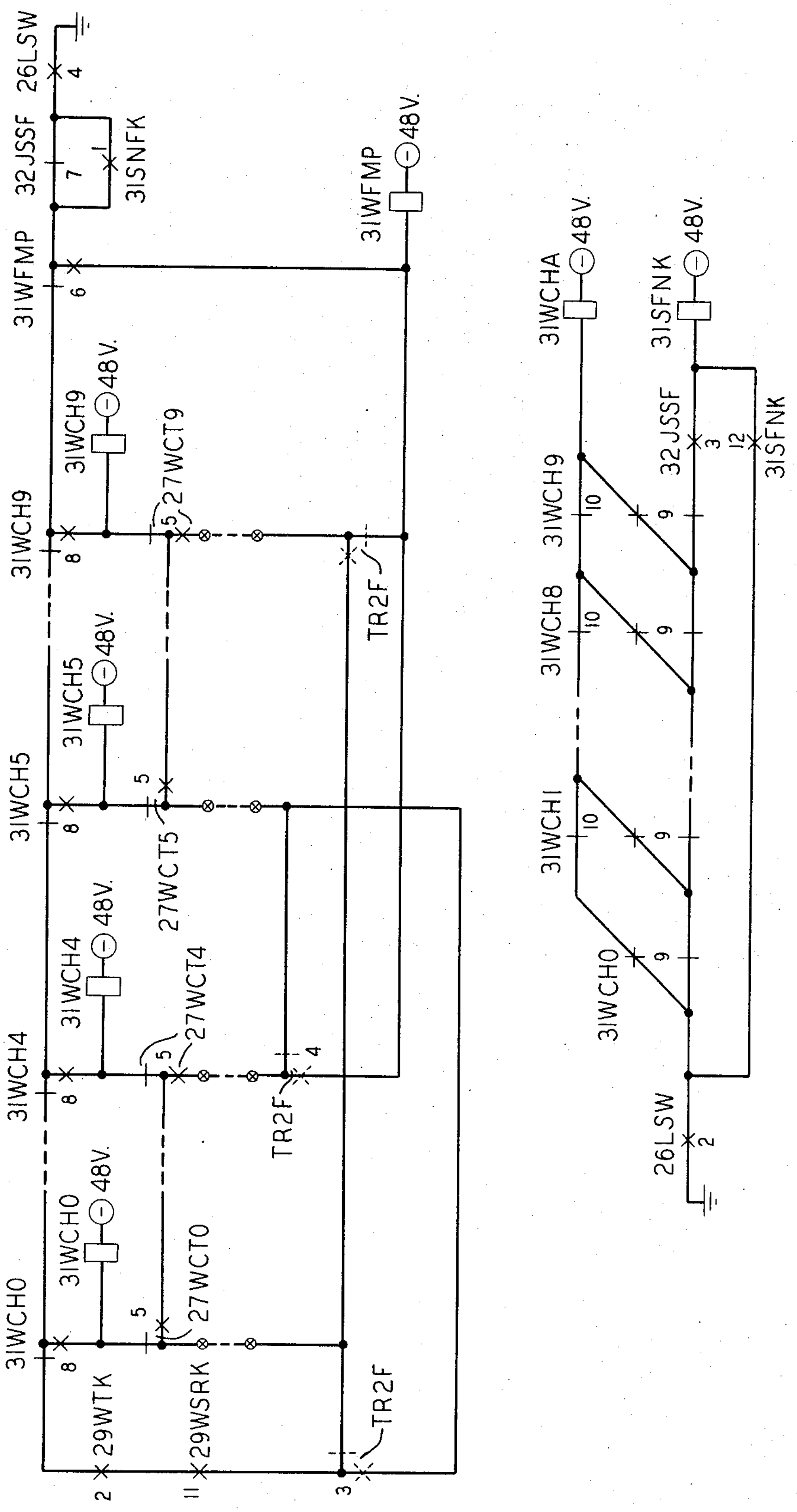

In the prior examples of locally switched calls, the operation of relay 29WTK caused the marker to begin wideband channel selection. With relay 26LSW released on a remotely switched call, its contacts 26LSW-4 in FIG. 31 are opened and wideband channel selection is blocked. The marker still proceeds with the selection of an audio channel in the manner previously described.

Figure 39:
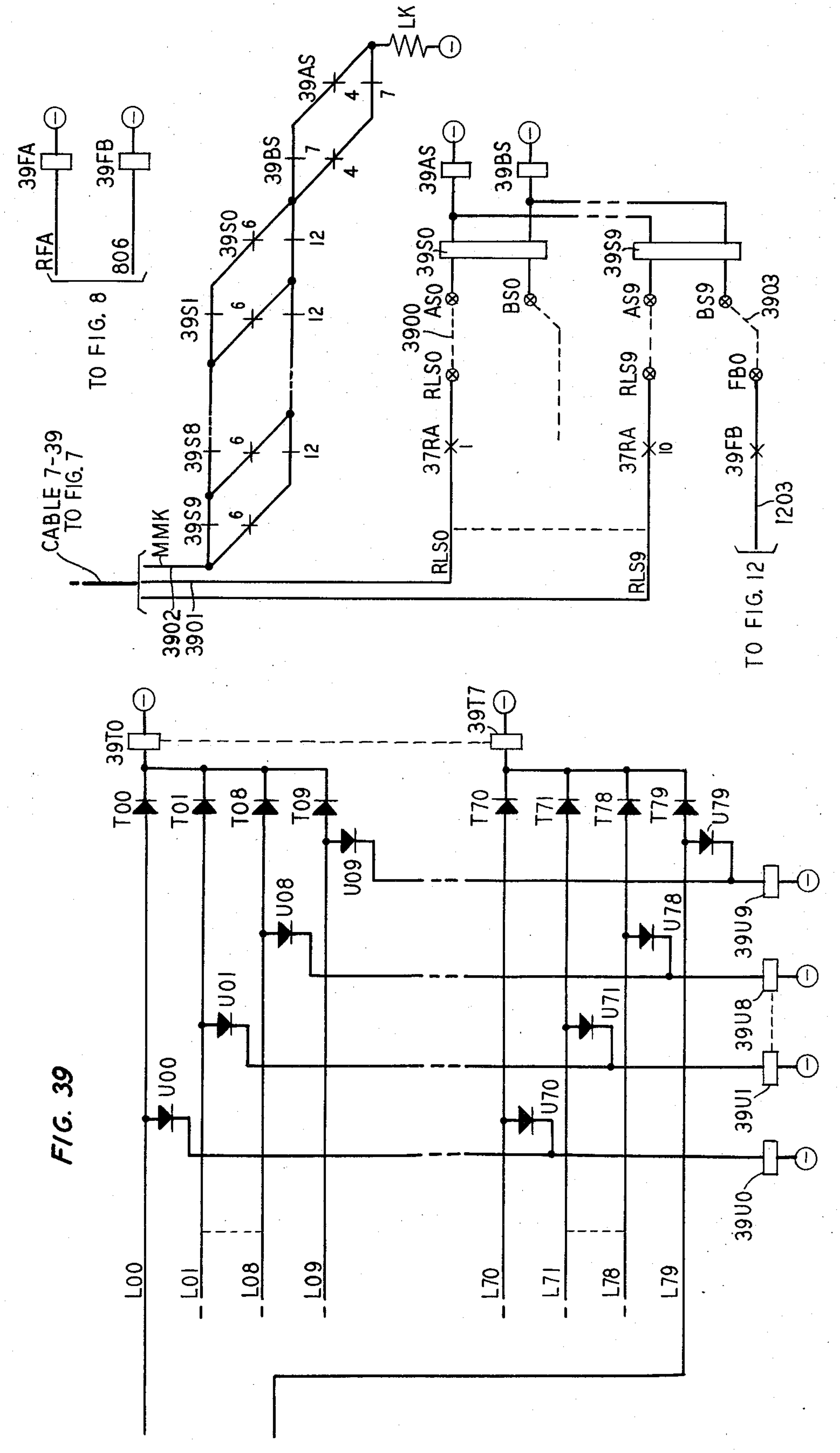

Relay 29WTK completes a circuit for operating relay 39FB in the remote switch signal control circuit over a path including ground through contacts 29WTK-3 in FIG. 26 contacts 33RSW-3, the winding of relay 26XFR, contacts 26WONX-6, 21FBK-4, RVT-2, conductor 2601 in cable 8-26 to FIG. 8, contacts 8MB-2, conductor 806 to FIG. 39 and through the winding of relay 39FB in the remote switch signal control circuit to battery. When relay 39FB operates, ground from contacts 12F-11 in the audio intraoffice trunk is extended over conductor 1203 through contacts 39FB-1 to punching FB0, over cross connection 3903 to punching BS9 and through the windings of relays 39S9 and 39BS. It will be recalled from the description of the locally switched call involving a remote line that the operation of one of the relays 39S- and either relay 39AS or 39BS cause coded select magnet signals to be transmitted to the remote switch unit. At the remote switch unit, these signals were decoded and the corresponding select magnet was operated. In this example, a select magnet on one of the B switches associated with the called end of the intraoffice trunk is operated.

After the remote select magnet check relay 30RSMK operates in the marker, relay 29WHSI operates to begin the operation of hold magnet 43LAHO which serves the video set 102VS. On remotely switched calls, the continuity and false cross and ground tests are omitted and relay 29WDC1 operates over a path including battery through its winding, contacts 30RDCK-8, 33RSW-12 and 28WLC-8 to ground. Relay 29WDC1 releases relay 26WONX which releases relay 39FB and 39S9 in the remote switch signal control circuit. Relay 29WDC1 also releases relays 39TO and 39UO in the same circuit. Certain other relays used on the call forward portion of the call release as previously described and the marker is ready to process the call back portion wherein channels are established between the wideband and audio intraoffice trunks in the calling station.

Marker operation during the call back portion of the call is substantially as described above except when relay 21FAK operates in the marker with relay 33RSW operated, relay 39FA in the remote switch control circuit operates to transmit to the remote switch unit the select magnet information associated with the calling end of the wideband intraremote switch trunk.

Figure 42:
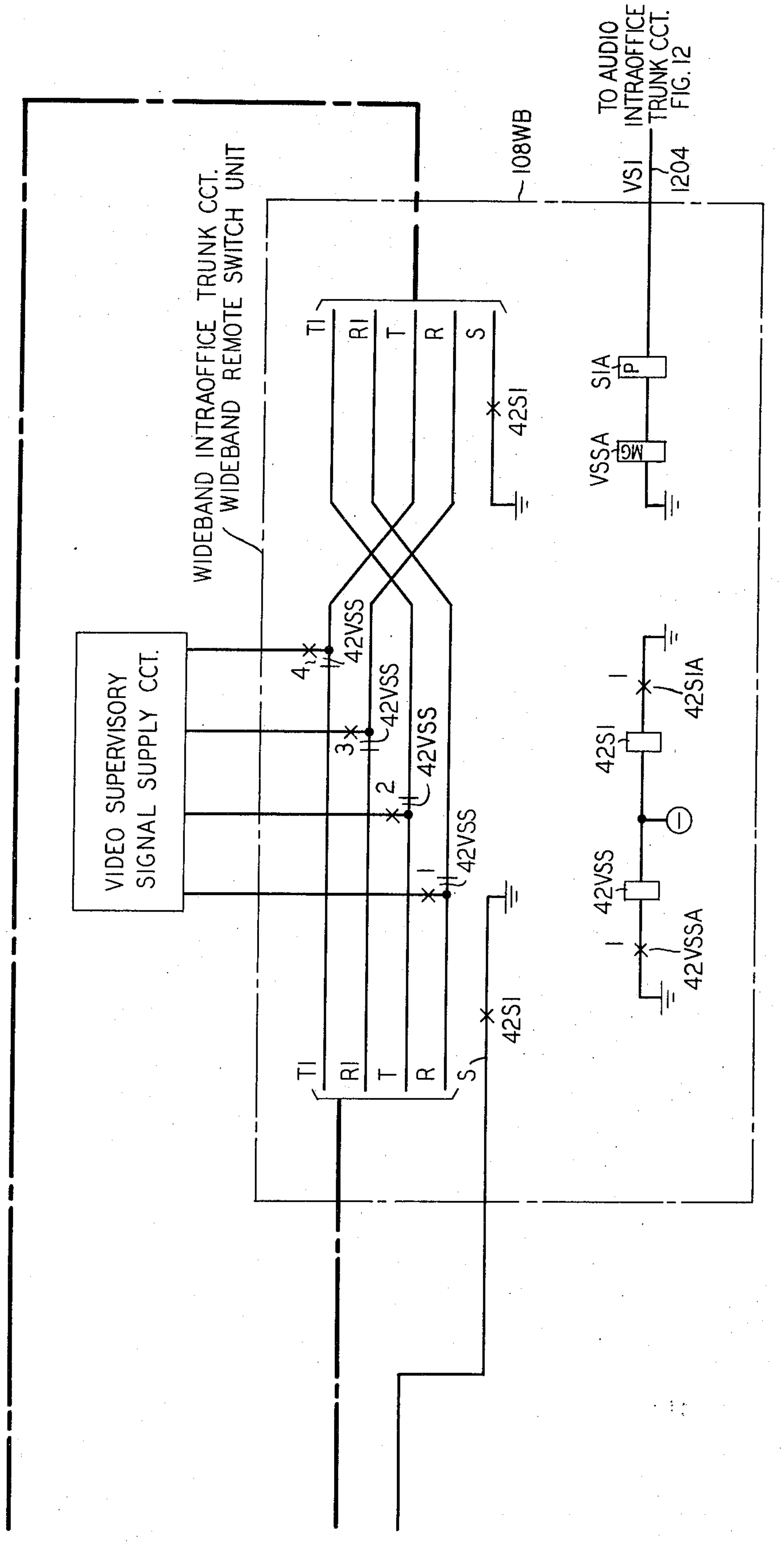

When the marker releases relay 12F in the audio intraoffice trunk after the connection to the calling subscriber has been established, a low resistance battery is transmitted over conductor 1204 to the wideband intraremote switch trunk circuit in FIG. 42 to operate relay 42VSSA. Relay 42VSSA operates relay 42VSS which transmits a video supervisor signal to both stations to turn on the video sets at each station. The called station is rung over the audio connection with a distinctive ring. When the called party answers, the ringing is tripped and relay RC in the audio intraoffice trunk operates to release relays 42VSSA and 42VSS in the wideband intraremote switch trunk circuit. When relay 42VSS releases, it removes the video supervisory signal from the wideband connection and establishes a four-wire transmission path between the calling and called video stations.

MATCHING FAILURES

It will be recalled from the prior description that both audio and wideband transmission channels to the office were made up of a plurality of links and that a channel was idle only if all components of the channel were idle. Conversely, if any component of a channel was busy, that channel could not be used to interconnect the lines and the selected trunks. In the event of a matching failure, i.e., when all channels are busy between the lines and trunks to be connected, alternate actions can be taken on certain calls.

For example, in FIG. 30 there is shown a portion of the circuitry which was used in selecting an idle remote link to the remote switch unit. If all remote links are busy between the remote switch unit and the central office wideband network, relay 30WLKB operates. Since there are no alternate links between the remote switch unit and the central office, no alternate action can be taken and relay 30WLKB operates relay 22FMP directly. The substitution of a different line or trunk switch is not possible in this type call and overflow tone is returned to the calling customer.

If the marker cannot select an idle channel through the central office wideband network, relay 31WFMP operates. On a call involving a local line with relay 25LWL operated, an obvious circuit is completed for operating relay 22FMP which causes the marker to recycle and pick another trunk in hopes of selecting a trunk which can be connected to the line over an idle channel. If the call involves a remote line, relay 25LWL will not be operated and the operation of relay 22FMP from contacts 31WFMP-1 is delayed until relay 30WLA operates, indicating that remote links are available. Thus, before recycling the marker, on originating calls encountering a wideband failure to match relay 25LWL must be operated indicating a locally terminated line or relay 30WLA must be operated indicating that a remote link has been selected.

In a similar manner, either contacts 30WLA-6 or 25LWL-6 must be operated if the marker encounters a failure to match in the audio network while processing a wideband call. This prevents the marker from initiating conflicting alternate actions such as attempting to recycle on the audio failure match while also attempting to return overflow if all remote links are busy.

WIDEBAND MAKE BUSY

Every line with wideband service has a magnetically latching relay associated with it. The latching relays are used to indicate that the wideband line has been made busy for maintenance reasons without disabling the corresponding telephone line which is used for the voice portions of video telephone calls. The latching relays are located either in the wideband line control circuit for lines served by the central office wideband network or in the remote switch signal control circuit for wideband lines served by a remote switch unit.

The make busy latching relays are controlled by the marker under the direction of a master test frame. The master test frame is a facility which permits maintenance personnel to simulate various calls and performs many tests on the equipment. In the embodiment of our invention, the master test frame will be represented in block diagram form to simplify the drawing, and it will be understood that the equivalent circuitry is well known in the prior art and need not be disclosed in detail herein.

When it becomes necessary to make the wideband portion of a customer line busy, a test call is originated at the master test frame. By operating various keys on the test frame, the maintenance man can select the particular units of equipment to be used on the test call in addition to identifying the line location of the wideband line that is to be made busy. For a test call of this type, marker test relays 34MT43 and 34MT44 operate in the selected marker to extend numerous test leads from the marker to the test frame. In addition, relay 34MT44, in a circuit not shown, prevents any linkages from being established. In FIG. 24 contacts 34MT44-6 complete an obvious operating circuit for verify wideband class relay 24VWC, and in FIG. 34 relay 34VLB, 34VLR or 34VLO operate depending on the operation of one of the keys K1, K2 and K3 on the master test frame. For the example being described, let it be assumed that the wideband line is to be seized and made busy and therefore relay 34VLB operates in the marker when the marker is seized by the master test frame.

The marker proceeds with processing the call initiated by the master test frame up to the point where the marker tests the busy-idle condition of the wideband line. Assuming that the wideband line is initially idle, relay 25WCV operates as previously described. With relay 25WCV operated, a circuit is completed in FIG. 34 for operating relay 34MBC. This circuit includes a winding of relay 34MBC, break contacts 34TMB-3 and 34MBCK-9, make contacts 34VLB-2, break contacts 34VLR-10 and 34VLO-12, make contacts 25WCV-4 and 34MT44-8 to ground. Relay 34MBC opens its break contacts 34MBC-2 in FIG. 24 to open the operating circuit for relays 24WLBT and 24WLIT. When relay 24WLIT releases, it opens its make contacts 24WLIT-5 in FIG. 25 to release relay 25WCV. A circuit is now completed for operating relays 36MBCO through 36MBC7 in the wideband line control circuit or relays 38MBC0 through 38MBC7 in the remote switch signal control circuit depending on whether the line to be made busy is served by the central office wideband network or a remote switch unit. Assuming that the wideband line associated with station 104 is to be made busy, relays 36MBC0 through 36MBC7 operate over a circuit including battery through windings of these relays contacts 36LOC-1, conductor 3607 in cable 6-36 to FIG. 6, contacts 7MB-4, conductor 609 in cable 6-25 to FIG. 25, through make contacts 34MT44-10, 34MBC-1 and 34TMB-6 and through break contacts 25WCV-3 to ground. Relays 36MBC0–36MBC7 complete a path for extending ground over conductor 3608, through contacts 7MD-5, conductor 610, contacts 34MT43-10 and the winding of relay 25MBCK to battery. Relay 25MBCK operates indicating to the marker that the 36MBC-relays in the wideband line control circuit have operated.

At its contacts 36MBC0-3, relay 36MBC0 disconnects the winding of the line hold magnet from conductor 3504 and connects the winding of magnetic latching relays 35MB00 to conductor 3504. The other end of the winding of relay 35MB00 is connected to ground and this ground operates relay 24WLBT in the marker. The operation of relay 24WLBT on a service call indicates that the wideband line is busy but on a test call such as this, the marker interprets the operation of relay 24WLBT as an indication that the latching relay is connected to the circuit and ready for operation. Relays such as 35MB00 are operated and released by the application of potentials of different polarity and are held operated by a permanent magnet (not shown). When relay 24WLBT operates, it closes its contacts 24WLBT in FIG. 34 to complete a circuit for operating relay 34SMB. This circuit includes battery through the winding of relay 34SMB, make contacts 24WLBT and 25MBCK to ground over the previously traced path.

In FIG. 24 a 130 volt positive potential is now connected through resistance VLB through break contacts 34VLR-8, through make contacts 34VLB-1, break contacts 34TMB-9, make contacts 34SMB-2 and 34MT43-3, through break contacts 29WHS1-10 and make contacts 33HGT0-8 and over conductor 606 and the previously traced circuit to conductor 3504 to operate the latching relay 35MB00. Relay 24WLBT, in operating, also establishes the path for reoperating relay 25WCV. When relay 24WCV operates, it opens the operating circuit for relay 24WLBT which releases, thereby releasing relay 25WCV.

With relay 25WCV released and relay 34SMB operated, ground on contacts 34MT44-8 operate relay 34TMB. Relay 34TMB opens its contacts 34TMB-6 in FIG. 25 to release relays 35MBCO–35MBC7 and when these relays release, relay 25MBCK in the marker releases. Relay 35MBC0 disconnects the winding of the latching relay from conductor 3504 and reconnects the line hold magnet to that conductor.

At its contacts 34TMB-9, relay 34TMB disconnects the 130 volt positive potential from the test lead which extends to the wideband hold magnet and reconnects this test lead to the windings of relays 24WLBT and 24WLIT. Relay 25WMB now operates in a circuit including negative battery, contacts 24VWC-5 in FIG. 24, the windings of relays 24WLBT and 24WLIT, break contacts 25MBCK-10, make contacts 34SMB-2 and 34MT43-3, break contacts 29WHS1-10, make contacts 33HGTO-8 conductor 606 contacts 7MD-1, conductor 3501 to FIG. 35, contacts 36WVFO-1, cross connection 3500 and conductor 3504, break contacts 36MBC0-3 and 36MT0-1, make contacts 35MB00-1, conductor 3505 in cable 6-36 to FIG. 6, contacts 7MC-2, conductor 612 in cable 6-25 to FIG. 25 and through the winding of relay 25WMB and resistance WMB to ground. Relay 24WLBT does not operate at this time.

When relay 25WMB operates, it reoperates verification relay 25WCV and ground is transmitted over conductor VTS to the master test frame indicating the state of the magnetic latching relay. The master test frame then signals the marker to disconnect.

To remove a maintenance busy condition from a wideband line, a similar test call is originated and key K2 is operated to operate relay 34VLR. Similar marker operations take place except that a negative 48 volt potential is transmitted to the latching relay to release it. When the latching relay is released, the master test frame is signaled over lead VTR and the marker is released.

If a wideband line is made busy as indicated by the operated condition of its associated magnetic latching relay MB-, the line will test busy on all service calls as indicated by the operation of relay 25WMB. If busy, the wideband line can be tested from a master test frame by overriding the maintenance busy condition. Under these circumstances, the test calls originated by the master test frame with key K3 operated causing the operation of video override relay 34VLO. At its contacts, 34VLO-10 in FIG. 25 relay 34VLO extends ground over conductor 2503, through contacts 7MC-1 and over conductor 611 to FIG. 36 through contacts 36LOC-2 and through the winding of relays 36MTO—36MT7 in the wideband line control circuit or similar relays in the remote switch signal control circuit. In operating, the contacts of relays 36MT- bypass the contacts of the magnetic latching relays and the wideband line hold magnet and the associated line can be tested.

It is to be understood that the above-described arrangements are illustrative of the application of the principles of the invention. Numerous other arrangements may be devised by those skilled in the art without departing from the spirit and scope of the invention.

For example, instead of using electromechanical crossbar switches in the networks, other devices such as ferreeds, etc. can be used for crosspoints.

Also, depending on the traffic requirements, the number of stages in either or both networks might be altered to provide an acceptable grade of service.

Furthermore, while the invention was described with respect to intraoffice calls, it should be understood that the arrangement is also suitable for subscriber to trunk, trunk to subscriber and trunk to trunk calls.

What is claimed is:

1. A communication system comprising a central office switching network including voice terminals and wideband terminals; a wideband concentrator remotely located from said office and comprising a plurality of first terminals, a plurality of second terminals less in number than said first terminals, and means for interconnecting said first and second terminals; a plurality of communication circuits each coupled to a corresponding one of said voice terminals and one of said first terminals; wideband transmission links interconnecting said second terminals with said wideband terminals; a data link interconnecting said office and said concentrator and control means at said central office comprising means for establishing a voice transmission path over said network to a voice terminal associated with a designated one of said circuits, means for testing the busy-idle condition of said transmission links for selecting an idle one of said transmission links, first transmitting means for identifying said selected transmission link and for transmitting over said data link a first coded signal representing the second terminal of said transmission link, and second transmitting means for determining the first terminal of said designated circuit and for transmitting over said data link a second coded signal representing the first terminal of said designated circuit.

2. The invention defined in claim 1 wherein said interconnecting means comprises a switching matrix having at least two sets of intersecting coordinates, one set being coupled to said first terminals and the other set being coupled to said second terminals, means responsive to said first coded signal for actuating a coordinate of said first set, and means actuated by said second signal for actuating a coordinate of said second set to interconnect the corresponding first and second terminals.

3. The invention defined in claim 2 wherein said concentrator further comprises means effective when at least two second set coordinates are simultaneously actuated for blocking actuation of said establishing means.

4. The invention defined in claim 2 wherein said concentrator also comprises means effective upon the actuation of one of said first set coordinates for transmitting a first verification signal to said central office control means and wherein said second transmitting means comprises means responsive to said first verification signal for transmitting said second coded signal.

5. The invention defined in claim 4 wherein said concentrator further comprises means effective upon the actuation of one of said second set coordinates for transmitting a second verification signal to said central office control means and wherein said control means also comprises means responsive to said second signal for establishing said voice transmission path.

6. In combination a central office switching network comprising a plurality of voice terminals, a plurality of wideband terminals, and switching means for establishing communication paths between said central office terminals; a wideband concentrator remotely located from said office and comprising a plurality of terminals, a plurality of links less in number than said terminals for coupling said concentrator to said central office, and switching means for establishing communication paths between said concentrator terminals and said links; a plurality of telephone stations and a plurality of audio trunks each coupled to a different one of said voice terminals; a video transceiver associated with each of said stations, certain of said transceivers being coupled to first ones of said central office wideband terminals and others of said transceivers being coupled to said concentrator terminals; a plurality of wideband trunks each coupled to second ones of said central office wideband terminals; a plurality of intraconcentrator trunks coupled to said concentrator; means connecting a first group of said audio trunks with said wideband trunks; means connecting a second group of said audio trunks with said intraconcentrator trunks; translator means at said central office responsive to indicia representing the voice terminals of telephone stations designated for interconnection for determining the terminal locations of the video transceivers associated with said designated stations; and means controlled by said translator means for actuating the appropriate one of said switching means in accordance with the terminal locations of said designated transceivers; wherein said actuating means comprises means effective when at least one of said designated transceivers is coupled to said central office wideband terminal for selecting one of said first group trunks and means effective when all said designated transceivers are coupled to said concentrator terminals for selecting one of said second group trunks.

* * * * *